United States Patent
Kellstrom, Jr.

(10) Patent No.: US 6,622,149 B1
(45) Date of Patent: Sep. 16, 2003

(54) METHOD OF SEARCHING A DATABASE FOR AN ITEM OF AN ASSEMBLY DRAWING

(76) Inventor: Gary E. Kellstrom, Jr., 345 Caldwell Ave., Paterson, NJ (US) 07501-3330

( * ) Notice: Subject to any disclaimer, the term of this patent is extended or adjusted under 35 U.S.C. 154(b) by 0 days.

(21) Appl. No.: 09/576,423

(22) Filed: May 22, 2000

Related U.S. Application Data

(62) Division of application No. 08/701,877, filed on Aug. 23, 1996, now Pat. No. 6,088,625.

(51) Int. Cl.7 .............................................. G06F 17/30
(52) U.S. Cl. .................................................. 707/104.1
(58) Field of Search .............................. 707/1, 3, 4, 5, 707/9, 100, 103 R, 104.1; 700/95, 107, 182; 704/1; 709/203

(56) References Cited

U.S. PATENT DOCUMENTS

| | | | |
|---|---|---|---|
| 4,862,376 A | 8/1989 | Ferriter et al. | 364/468.14 |
| 4,891,785 A | 1/1990 | Donohoo | 364/900 |
| 5,033,014 A | 7/1991 | Carver et al. | 703/1 |
| 5,625,798 A | 4/1997 | Badders et al. | 395/500 |
| 5,740,425 A * | 4/1998 | Povilus | 704/1 |
| 5,864,482 A * | 1/1999 | Hazama et al. | 700/182 |
| 6,088,625 A * | 7/2000 | Kellstrom, Jr. | 700/107 |

FOREIGN PATENT DOCUMENTS

| | | |
|---|---|---|
| DE | 19518556 A | 11/1995 |
| EP | 0366069 A | 5/1990 |
| GB | 2227337 A | 7/1990 |

OTHER PUBLICATIONS

G. Schultz, "Linking Product Life Cycle Data to the Enterprise," Managing Automation, May, 1996, pp. 28–34.

* cited by examiner

*Primary Examiner*—Diane D. Mizrahi
*Assistant Examiner*—Apu M Mofiz
(74) *Attorney, Agent, or Firm*—Fitzpatrick, Cella, Harper & Scinto

(57) ABSTRACT

A method and system for transferring assembly data between a computer aided design computer system and a manufacturing computer system are provided. The system includes (1) first networking circuitry in the computer aided design computer system, (2) second networking circuitry in the manufacturing computer system and (3) communication circuitry for transferring assembly data from the first networking circuitry to the second networking circuitry. An execution of an interface application residing in the computer aided design computer system causes the communication circuitry to perform the transfer of the assembly data.

1 Claim, 91 Drawing Sheets

| FIG. 4B | FIG. 4C |
|---------|---------|
| FIG. 4D | FIG. 4E |

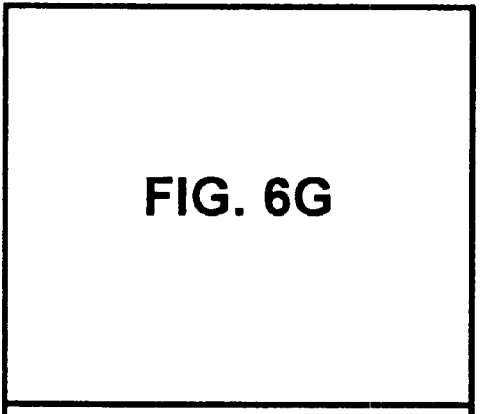
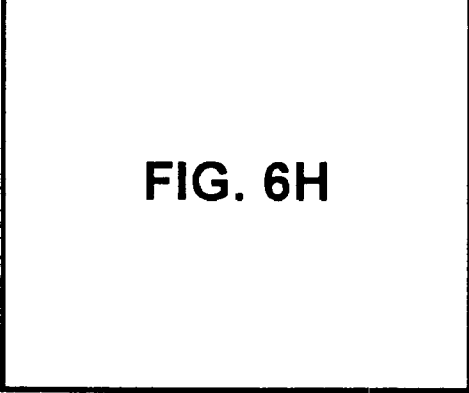
FIG. 6F

| FIG. 10H | FIG. 10I |

| REV | BY | DATE | DESCRIPTION |
|---|---|---|---|

| TOLERANCES UNLESS OTHERWISE SPECIFIED | ENGINEERING SOLUTIONS FOR TODAY | INNOVATIVE DYNAMICS |
|---|---|---|

MACHINED SURFACES ⁶³/  
FRACTIONS ± 1/64  
DECIMALS ± .005  
ANGLES ± 0°30'

TITLE:

| DRAWN BY | | DWG. NO. |
|---|---|---|
| CHECKED BY | | |
| APPROVED | | |
| SCALE: 1=1 | DATE: | SHEET OF |

NOTICE

THIS DRAWING IS THE PROPERTY OF INNOVATIVE DYNAMICS AND IS LOANED SUBJECT TO THE CONDITIONS THAT IT IS NOT TO BE REPRODUCED, COPIED, OR OTHERWISE DISPOSED OF AND IS NOT TO FURNISH ANY INFORMATION FOR THE MAKING OF DRAWINGS, PRINTS, OR APPARATUS OR PARTS THEREOF EXCEPT WHERE OTHERWISE PROVIDED FOR BY SPECIFIC CONTRACT AGREEMENT WITH INNOVATIVE DYNAMICS

FIG. 12

| FIG. 17B | FIG. 17C |
|---|---|
| FIG. 17D | FIG. 17E |

FIG. 17A

METHOD OF SEARCHING A DATABASE FOR AN ITEM OF AN ASSEMBLY DRAWING

This application is a division of application Ser. No. 08/701,877, now U.S. Pat. No. 6,088,625 filed Aug. 23, 1996.

BACKGROUND OF THE INVENTION

1. Field of the Invention

The present invention relates to a system capable of sharing assembly data between a computer aided design (CAD) computer system, such as Autodesk®'s AutoCAD®, and a manufacturing computer system, such as ProfitKey International's Rapid Response Manufacturing®.

2. Description of Related Art

CAD computer application programs, such as Autodesk's AutoCAD®, are used by engineers and draftspersons for designing and drawing, among other things, assemblies, such as a nut, bolt and washer assembly. An assembly usually consists of components, such as the nut, the bolt and the washer, but also may include subassemblies consisting of a number of related components. Attribute data, such as part number and description, are associated with the components, subassemblies and assemblies.

Generally, the designer will draw an assembly including these components and subassemblies. In particular, a rendition of each component or subassembly is predrawn and saved in a file separate from the drawing file. The set of separate part files would comprise a library of available parts. The designer then selects the component he needs from the library and reconfigures it to meet the design requirements of the assembly.

CAD systems, however, have a number of drawbacks. For example, CAD systems generally do not (1) provide means for organizing a library of commonly used parts or of created parts, (2) provide a means for retrieving drawings by any other data type than their filenames, (3) provide means for automatically assigning part numbers to components and assemblies, (4) provide means for comparing existing part descriptions or searching using part descriptions, and (5) means for insuring the filename matches the information in the title block. Moreover, CAD applications generally experience long time delays when searching for drawing files in directories containing large number of files since they rely on the operating system and do not use a database. Further, when combining a small file to a larger assembly file, such as when inserting a block into a drawing under edit, the smaller file is represented by an object and is therefore uneditable. If editing of that object is required, the object must first be converted to its original construction, causing all corresponding attribute data to be irretrievably lost and thus can no longer be accounted for in the CAD system.

Manufacturing computer systems, such as ProfitKey International's Rapid Response Manufacturing® system, use assembly data from the assembly designed by the engineers to allow manufacturing personnel to plan, schedule and control the manufacturing of the assembly. It also allows manufacturers to manage and control inventory, such as the required components and subassemblies, and do other various manufacturing-related tasks, such as cost estimating and purchasing.

The assembly data is entered, usually by hand, into the manufacturing system. One known system, Innovative Dynamics PKBOM, extracts data from an AutoCAD® system assembly, specifically the part number and description and the relation between the part numbers, and manipulates this data so that it can be imported into the ProfitKey manufacturing system. This system, however, requires the operator of the CAD system to be intimate with the capabilities of the CAD system, and is dependent upon the proper operation of the CAD system.

In general, in CAD systems, parts are synonymous with a drawing or a file. Thus, this system cannot provide means for determining whether a part exists, means for previewing a part, automatic assignment of part numbers to the components and assemblies, comparing descriptions of components, or the transfer of any assembly data other than the part number and description. Moreover, PKBOM disadvantageously requires that the user manually save each drawing, update the title block and separately log onto to the manufacturing computer system to import the data.

SUMMARY OF THE INVENTION

It is an object of the present invention to provide a system for sharing assembly data between a CAD system and a manufacturing system that overcomes the above-described drawbacks of prior systems.

It is another object of the present invention to provide a method for creating assembly drawings and generating assembly data within a CAD system.

It is another object of the present invention to provide a method of transferring the assembly data to a manufacturing system.

It is another object of the present invention to provide a method for searching, selecting and manipulating items, such as components or subassemblies, by their description.

It is another object of the present invention to treat parts as objects rather than drawing files because a part may require more than one drawing file to represent the part properly throughout the manufacturing cycle. For example, if an assembly consists of a nut, a bolt and a washer, an assembly drawing would be required to illustrate the relation between the parent part, i.e., the nut-bolt-washer assembly, and its children parts, i.e., the nut, the bolt and the washer. If another part, for example, a bracket assembly, is to be assembled from a bracket, a shelf and the nut-bolt-washer subassembly, another assembly drawing would be required to illustrate the relation between parent bracket assembly and its children parts. In this example, the nut-bolt-washer assembly needs to be represented as an assembly in one phase of the manufacturing cycle, but as a component in another phase of the manufacturing cycle. It is an object of the present invention to provide a system that will automatically create both versions of the required drawing files, i.e, the component version consisting of the graphics and data alone and the assembly version consisting of additional graphics and data, dimensions, material list box, border, title block, etc. It is another object of the present invention to provide a system that when the part is retrieved and selected for insertion into an assembly drawing, the system automatically inserts the correct representation of the part, that is, the component version.

In accordance with one aspect of the invention, a method of generating an assembly drawing using a computer aided design computer system is provided, the method including the steps of (1) operating the computer aided design computer system and (2) determining whether an item to be used in the assembly drawing exists in the memory of the computer system. In accordance with another aspect of the invention, a method of generating an assembly drawing using a computer aided design computer system is provided, the method including the steps of (1) operating the computer aided design computer system, (2) determining whether an item to be used in the assembly drawing exists in the memory of the computer system, (3) creating the item during the operation of the computer system if no item exists and (4) adding the created item to the assembly drawing.

In accordance with another aspect of the invention, another method of generating an assembly drawing using a computer aided design computer system is provided. This method includes the steps of (1) operating the computer aided design computer system, (2) determining whether an item to be used in the assembly drawing exists in the memory of the computer system, (3) selecting the item during the operation of the computer system if the item exists and (4) adding the selected component to the assembly drawing.

In accordance with yet another aspect of the invention, a system for transferring assembly data between a computer aided design computer system and a manufacturing computer system is provided, the system including (1) first networking circuitry in the computer aided design computer system, (2) second networking circuitry in the manufacturing computer system and (3) communication circuitry for transferring assembly data from the first networking circuitry to the second networking circuitry. An execution of an interface application residing in the computer aided design computer system causes the communication circuitry to perform the transfer of the assembly data.

In accordance with yet another aspect of the invention, another system for transferring assembly data is provided. This system includes (1) a first computer system for performing computer aided design, (2) a second computer system for manufacturing control and (3) networking circuitry for transferring the assembly data between the first computer system and the second computer system. The first computer system includes an input device for inputting operator data, a memory for storing an interface application and the assembly data generated from an assembly drawing created by the operator in accordance with the input operator data, and a processor for processing the interface application to cause the assembly data to be transferred to the second computer system by the networking circuitry.

BRIEF DESCRIPTION OF THE DRAWINGS

The various aspects of the present invention can be best understood by reference to the detailed description of the preferred embodiments set forth below taken with the drawings, in which:

FIGS. 4A–4E are flow diagrams showing process steps for a method of transferring assembly data.

FIG. 5 shows a screen display illustrating command prompt.

FIGS. 10A–10J are flow diagrams showing process steps for an PKINSERT subroutine.

FIG. 12 shows a screen display illustrating a title block.

FIGS. 17A–17E are flow diagrams showing process steps for a method of transferring assembly data corresponding to a fourth embodiment of the present invention.

DETAILED DESCRIPTION OF THE EMBODIMENTS

First Embodiment

Figure 1:
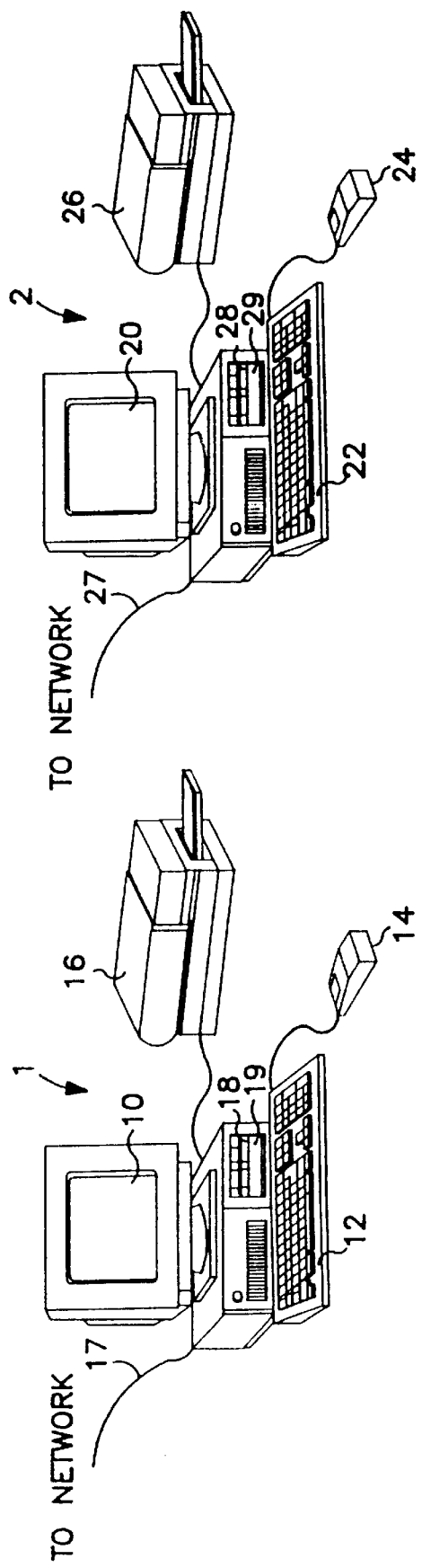
FIG. 1 shows a perspective view of computer hardware used in the system corresponding to a first embodiment of the present invention.

FIG. 1 shows the outward appearance of the computer hardware of a first embodiment of the present invention. Shown in FIG. 1 is computing equipment 1 having the capability to execute a computer aided design (CAD) application such as AutoCAD®. Such computing equipment may include a MacIntosh, IBM PC compatible, or UNIX-based mini-computer. Provided with computing equipment 1 is a screen display 10, such as a color monitor, a keyboard 12 for entering text data and programmer commands, and a pointing device 14, such as a mouse for pointing and for manipulating objects depicted on display screen. CAD assembly drawing data and attribute data may be printed on attached printer 16.

Computing equipment 1 may include a mass storage device such as computer disk 19 for storing the computer operating system, such as DOS or UNIX, the database system, such as Pervasive Btrieve®, the networking application program, such as Novell Netware® or Transmission Control Protocol/Internet Protocol (TCP/IP), the mainframe terminal emulation application program, such as Rumbas, the CAD application, and a CAD interface application, which will be described in further detail below.

Computing equipment 1 may also include a floppy disk drive interface 18 into which floppy disks may be inserted. Information from such floppy disks may be downloaded into the mass storage device. Such information may include data files, such as CAD assembly attributes and other assembly data, and application programs, such as CAD application programs and backup utilities. Computing equipment 1 may also include a CD-ROM interface from which information may also be downloaded to storage disk.

Computing equipment 1 may also include network interface hardware 17, such as a local area network interface hardware, serial data communications hardware, or parallel data communications hardware. Such network interface hardware is used to transfer executable and nonexecutable files between computing equipment 1 and other computing devices.

Also shown in FIG. 1 is computing equipment 2 having the capability to operate a manufacturing system such as ProfitKey International's Rapid Response Manufacturing®. Such computing equipment may include a micro-computer such as a MacIntosh or IBM PC compatible, a mini-computer such as an IBM AS/400 or IBM RS/6000, or a mainframe computer such as an IBM ES9000. Provided with computing equipment is a screen display 20, such as a color monitor, a keyboard 22 for entering text data and programmer commands, a pointing device 24, such as a mouse for pointing and for manipulating objects depicted on display screen. Manufacturing control data may be printed on attached printer.

Computing equipment 2 may include a mass storage device such as computer disk 29 for storing the computer operating system, such as DOS, UNIX, or OS/400, the database system, such as Oracle®, the networking application program, such as Novell Netware® or TCP/IP, a manufacturing control application program and a manufacturing control interface application.

Computing equipment 2 may also include a floppy disk drive interface 28 into which floppy disks may be inserted. Information from such floppy disks may be downloaded into the mass storage device. Such information may include data files, such as manufacturing control data, and application programs, such as manufacturing control system application programs and backup utilities. Computing equipment 2 may also include a CD-ROM interface from which information may also be downloaded to storage disk.

Computing equipment 2 may also include network interface hardware 27, such as a local area network interface hardware, serial data communications hardware, or parallel data communications hardware. Such network interface hardware is used to transfer executable and nonexecutable files between computing equipment 2 and other computing devices, including computer equipment 1.

Figure 2:
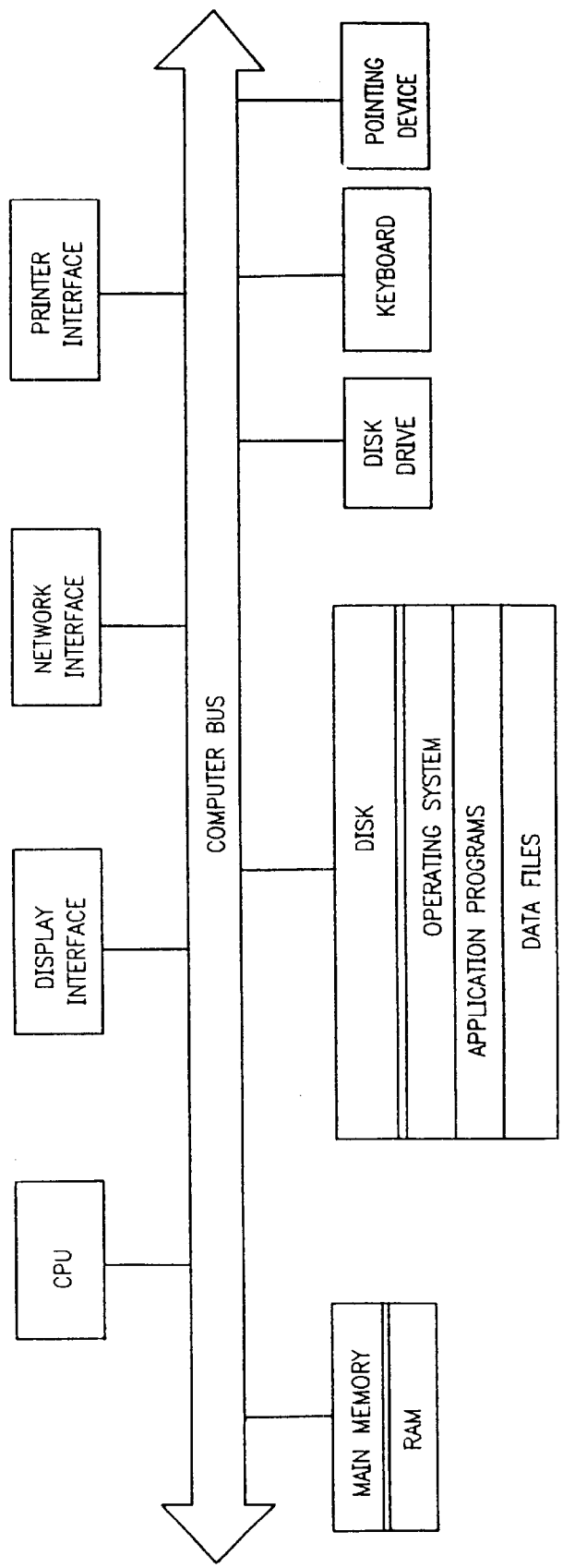
FIG. 2 shows a block diagram of the CAD computer system in accordance with the first embodiment of the present invention.

FIG. 2 is a detailed block diagram showing the internal construction of computing equipment 1. As shown in FIG. 2, computing equipment 1 includes a central processing unit (hereinafter "CPU") interfaced with a computer bus. Also interfaced with the computer bus is a network interface, a display interface, a keyboard interface, main memory, a pointing device interface, a floppy drive interface, a storage disk, and a printer interface.

Main memory is interfaced with the computer bus to provide random access memory (RAM) storage for use by the CPU when executing stored programs instructions, such as the interface application, AutoCAD® application, Novell Netware® network, Rumba® terminal emulation application, and other application programs (not shown). More specifically, the CPU loads those programs from the storage disk, from a floppy disk in the floppy disk drive interface, or from the network via the network interface into main memory, and executes those stored programs out of main memory.

Figure 3:
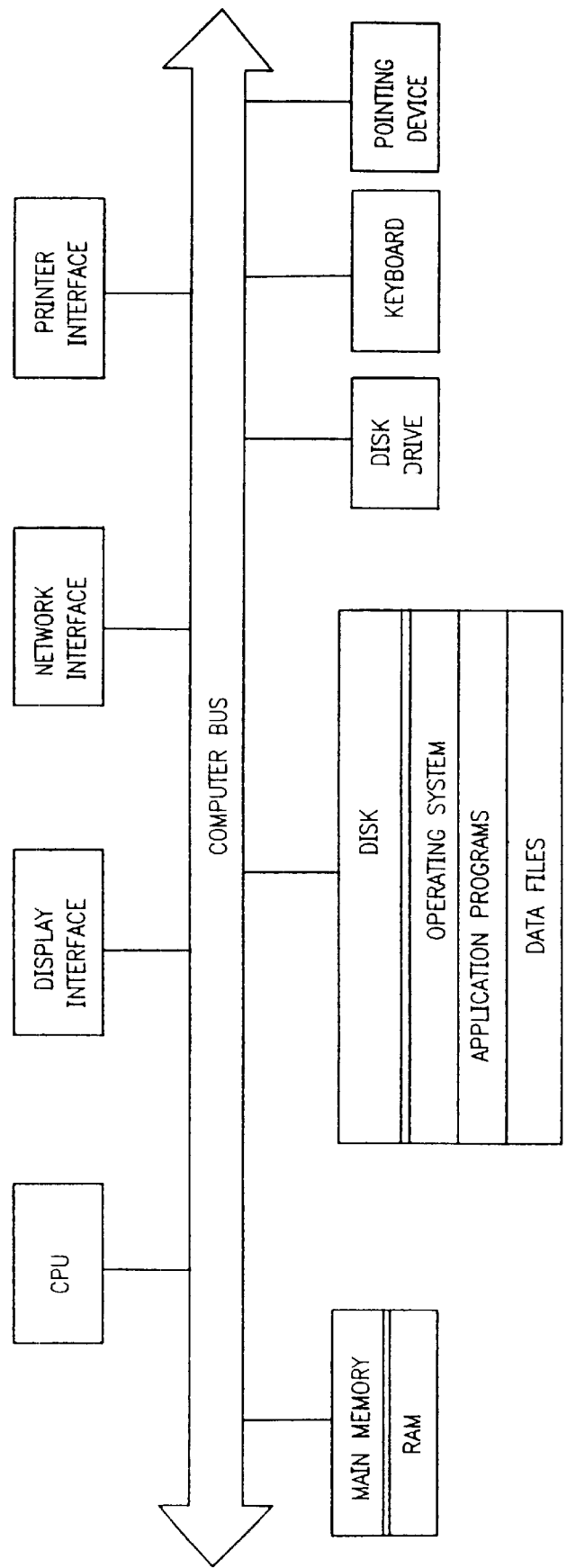
FIG. 3 shows a block diagram of the manufacturing computer system in accordance with the first embodiment of the present invention.
Figure 4B:
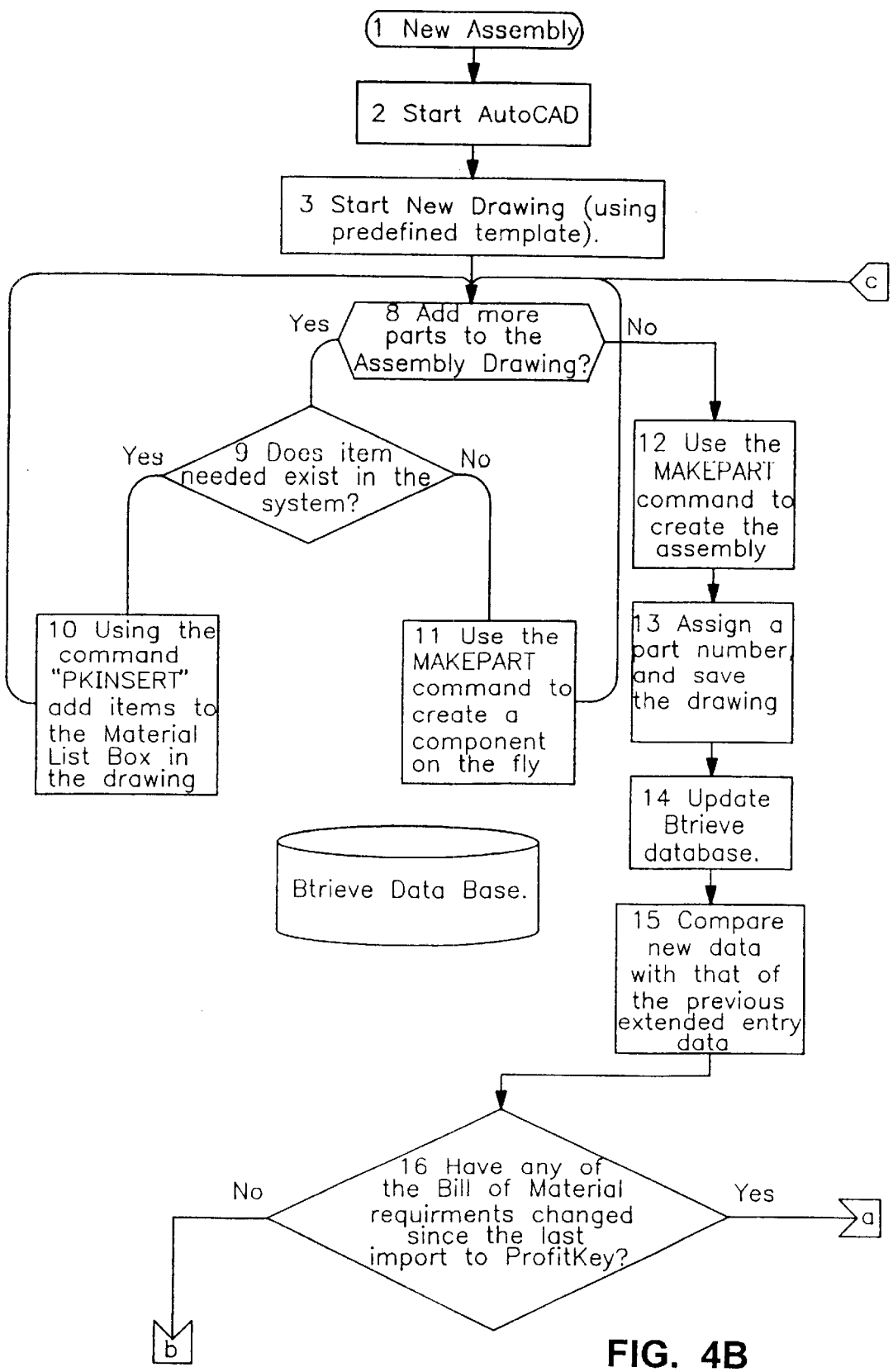
Figure 4C:
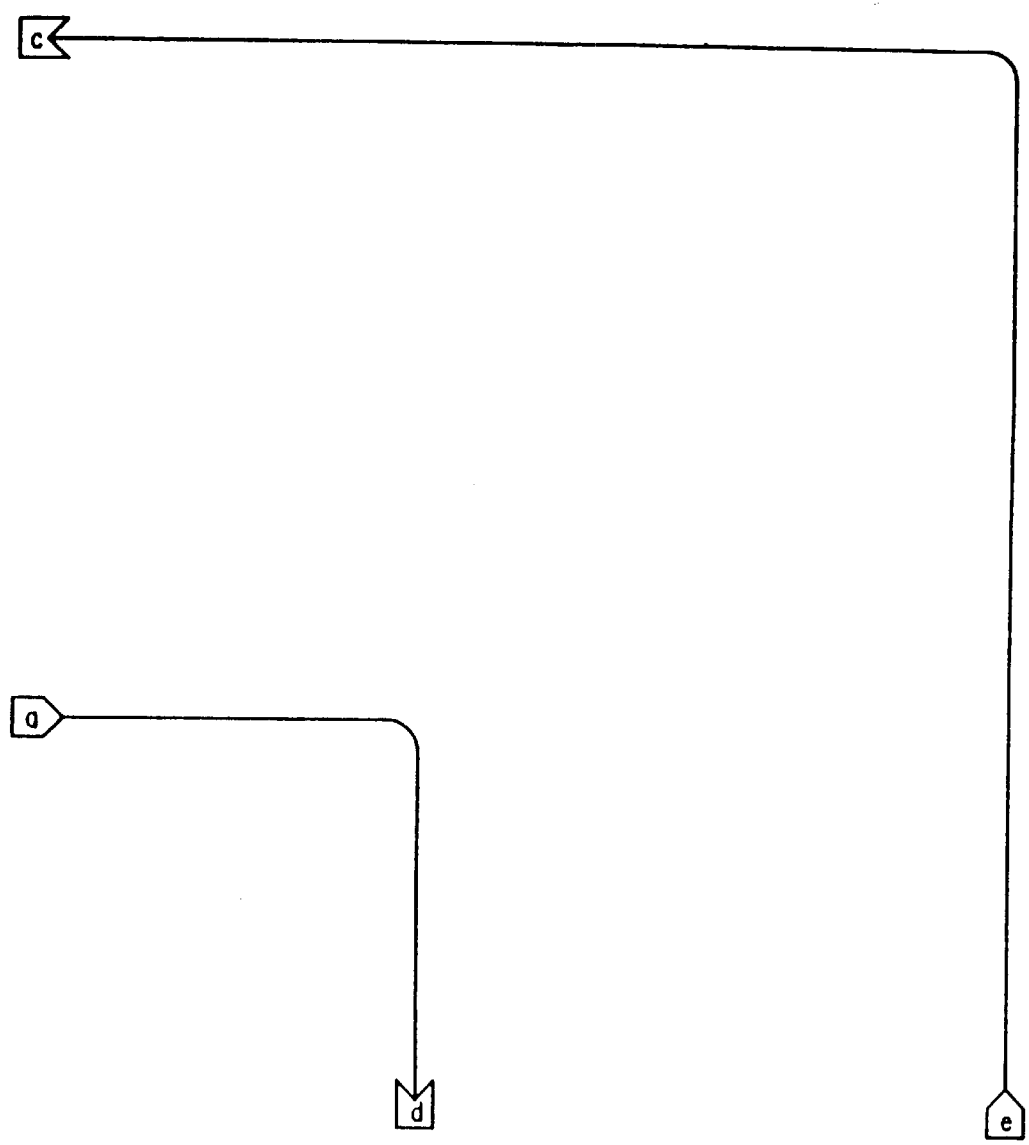
Figure 4D:
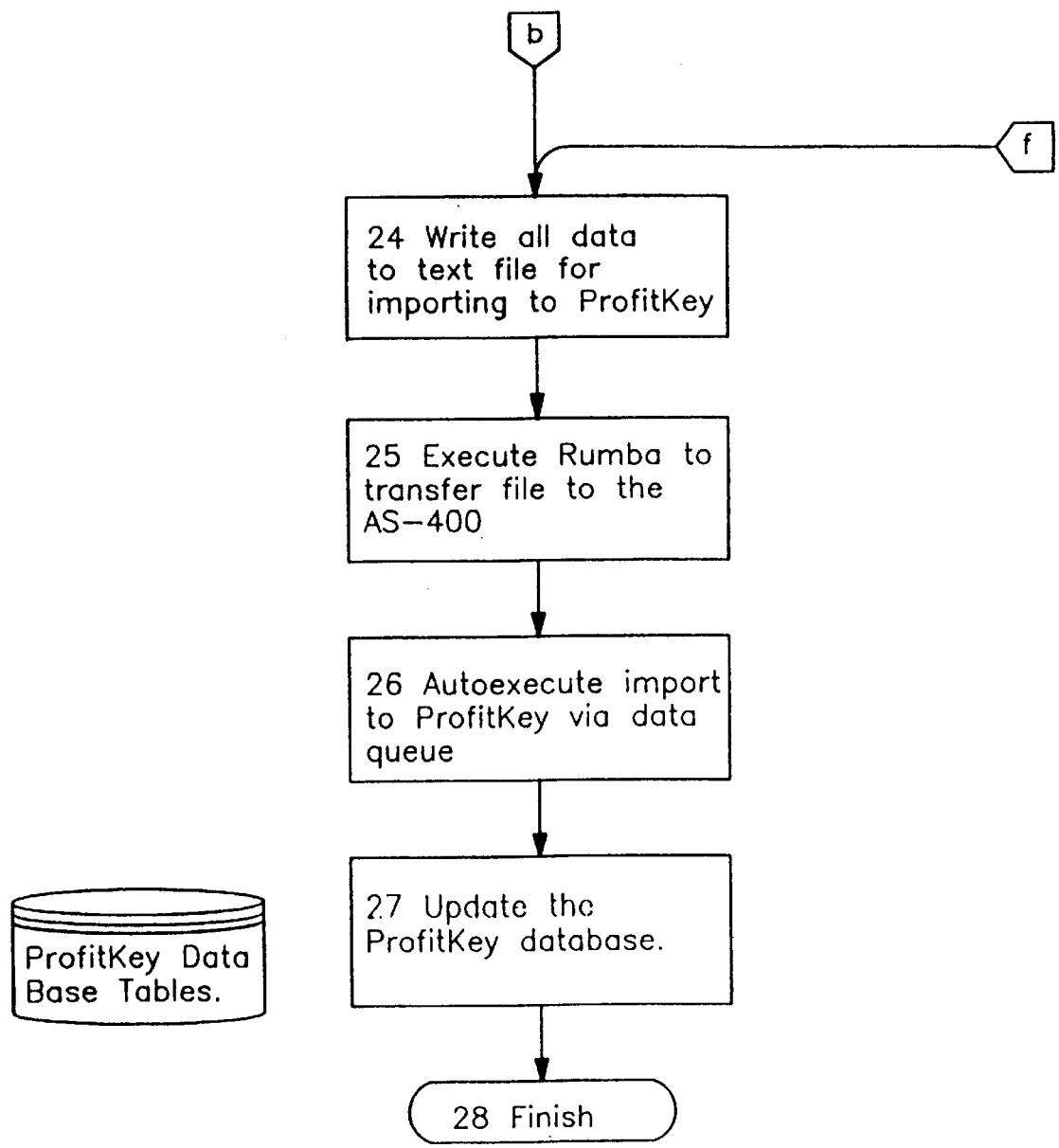
Figure 4E:
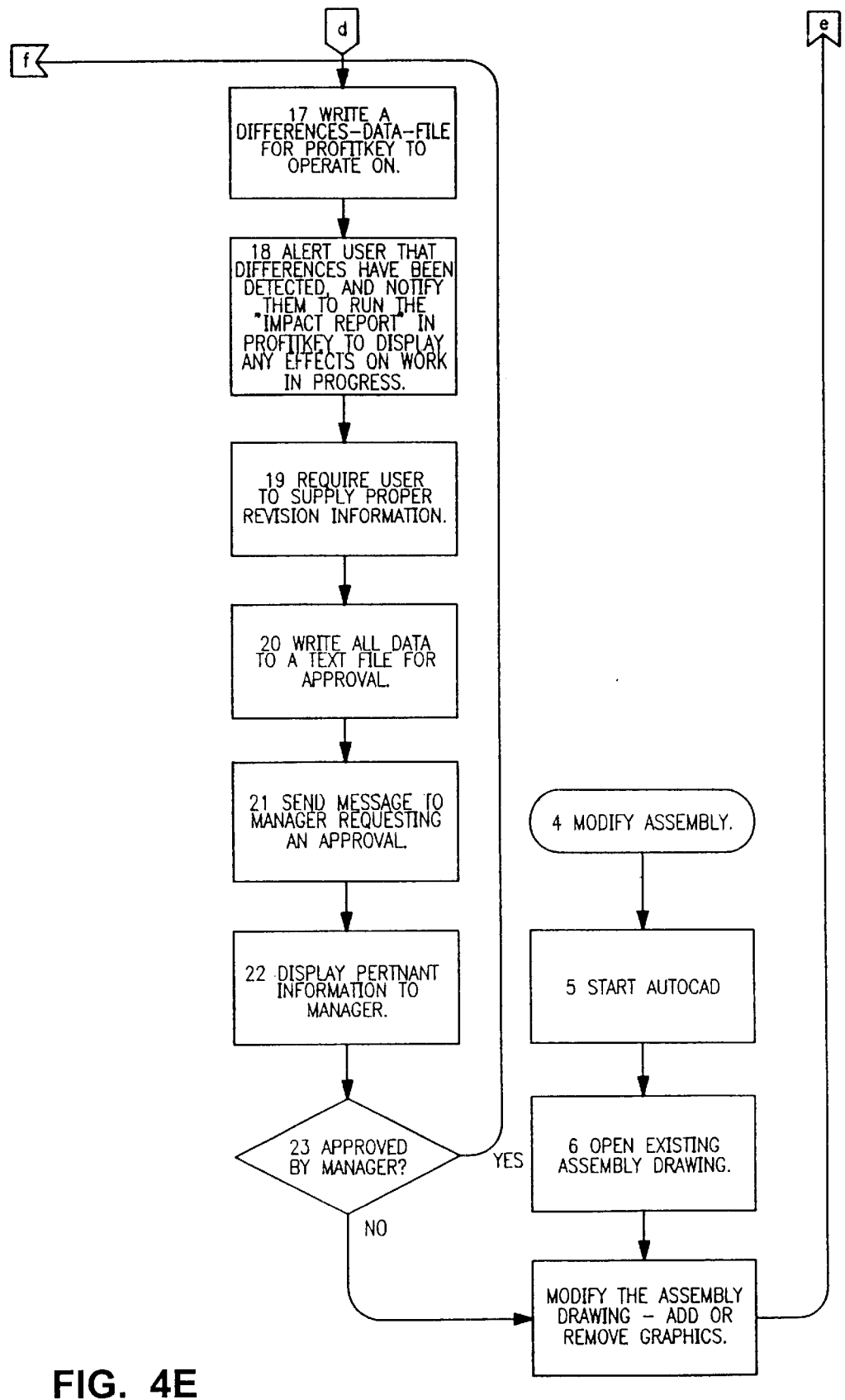

FIG. 3 is a detailed block diagram showing the internal construction of computing equipment 2. As shown, computing equipment 2 includes a CPU interfaced with a computer bus. Also interfaced with computer bus is a network interface, a display interface, a keyboard interface, main memory, a pointing device interface, a floppy drive interface, a storage disk, and a printer interface.

Main memory interfaces with the computer bus to provide random access memory (RAM) storage for use by the CPU when executing stored programs instructions such as ProfitKey International's Rapid Response Manufacturing®, TCP/IP network, and other application programs (not shown). More specifically, the CPU loads those programs from the storage disk, from a floppy disk in the floppy disk drive interface, or from the network via the network interface into main memory, and executes those stored programs out of main memory.

FIGS. 4A–4E show flow charts describing the overall operation of the invention. An operator causes execution of the CAD application program and instructs the CAD application to start a new assembly drawing. The operator causes previously defined parts to be added to the assembly drawing by executing the data warehouse subsystem "PKINSERT" routine from within the CAD application. Advantageously, the operator does not have to (1) if within the CAD application, close the current drawing or open a new drawing, or (2) exit the CAD application. In addition, the operator may define new parts also without closing the current drawing, opening a new drawing or exiting the CAD application, and cause those newly defined parts to be added to the assembly drawing, by executing the data warehouse subsystem "MAKEPART" routine from within the CAD application.

When no additional parts need to be added to the assembly drawing, the operator causes the completed assembly and thus its corresponding assembly data to be created by executing the data warehouse subsystem "MAKEPART" routine from within the computer aided design application. As when creating a component, the operator need not exit the CAD application to create assembly data. The data warehouse subsystem automatically assigns a part number to the created assembly if one was not previously defined, requests that the operator enter a description for the assembly, saves the assembly drawing and assembly data, and causes the database system to store a bill of materials and master record for the created assembly. The master record for an assembly contains data which may include, but is not limited to, the following: quantity, unit of measure, is__stock__flag, is__purchased__flag, vendor notes, general notes, phantom notes, commodity code, product code, general ledger account number, lead time, estimated cost, and item type.

The data warehouse subsystem automatically compares the bill of materials for the newly created assembly with a bill of materials for a previously created version of the assembly to detect any differences between the bills of materials. If no differences are detected, the data warehouse subsystem interface application on computer system 1 writes all assembly data to a data file for transmission to the manufacturing control system executing on computer system 2. The interface application then causes execution of the terminal emulation application program, transmits the assembly data file to computer system 2, and causes the manufacturing control system executing on computer system 2 to import the assembly data and update the manufacturing control system database.

If the data warehouse subsystem detects differences between the bill of materials for the newly created assembly and the bill of materials corresponding to a previously created corresponding assembly, a file containing the differences between the bills of materials is created. The operator is alerted to the fact that differences have been detected and is instructed to cause the manufacturing system on computer system 2 to generate an impact report, which provides information to a manufacturing supervisor on the impact of the difference or differences on the manufacturing process. After supplying revision information to the data warehouse subsystem, the data warehouse subsystem generates a file containing the supplied revision information and the differences between the bills of materials, and transmits the file to an authorizing agent, such as the manufacturing supervisor, for approval. If the authorizing agent approves the changes, the data warehouse subsystem interface application on computer system 1 writes all assembly data to a data file for transmission to the manufacturing control system executing on computer system 2, causes execution of the terminal emulation application program, transmits the assembly data file to computer system 2, and causes the manufacturing control system executing on computer system 2 to import the assembly data and update the manufacturing control system database. If the authorizing agent does not approve of all of the changes, the data warehouse subsystem may modify the assembly drawing by adding or removing assembly data as authorized, and query the authorizing agent as to whether the authorizing agent wishes to add additional parts to the assembly drawing.

Alternatively, the operator continues to operate the CAD application as described above to change the assembly drawing until the assembly changes are approved.

Starting the Data Warehouse Subsystem

Figure 5:
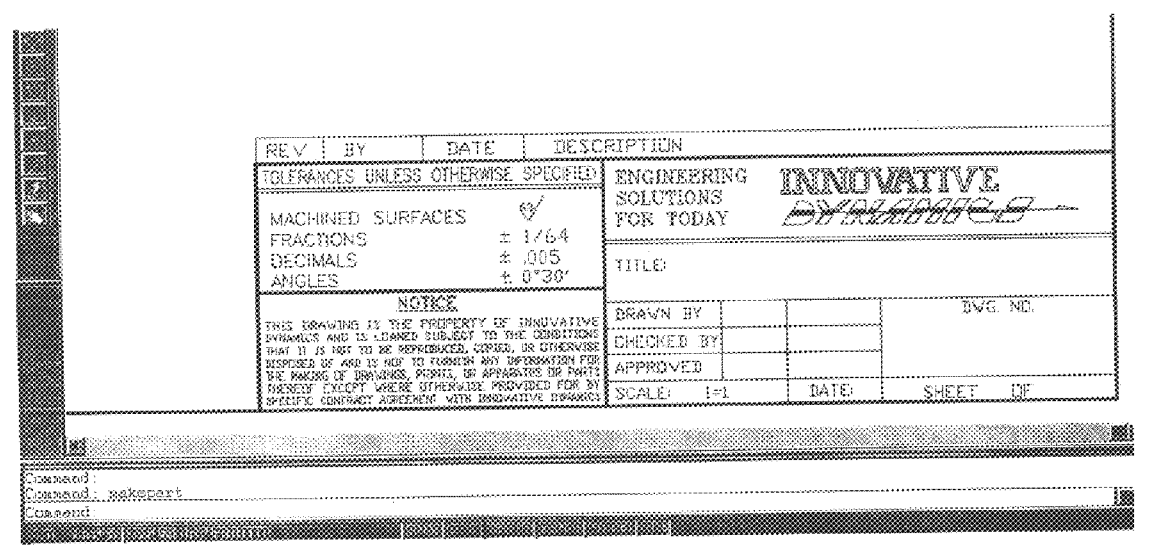
Figure 6A:
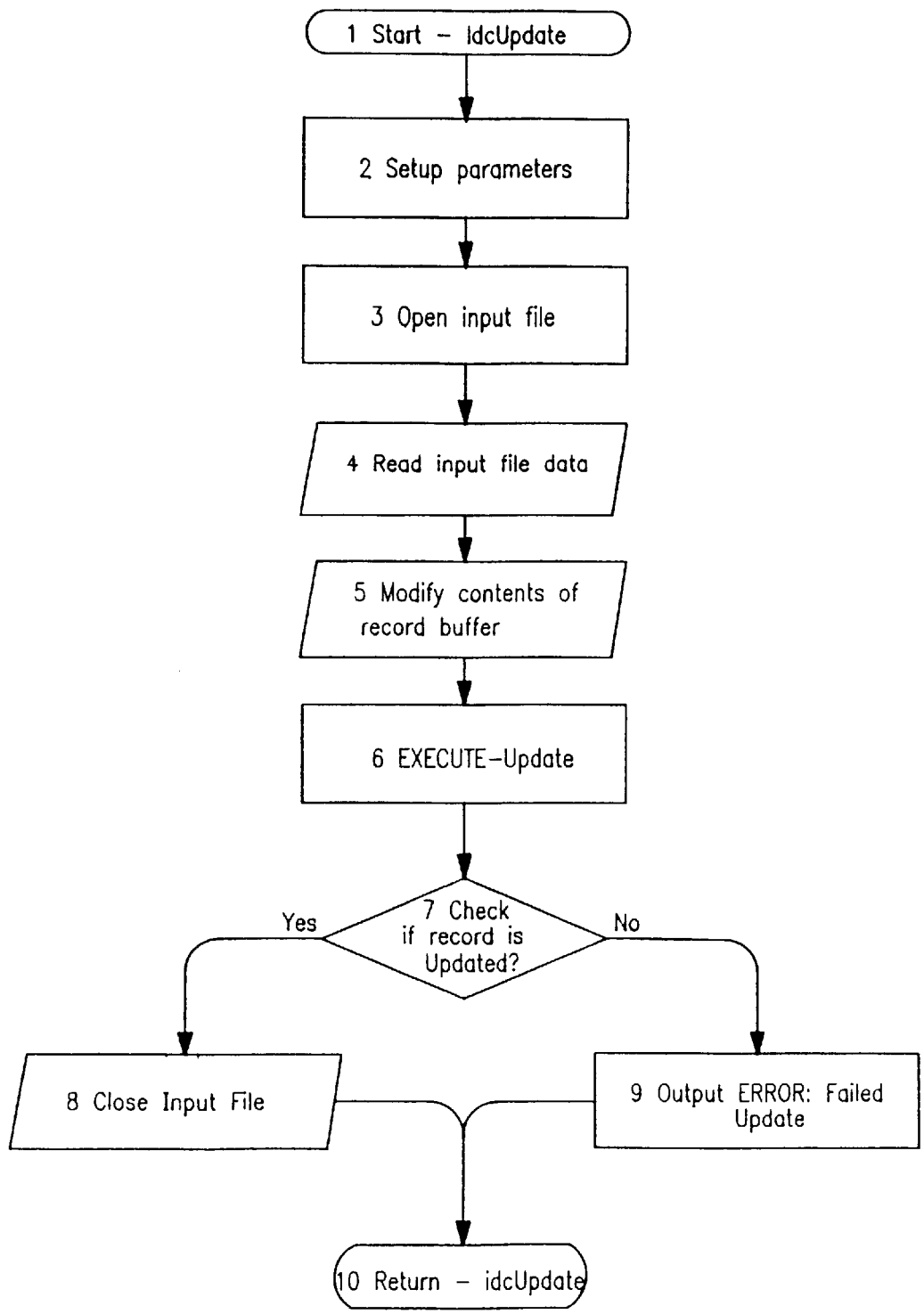
FIGS. 6A–6T are flow diagrams showing process steps for an IDCLINK subroutine.
Figure 6B:
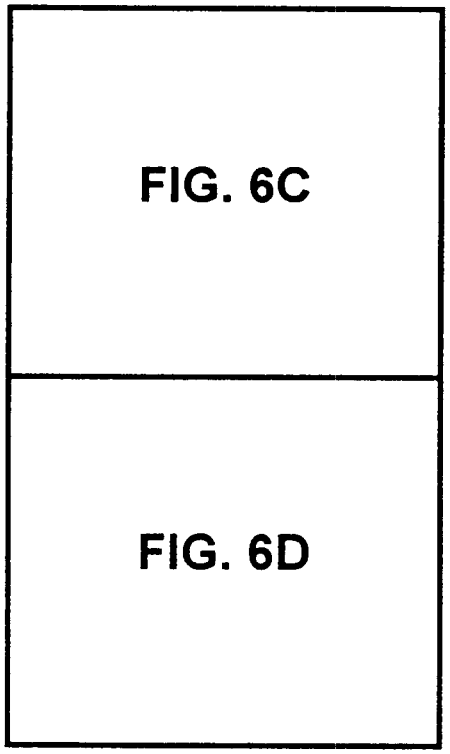
Figure 6C:
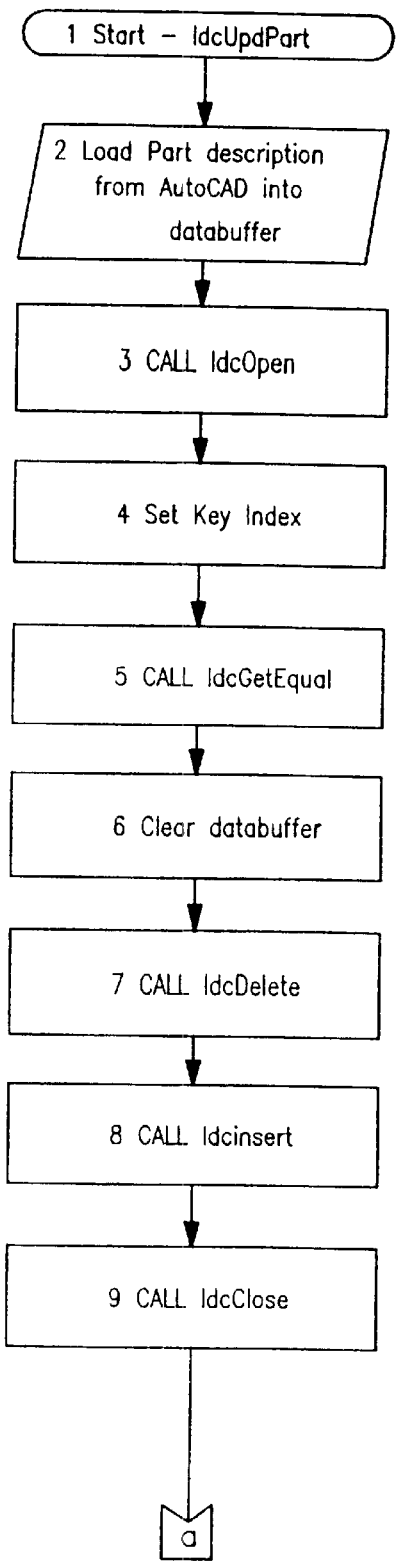
Figure 6D:
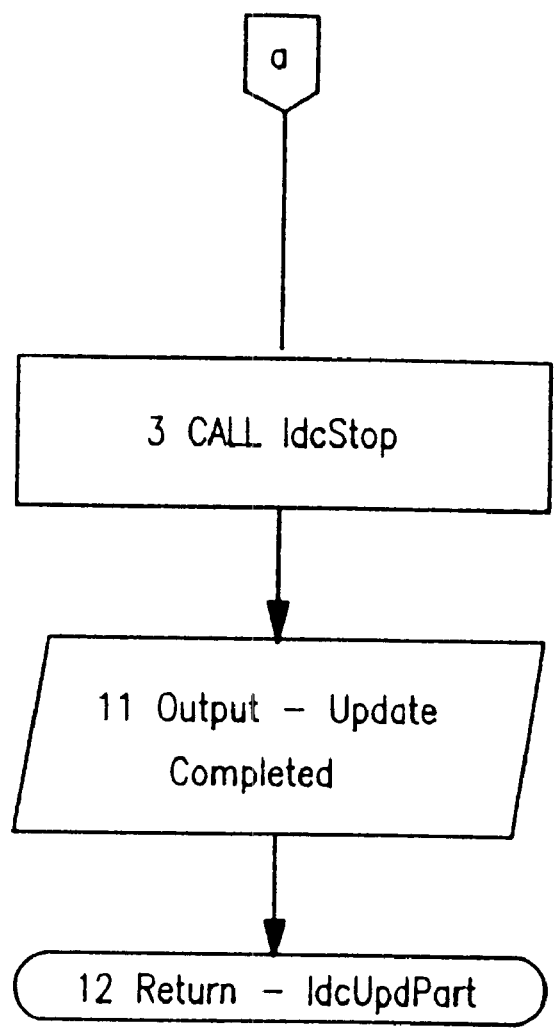
Figure 6E:
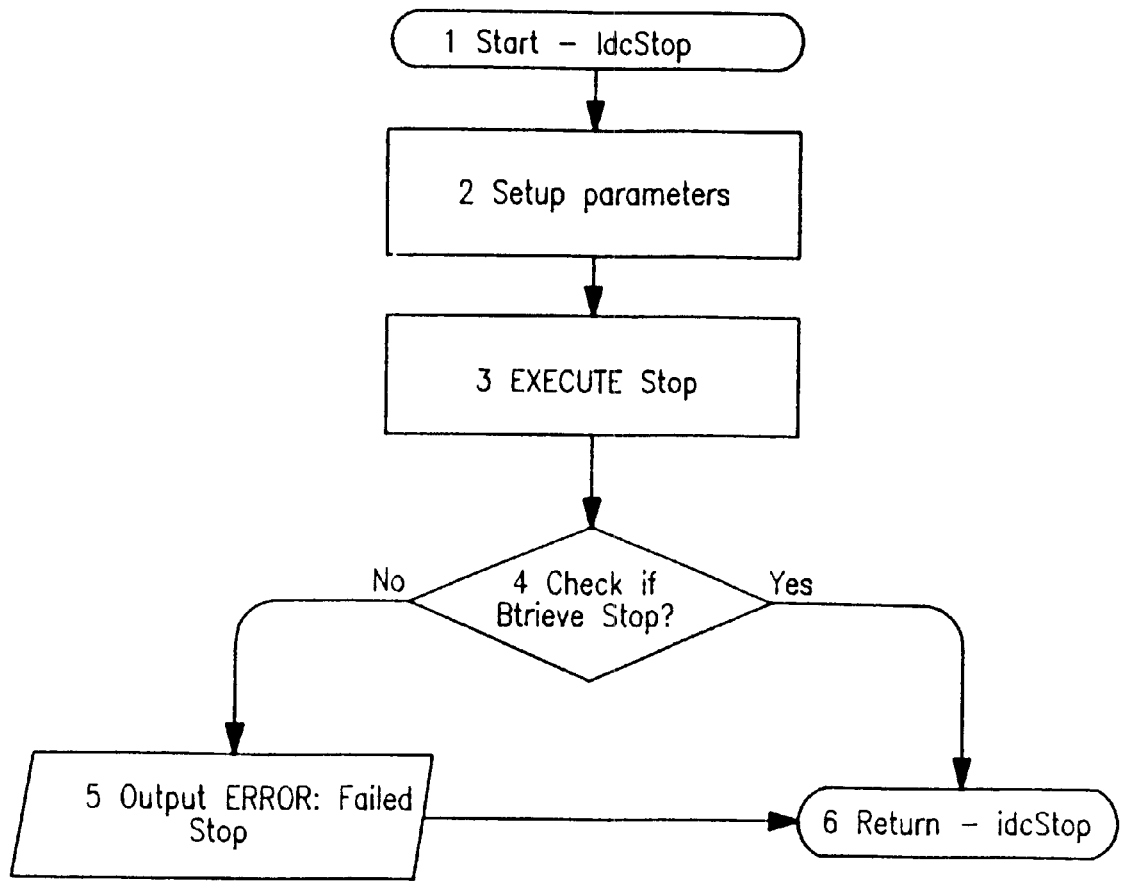
Figure 6G:
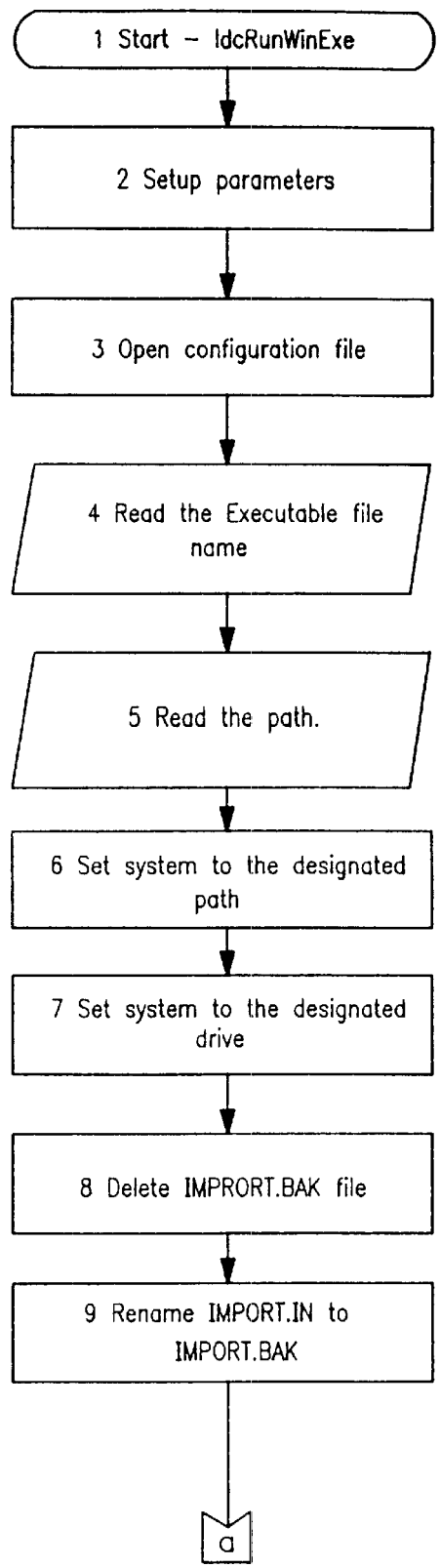
Figure 6H:
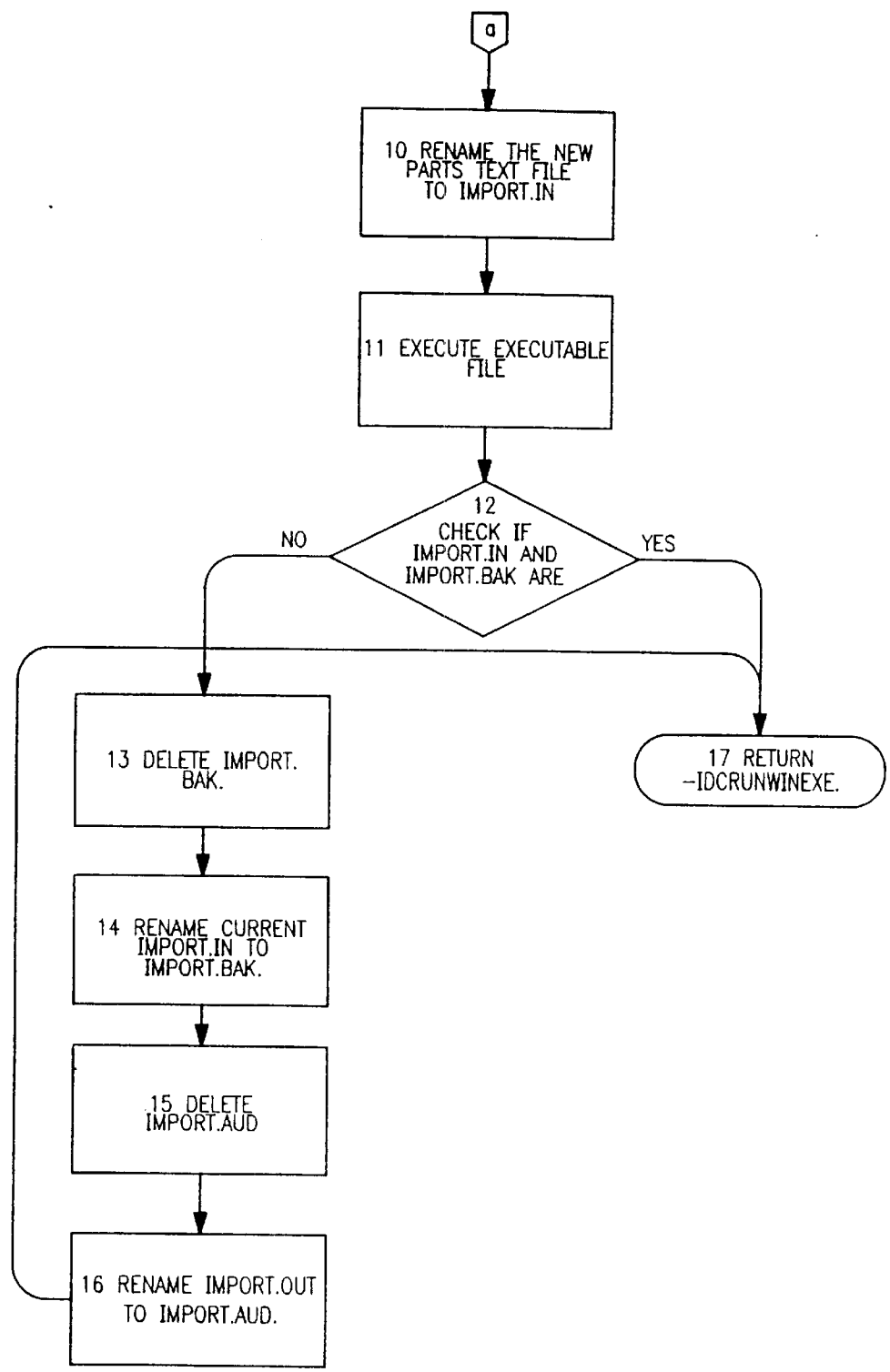
Figure 61:
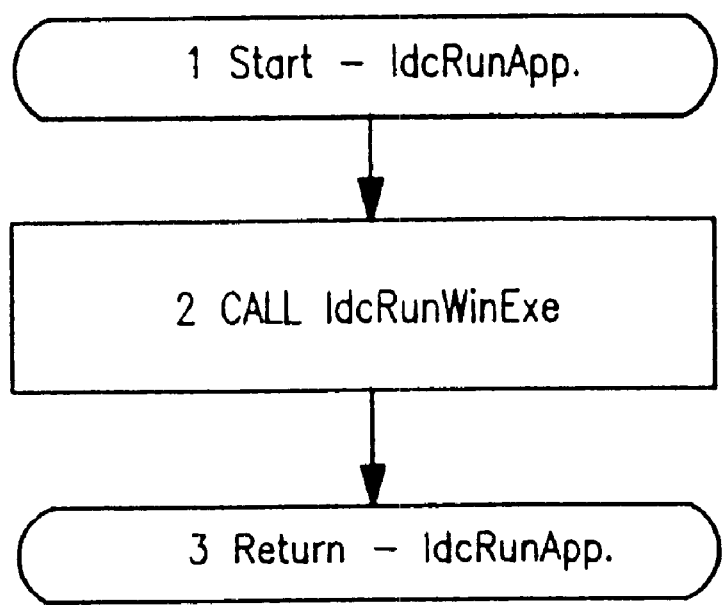
Figure 6J:
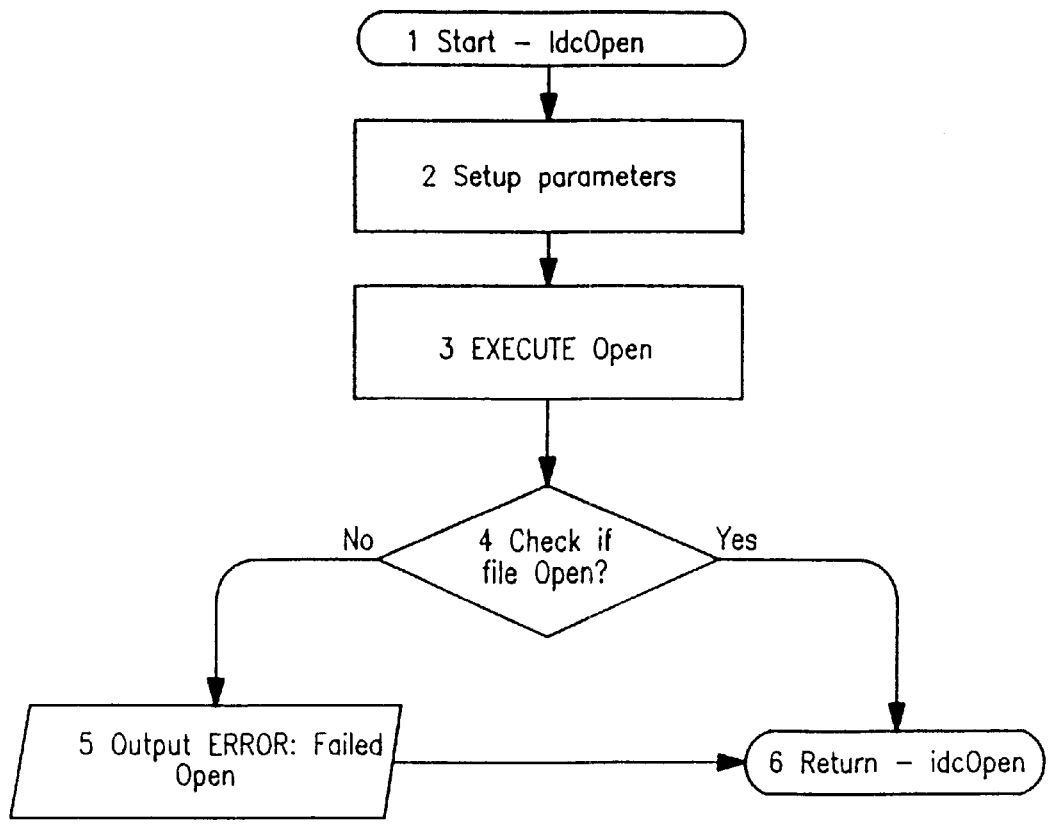
Figure 6K:
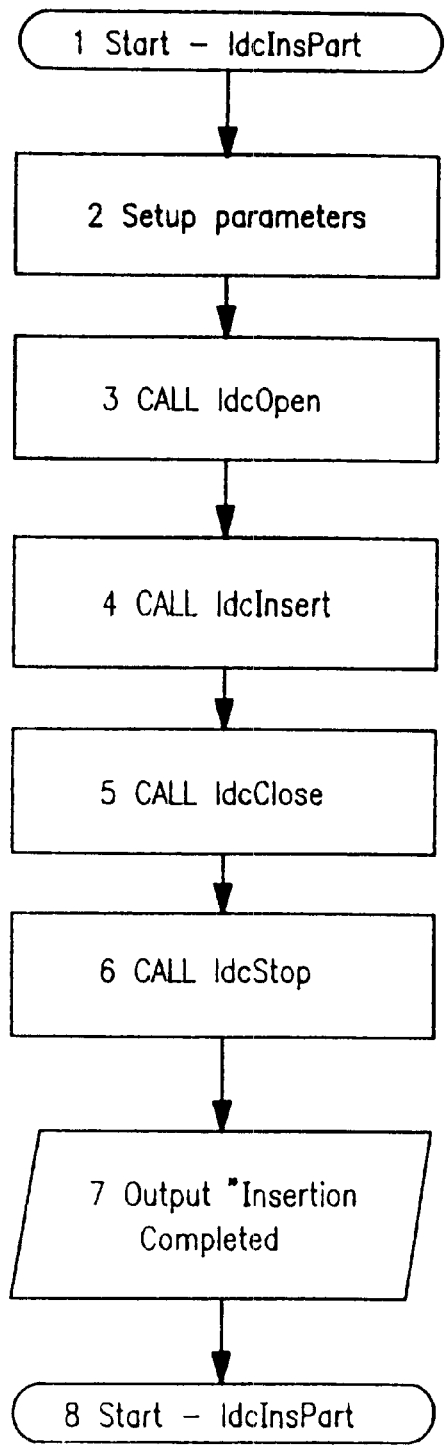
Figure 6L:
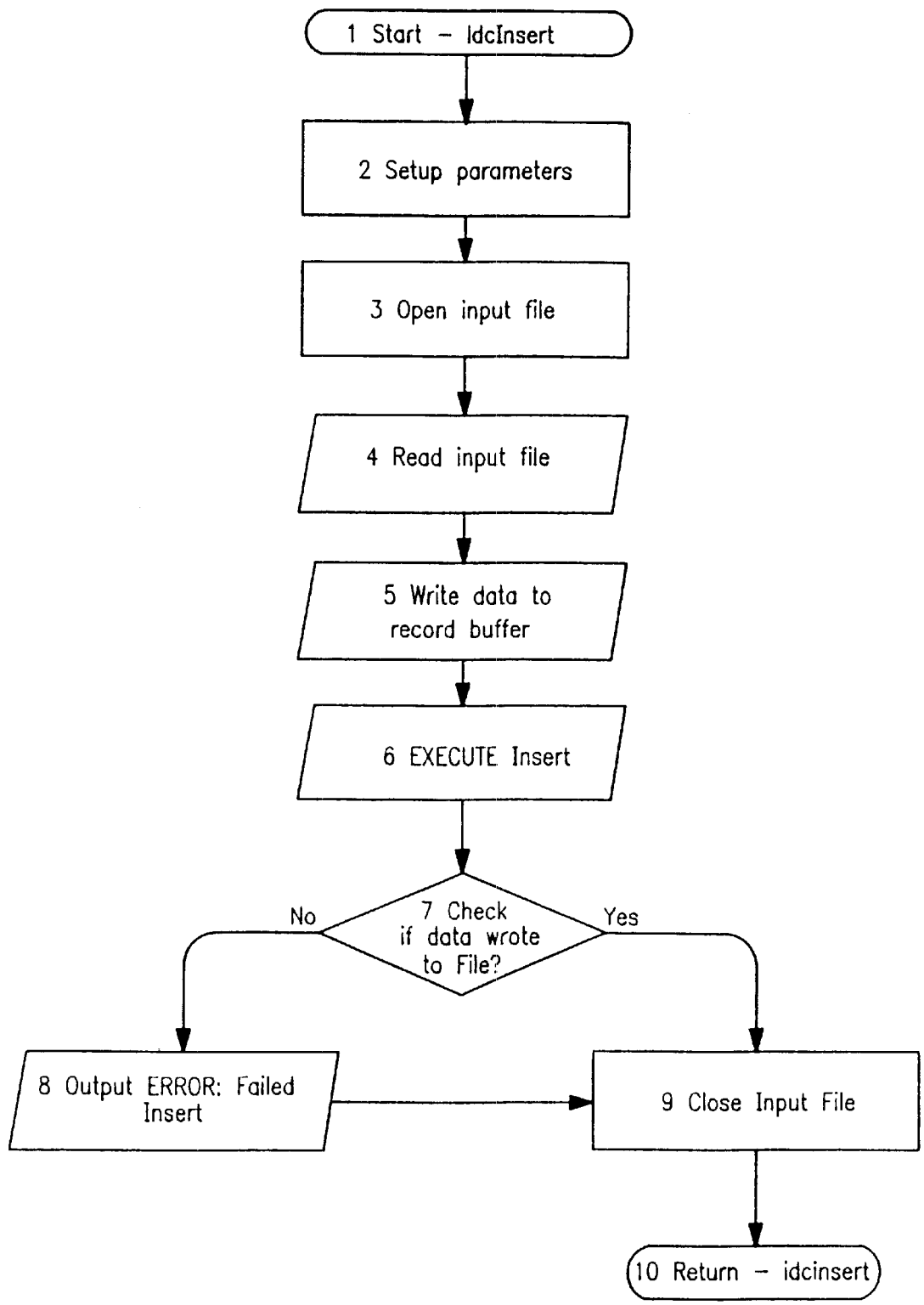
Figure 6M:
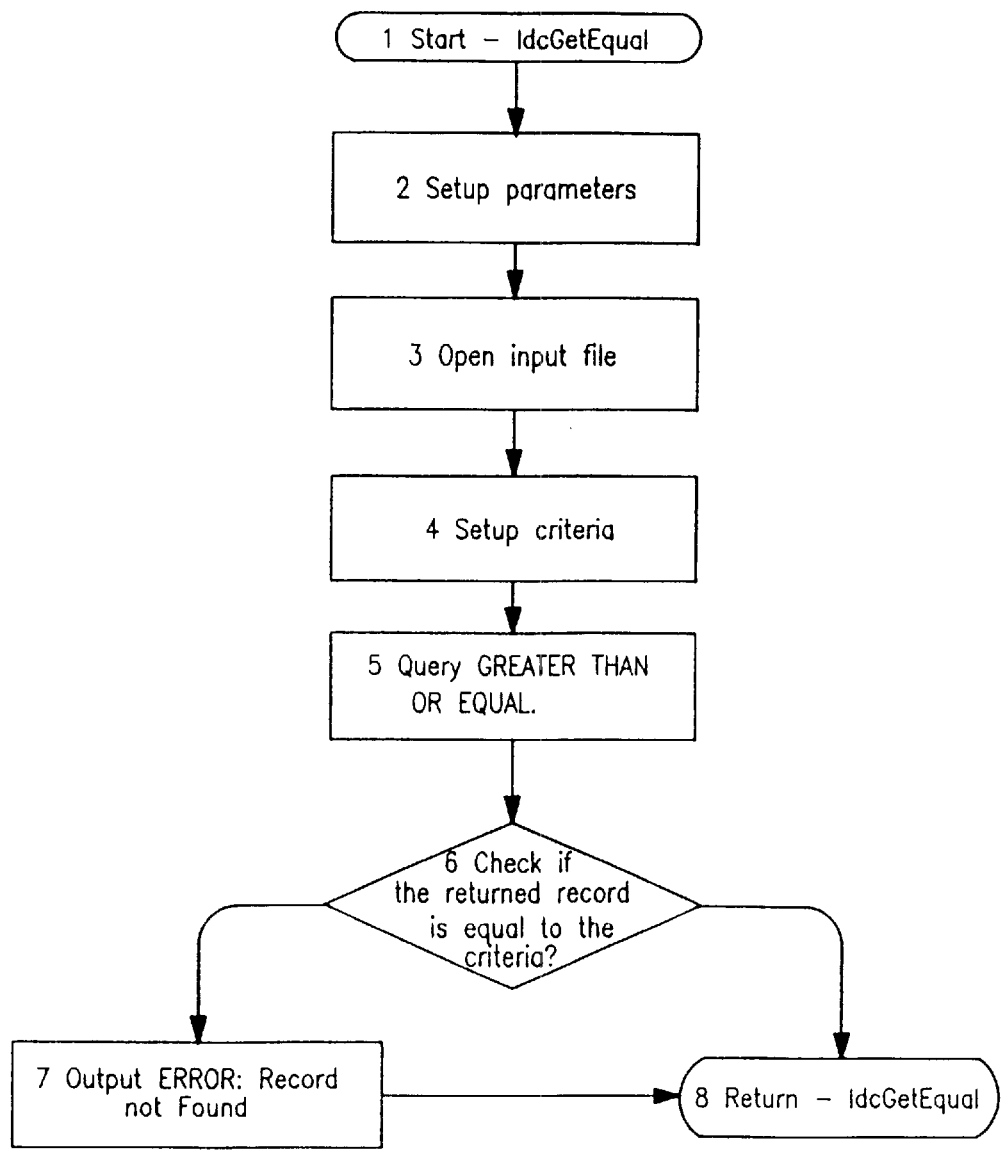
Figure 6N:
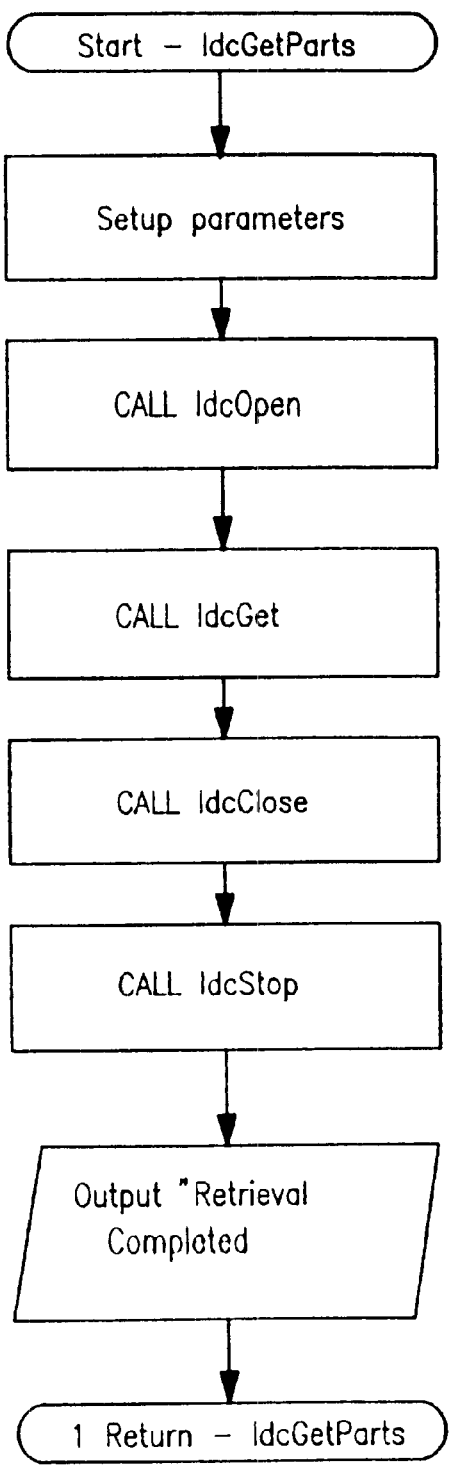
Figure 6P:
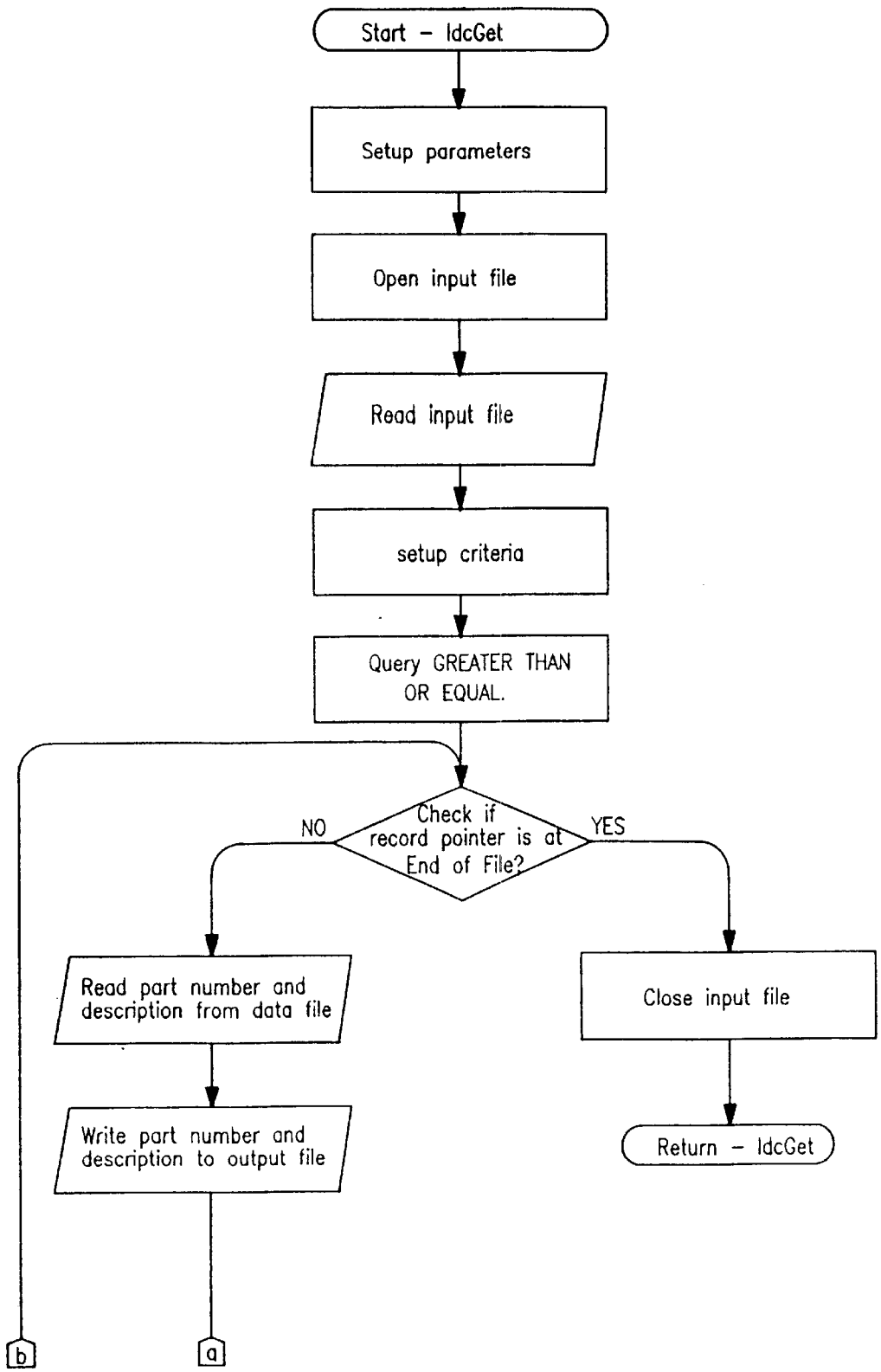
Figure 6Q:
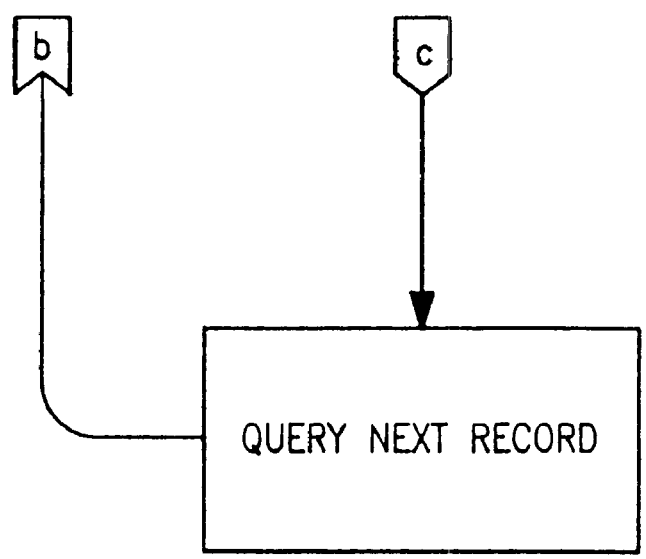
Figure 6R:
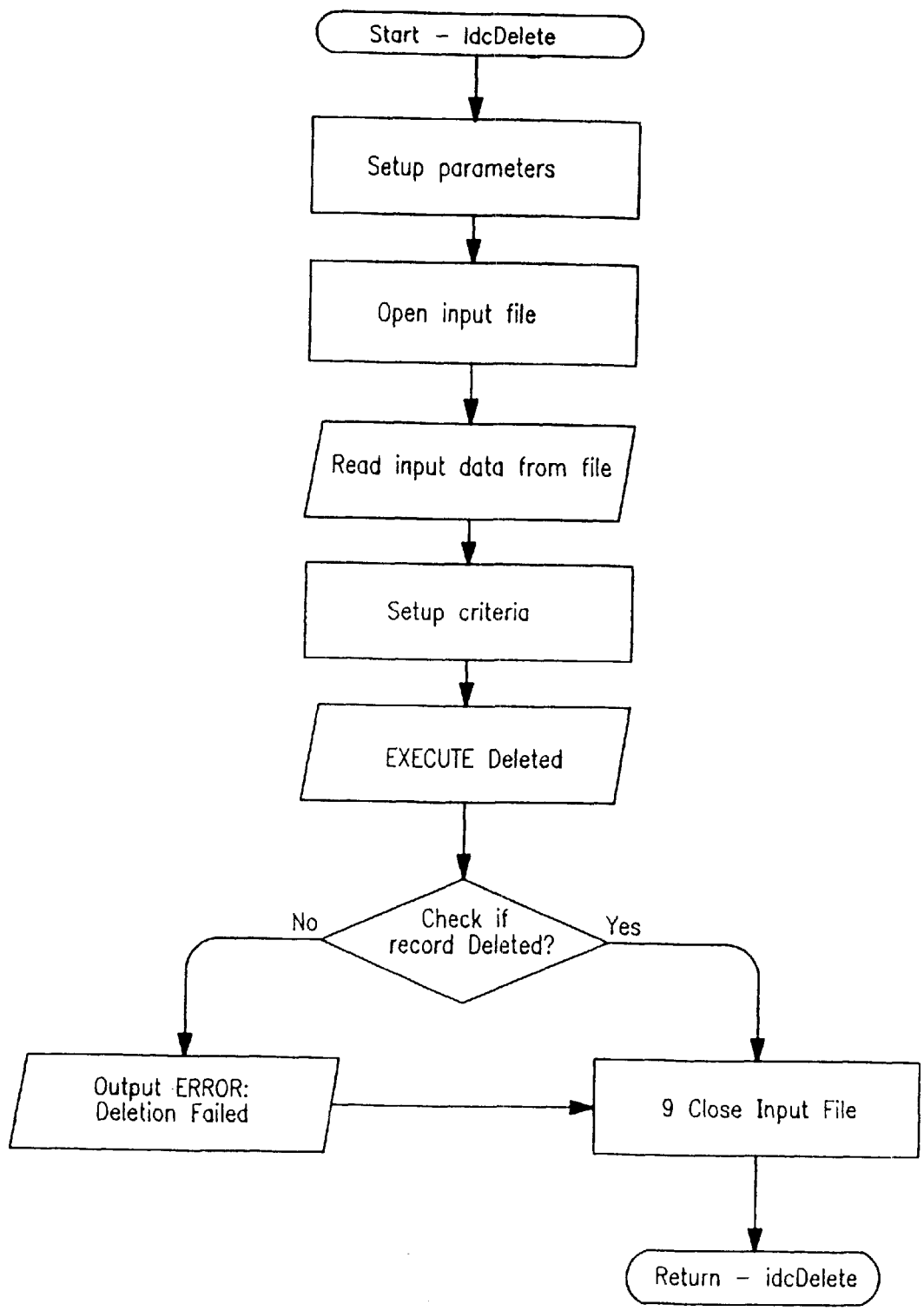
Figure 6S:
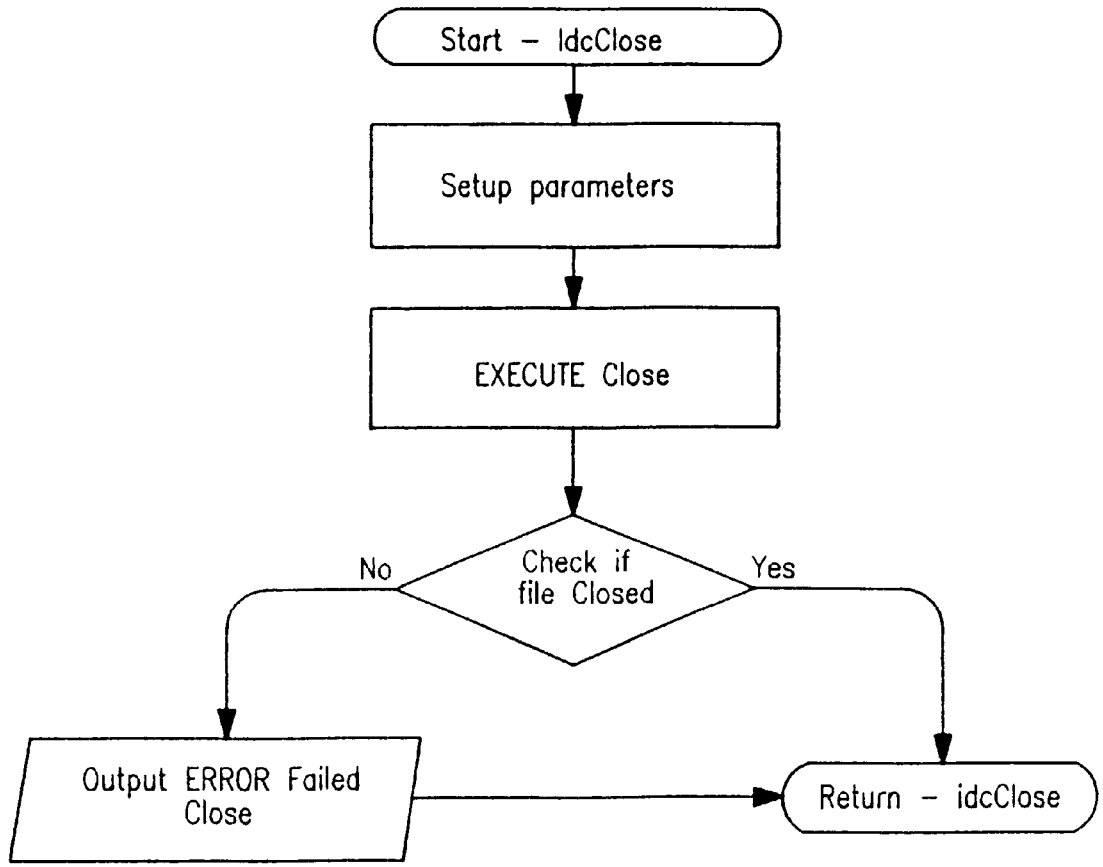
Figure 6T:
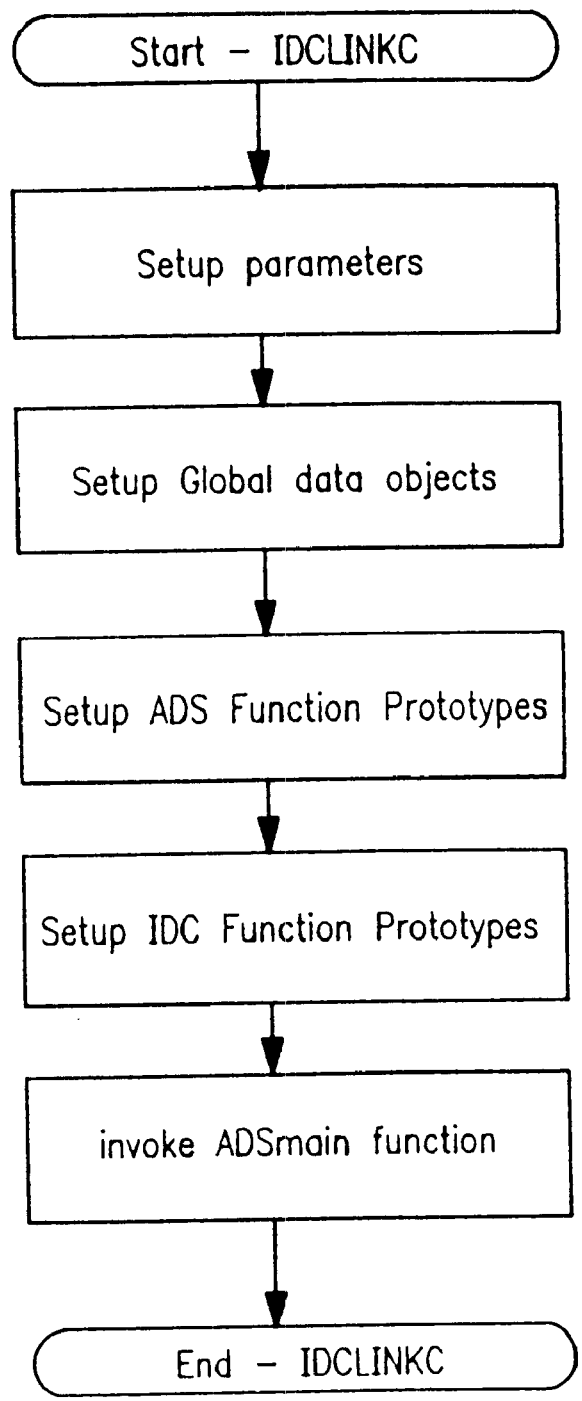

In order to access the system of the first embodiment, the operator must start execution of the CAD application by entering the appropriate command on keyboard of computing equipment 1, or by clicking on the appropriate icon on the display of computing equipment 1, as shown in FIG. 5. The data warehouse subsystem, IDCLINK, is loaded from within the CAD application session and registers itself with the CAD application. The operator receives notification of successful registration and initialization via a CAD message. IDCLINK, as shown in the flowchart diagrams of FIGS. 6A–6T, serves as the underlying interface between the CAD system, the database, and the manufacturing control system. IDCLINK generates status messages which are transferred to the CAD application and subsequently appear on the display embedded within CAD application display. IDCLINK can generate messages to notify the user of successful part insertion, successful part deletion, successful part update, error during part insertion, error during part deletion, and error during part update. In an error situation, IDCLINK generates a file in main memory containing a description of the error, and causes the file to be transferred from main memory to storage device. IDCLINK contains modules IDCGETPART, IDCINSPART, and IDCUPDPART, all of which will be described in detail.

IDCLINK also contains module IDCRUNAPP. IDCRUNAPP uses parameters stored in storage device of computing equipment 1 to enable the operator to execute, from the CAD application, an independent application stored in memory or storage device of computing equipment 1, or transferred to computing equipment 1 from another computing equipment, such as computing equipment 2. IDCRUNAPP operates on computing equipment 1 such that the operator need not terminate the CAD application prior to causing the execution of the independent application.

Figures 7A, 7B, 7C:
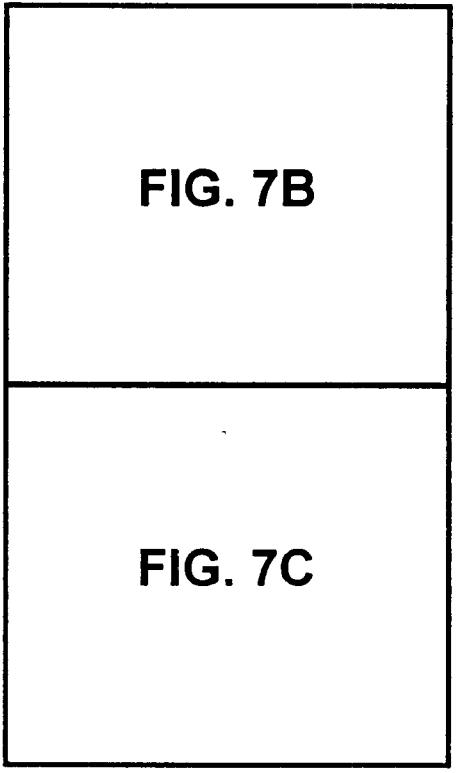
FIGS. 7A–7C are flow diagrams showing process steps for an IDCLSTBX subroutine.
Figure 7B:
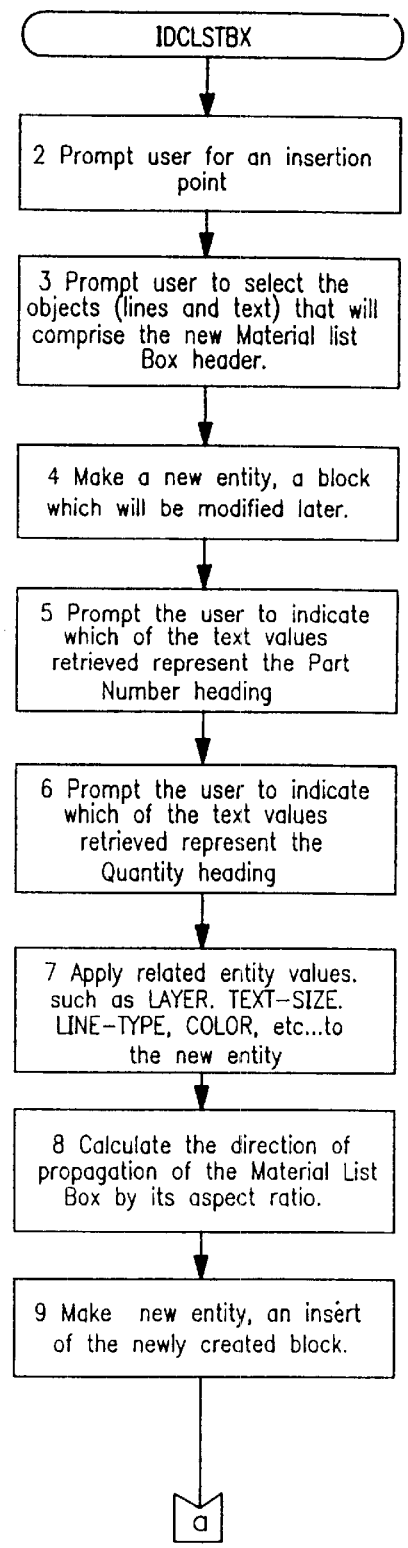
Figure 7C:
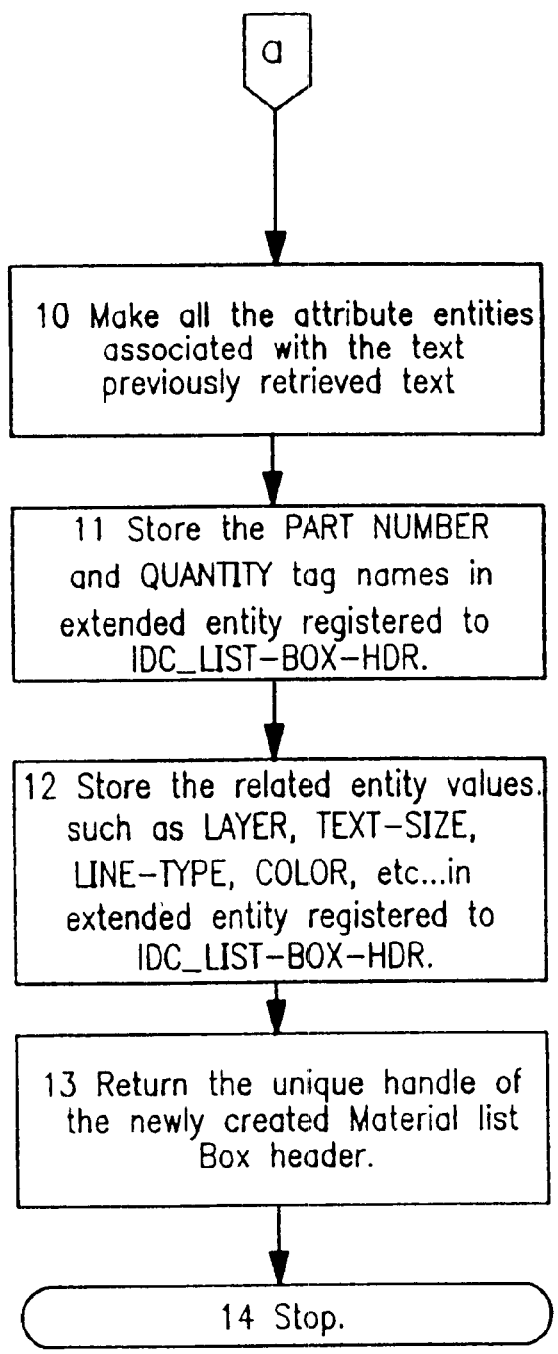

Once the CAD application has been started, the operator can either start a new assembly drawing using a blank template or modify an existing assembly drawing. The blank template is generated by the module IDCLSTBX, as shown in the flow charts in FIGS. 7A–7C. If the operator is modifying an existing drawing, the operator may delete parts from the existing assembly drawing prior to adding new parts by operating the CAD application. Deletion of existing parts need not occur prior to the addition of new parts.

Figure 8A:
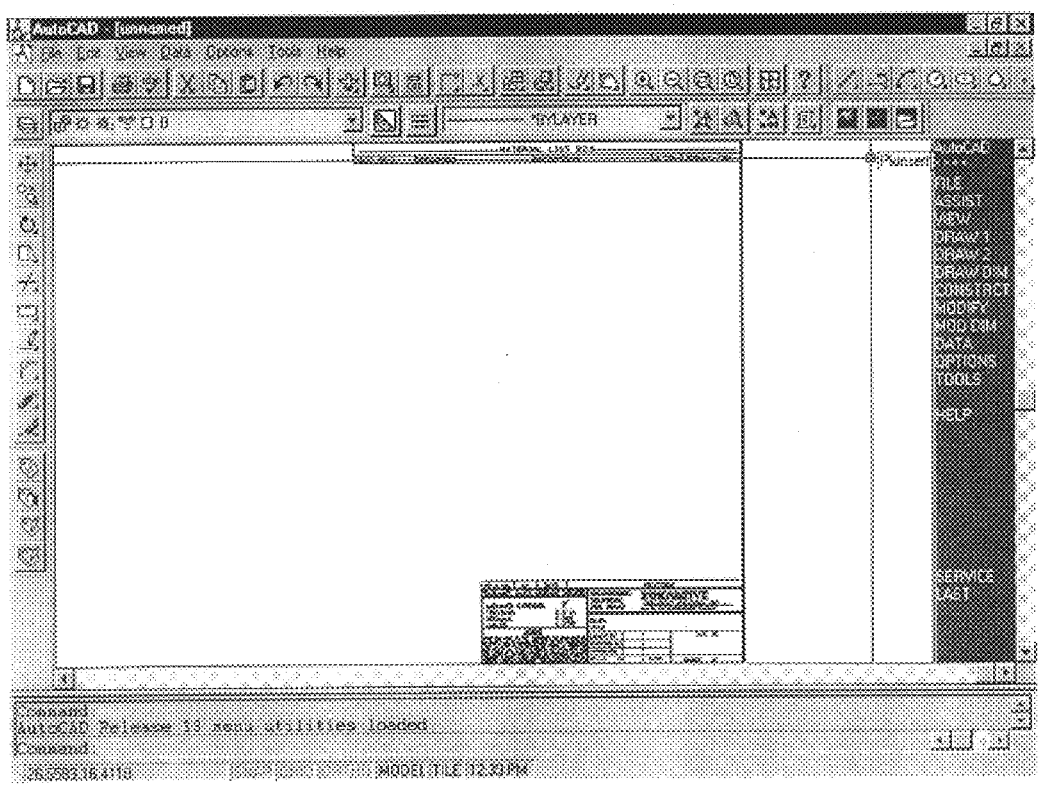
FIGS. 8A–8Q are dialog boxes illustrating showing process steps for an IDC_GET subroutine.
Figure 8B:
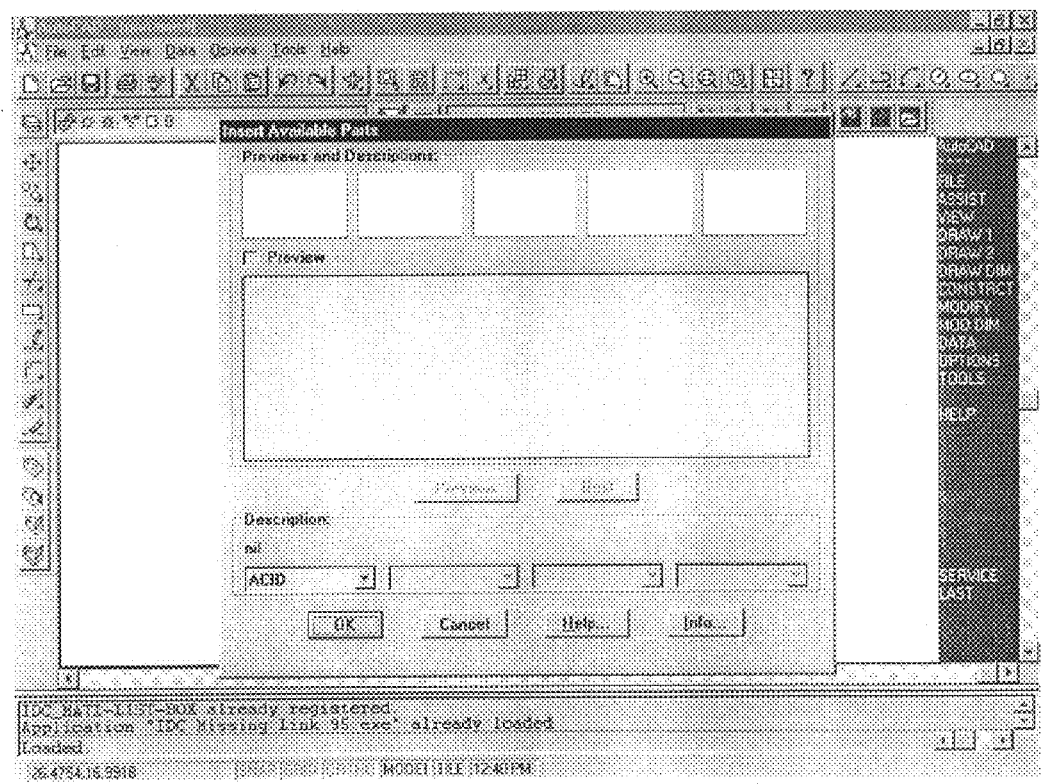
Figure 8C:
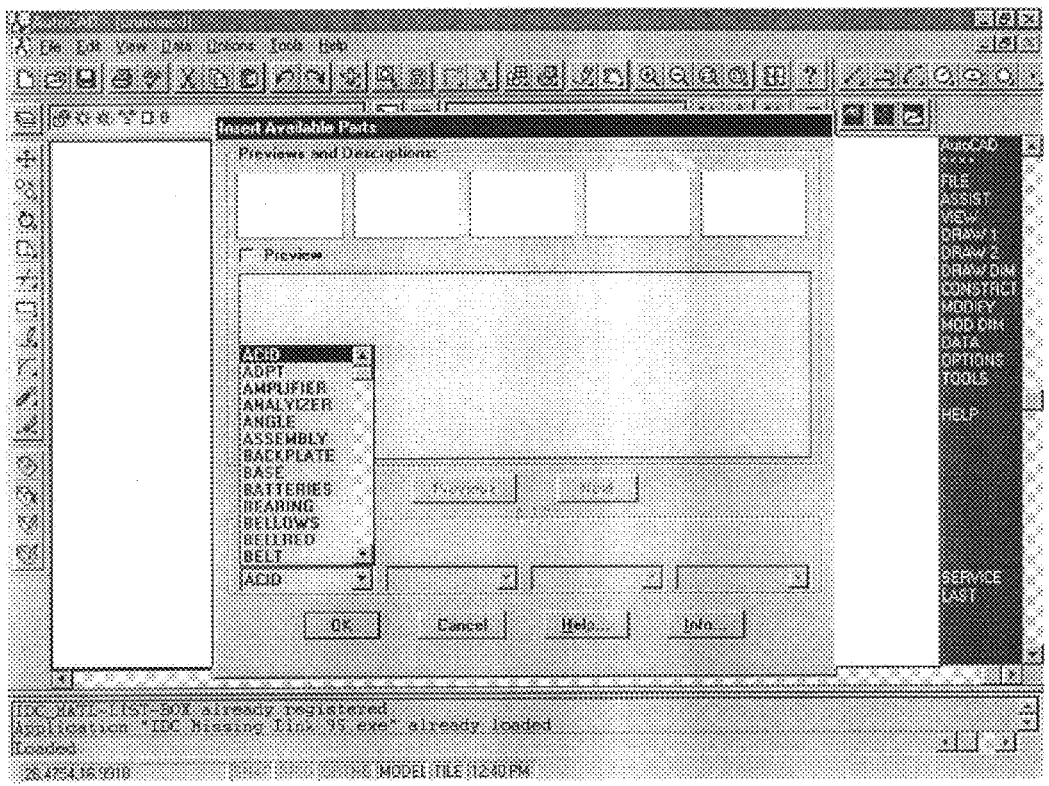
Figure 8D:
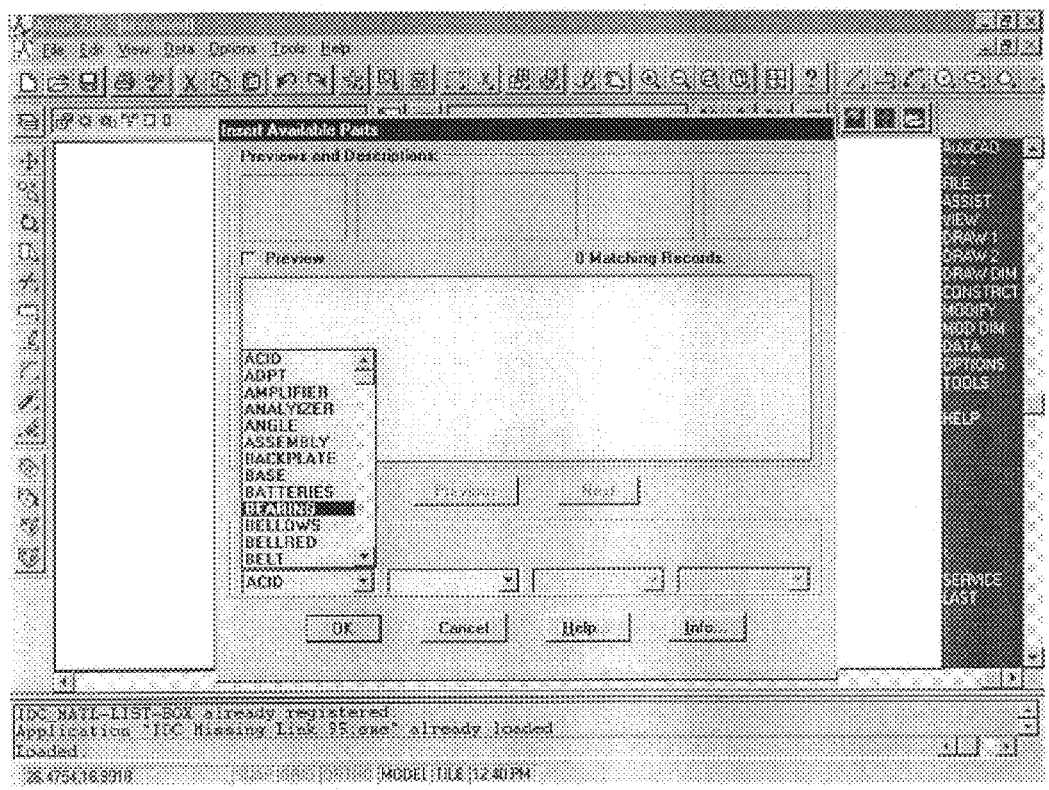
Figure 8E:
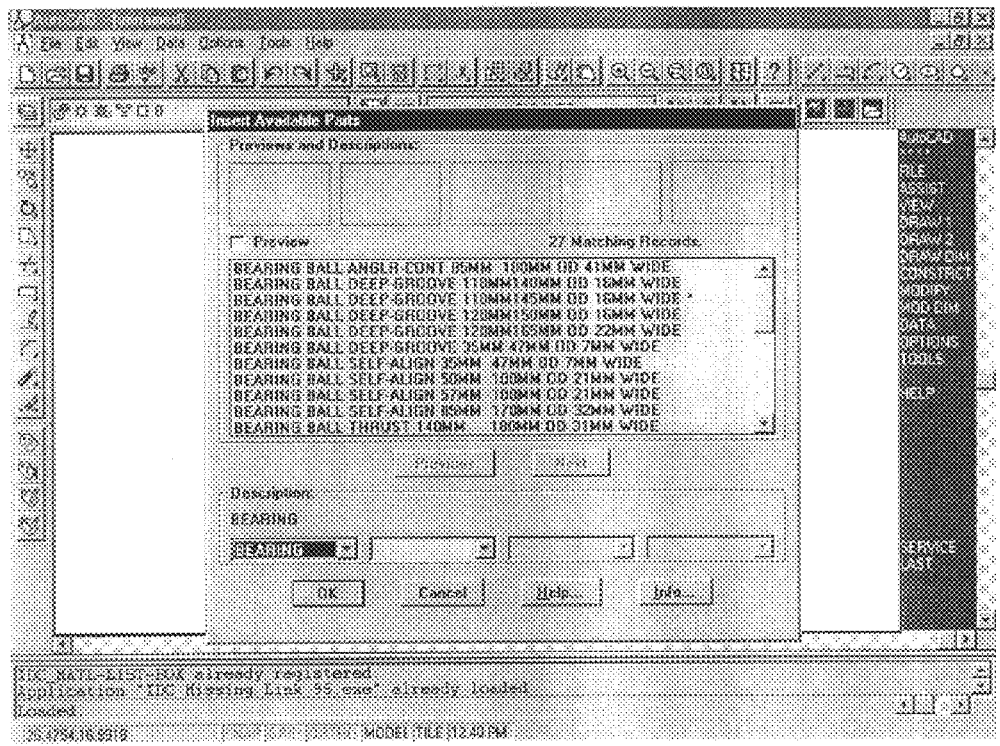
Figure 8F:
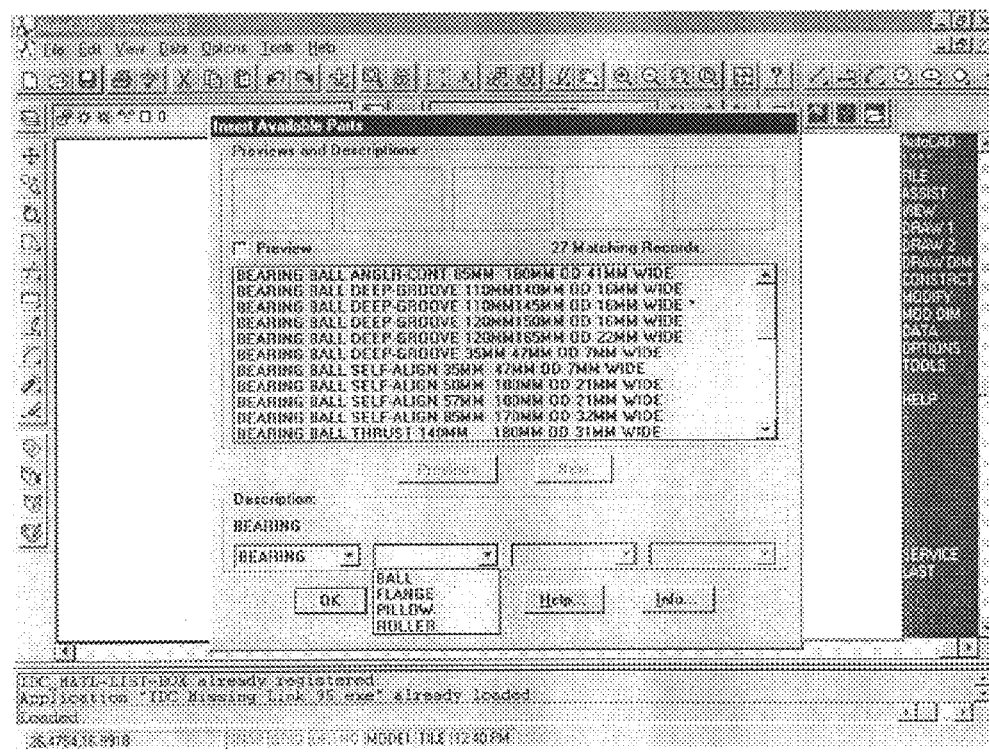
Figure 8G:
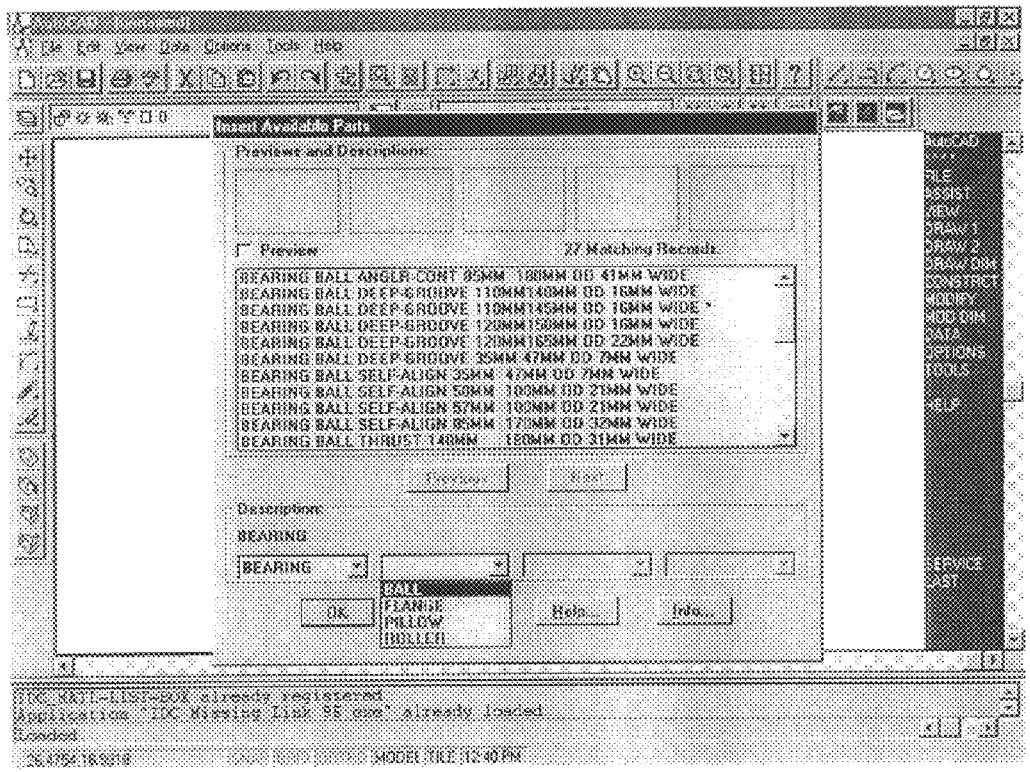
Figure 8H:
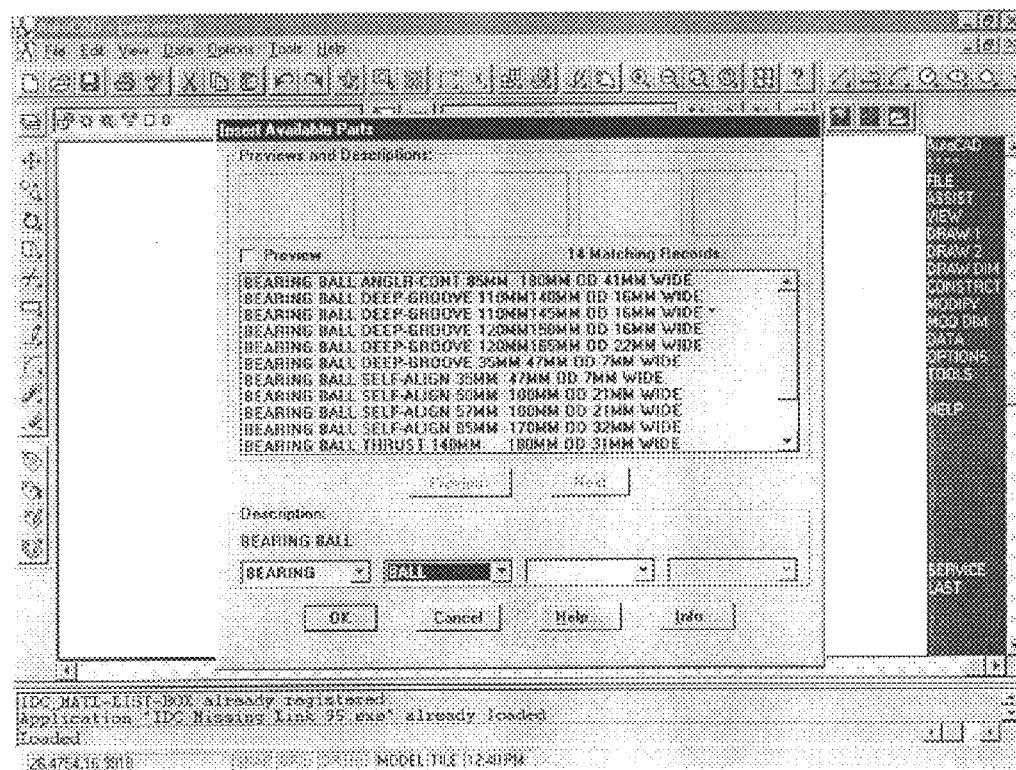
Figure 8I:
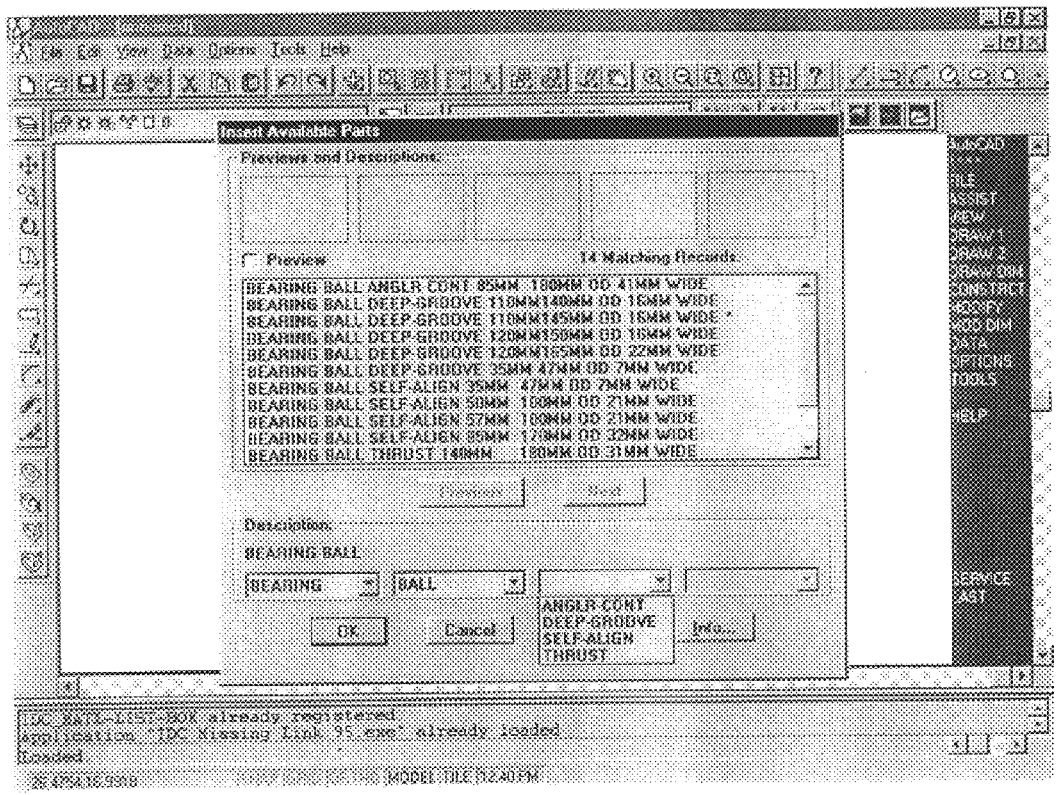
Figure 8J:
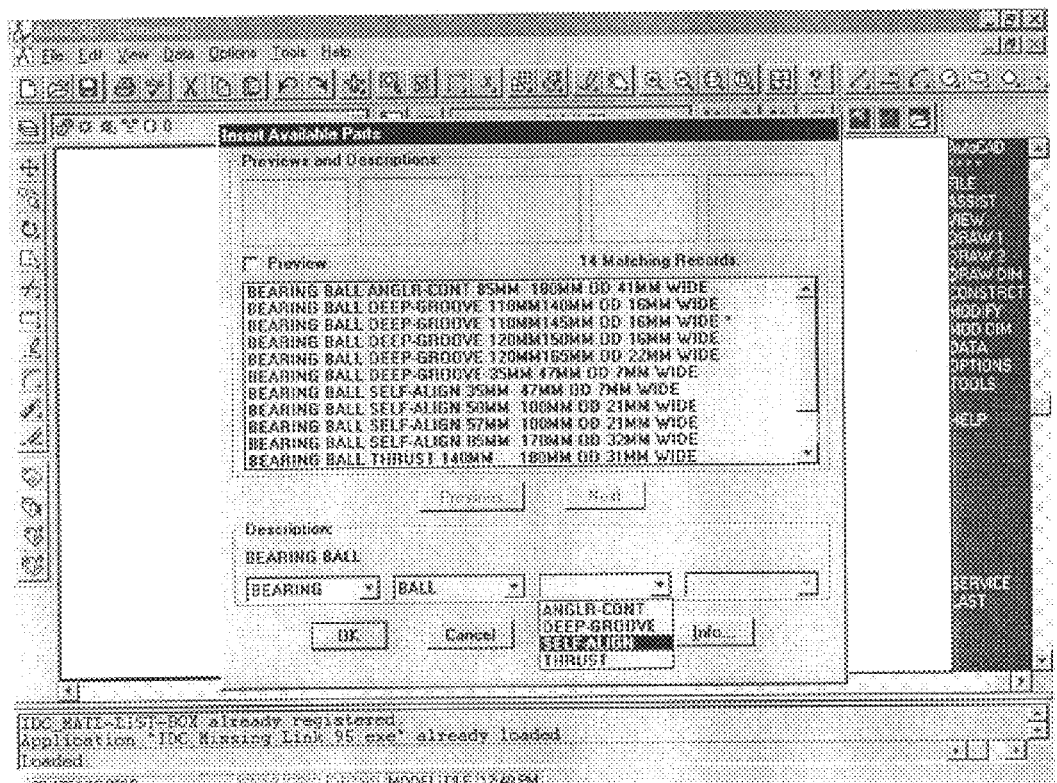
Figure 8K:
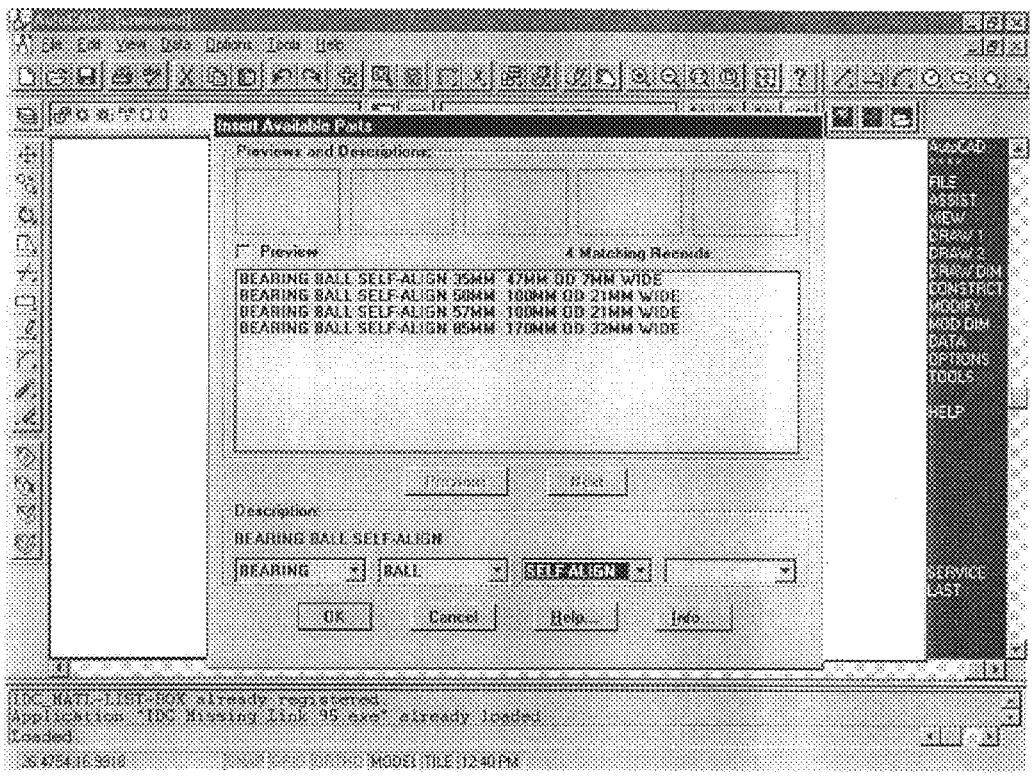
Figure 8L:
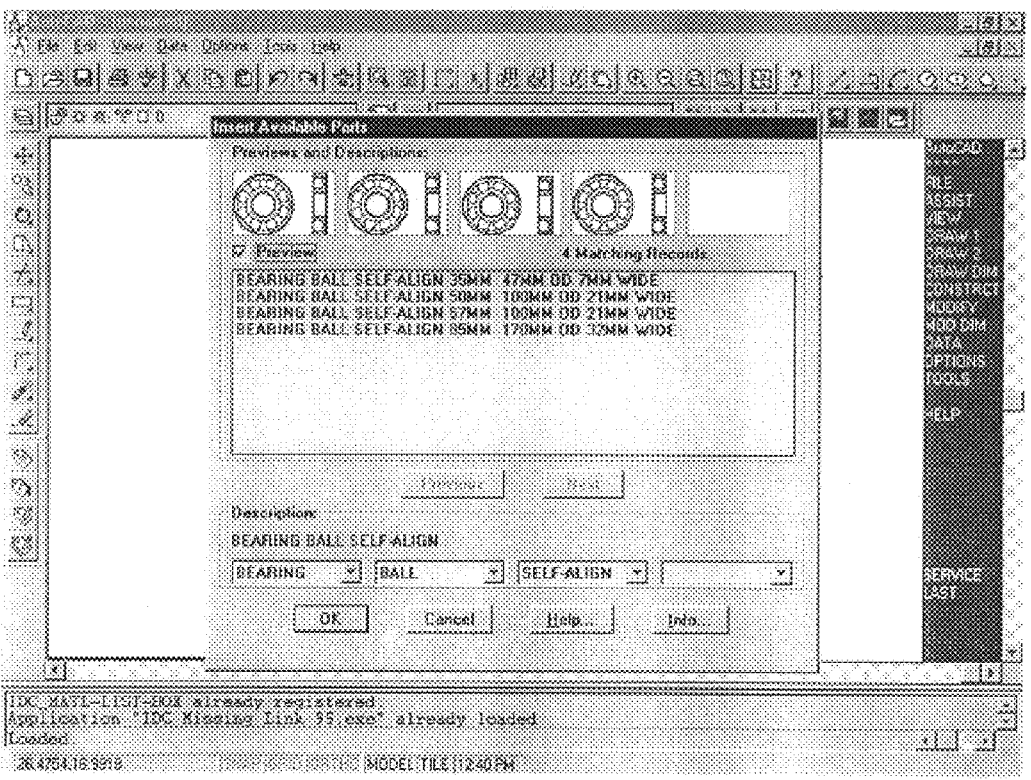
Figure 8M:
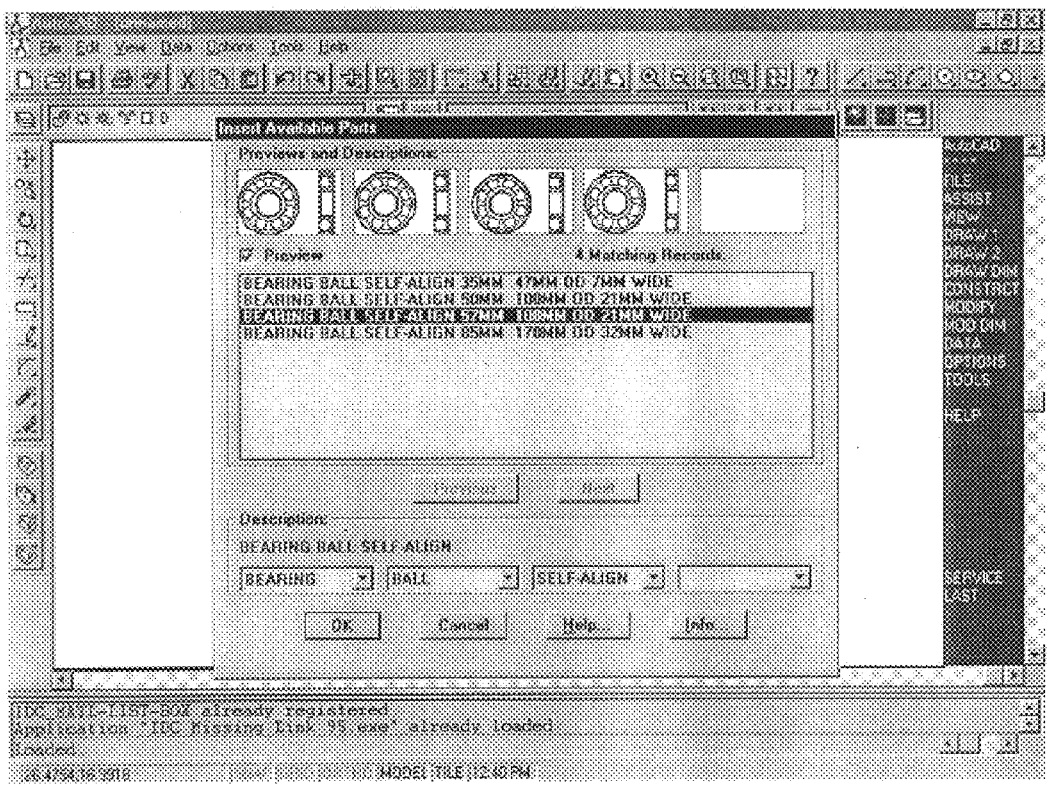
Figure 8N:
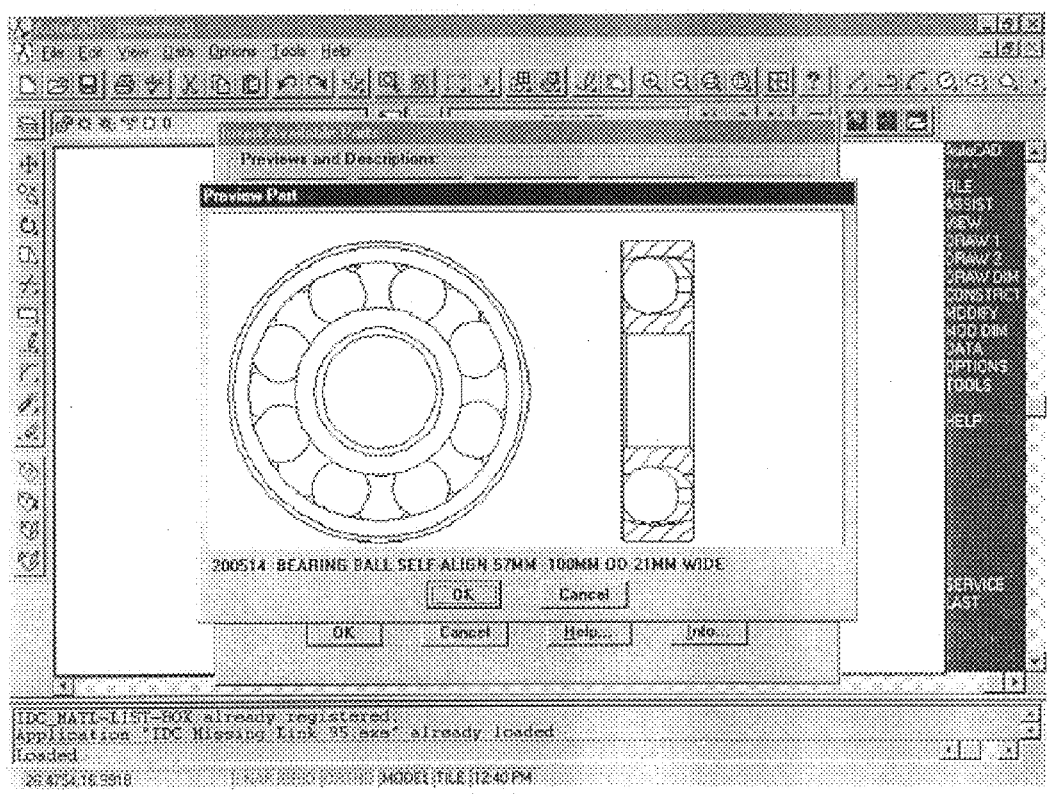
Figure 8O:
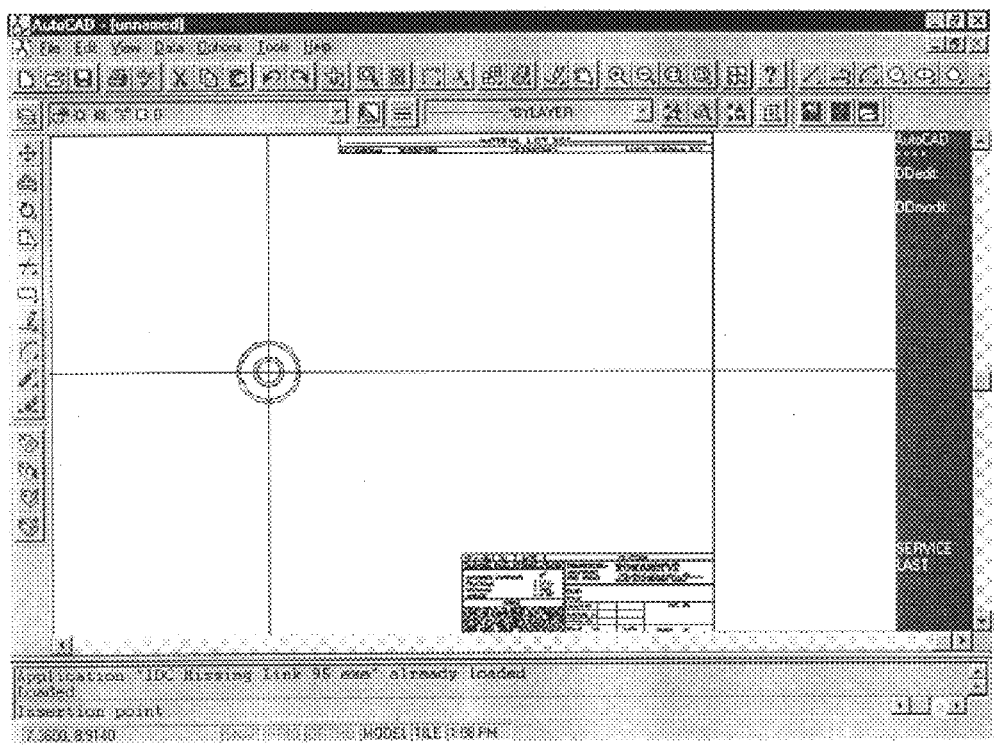
Figure 8P:
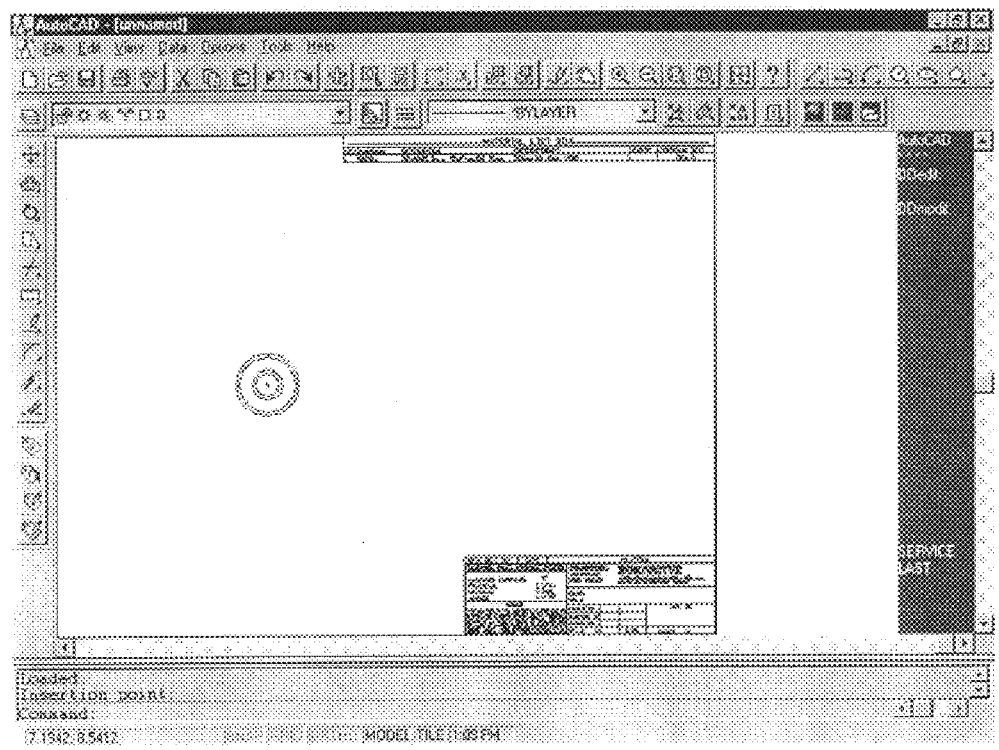
Figure 8Q:
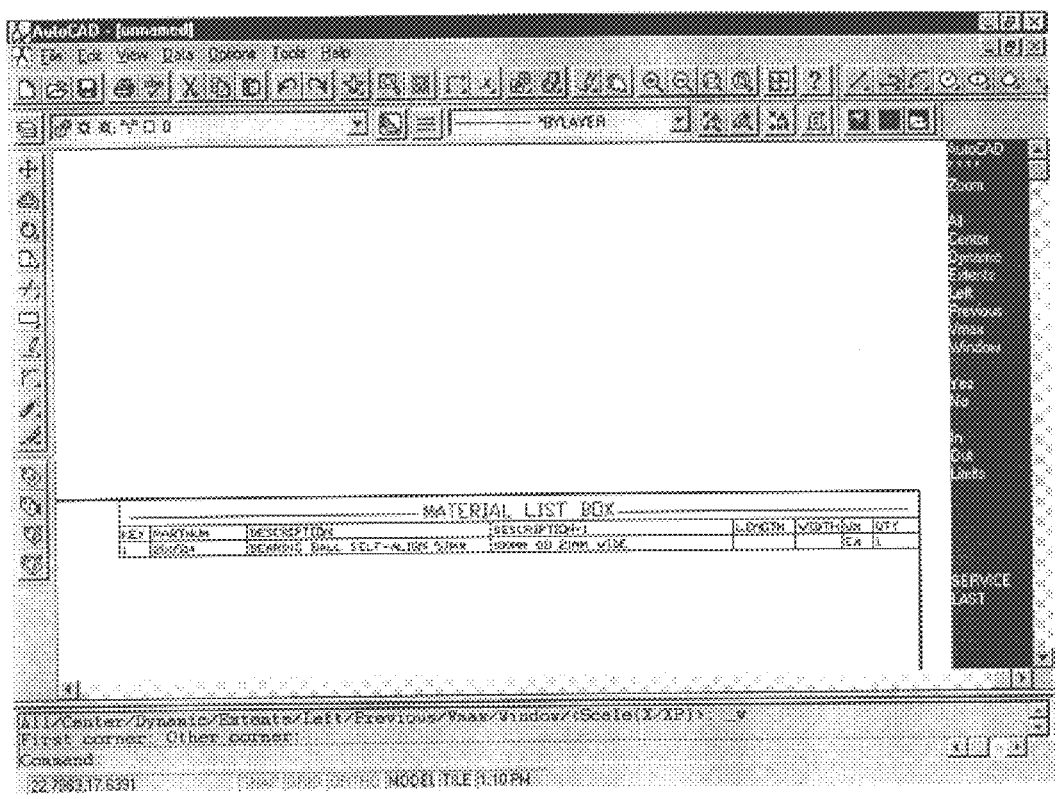

The operator may recall an existing assembly or component drawing for edit. In such case, the IDC_GET module, as shown in FIGS. 8A–8Q, causes IDCLINK to initiate a transfer request to the database thus causing computing equipment 1 to transfer a request within main memory to search the database for the requested assembly or component drawing. IDC_GET initiates a search for the requested drawing and alerts the operator via display if the drawing file is not located in main memory or in the storage device. If found, IDC_GET performs operations on the requested component or assembly drawing, such as, but not limited to, opening, inserting or "x-referencing" the requested drawing.

Adding Parts to an Assembly Drawing

The operator may want to add parts to the assembly drawing currently under edit. The operator can add a part which exists in the database, or can elect to create a new part.

Figure 9:
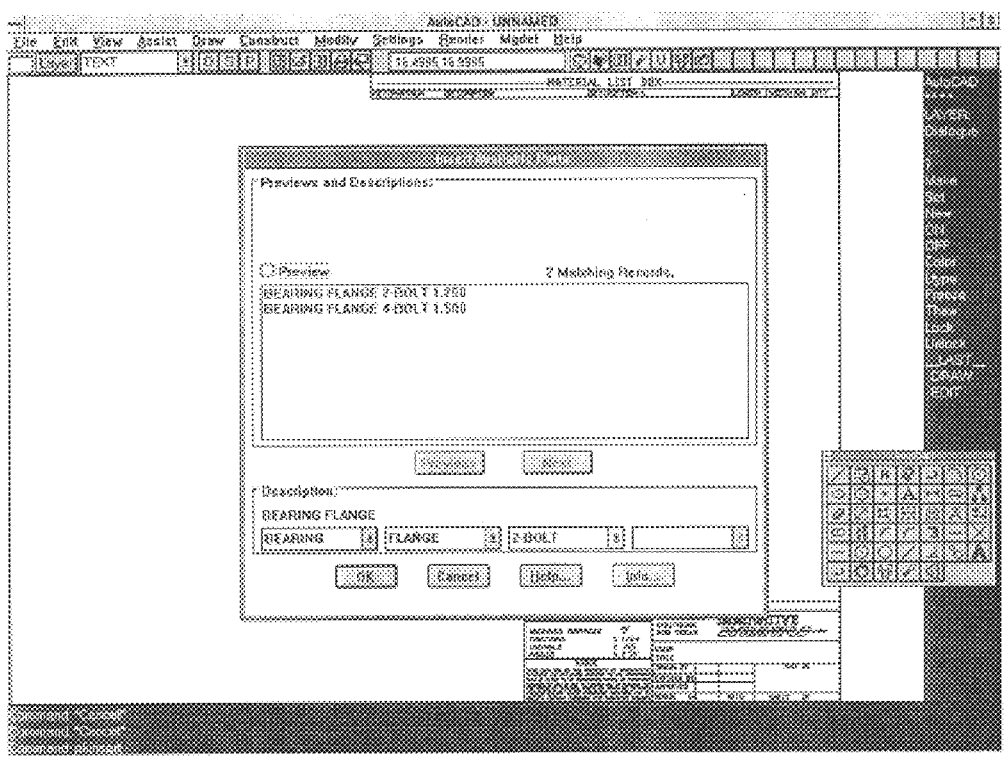
FIG. 9 shows a dialog box illustrating PKINSERT command.
Figure 10A:
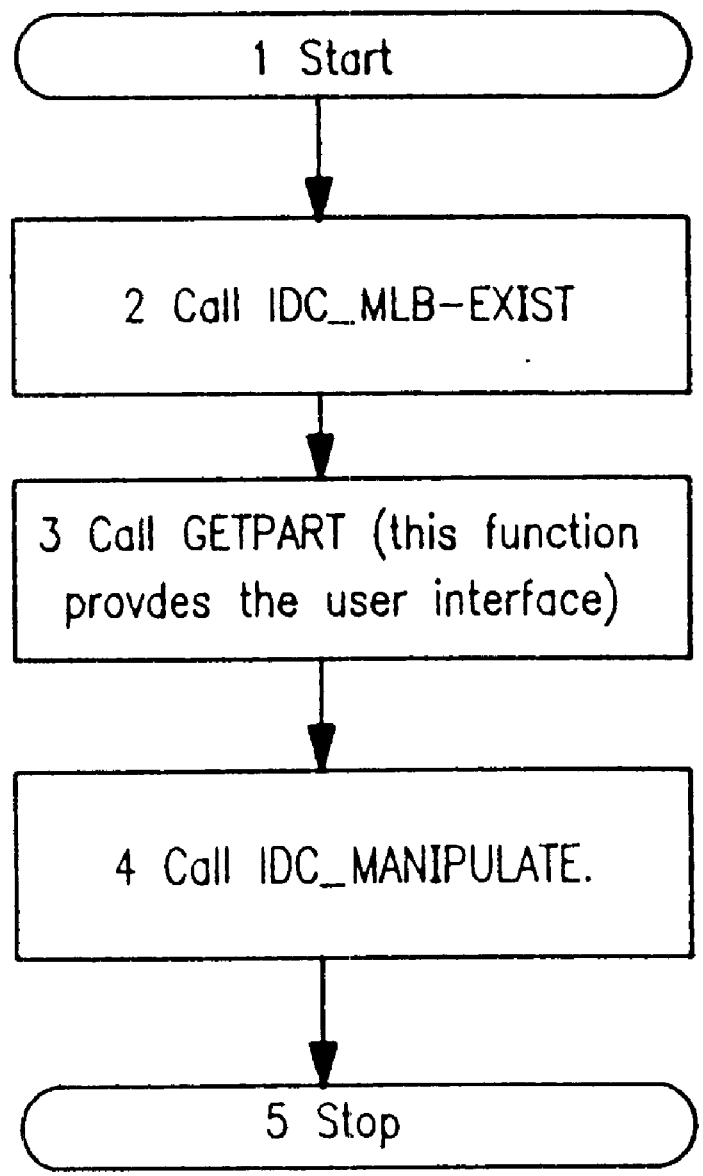
Figure 10B:
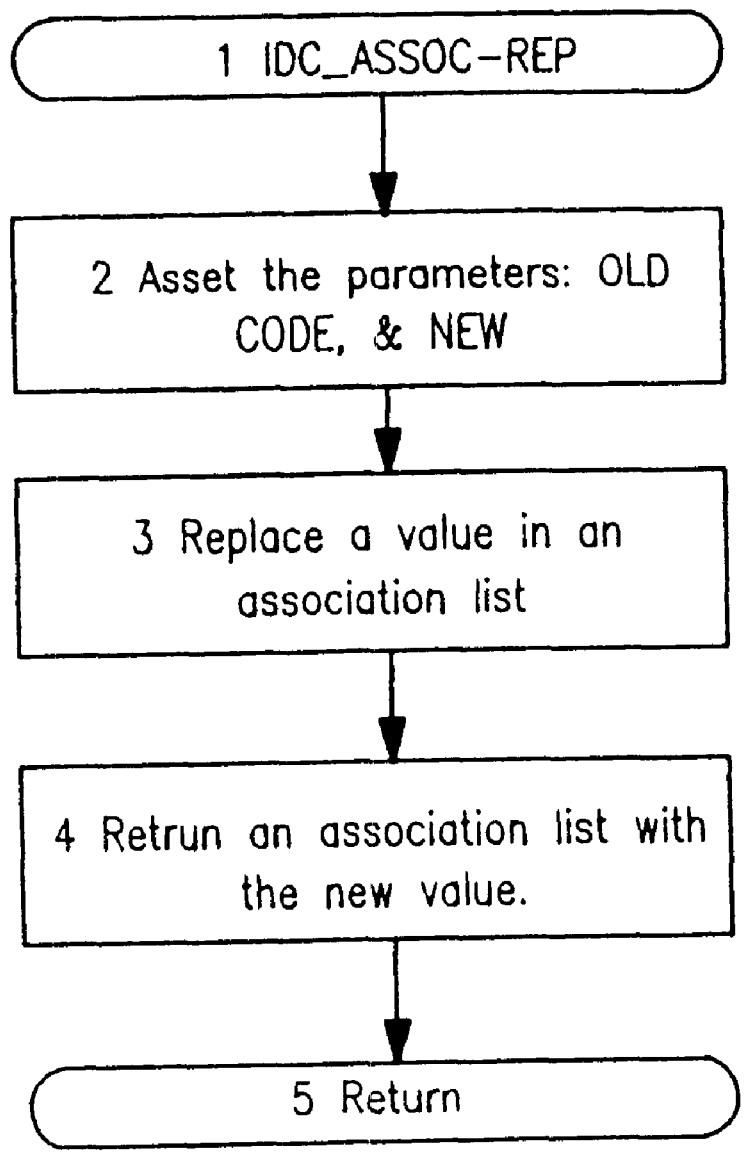
Figure 10C:
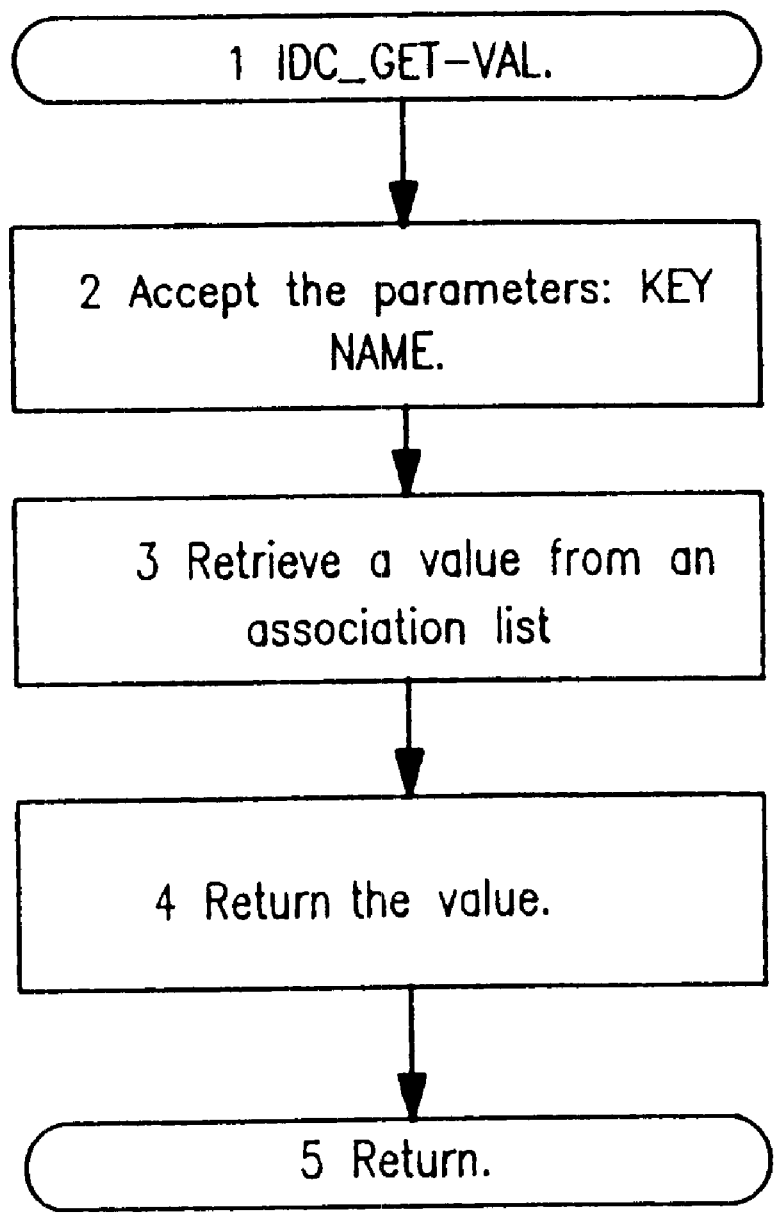
Figure 10E:
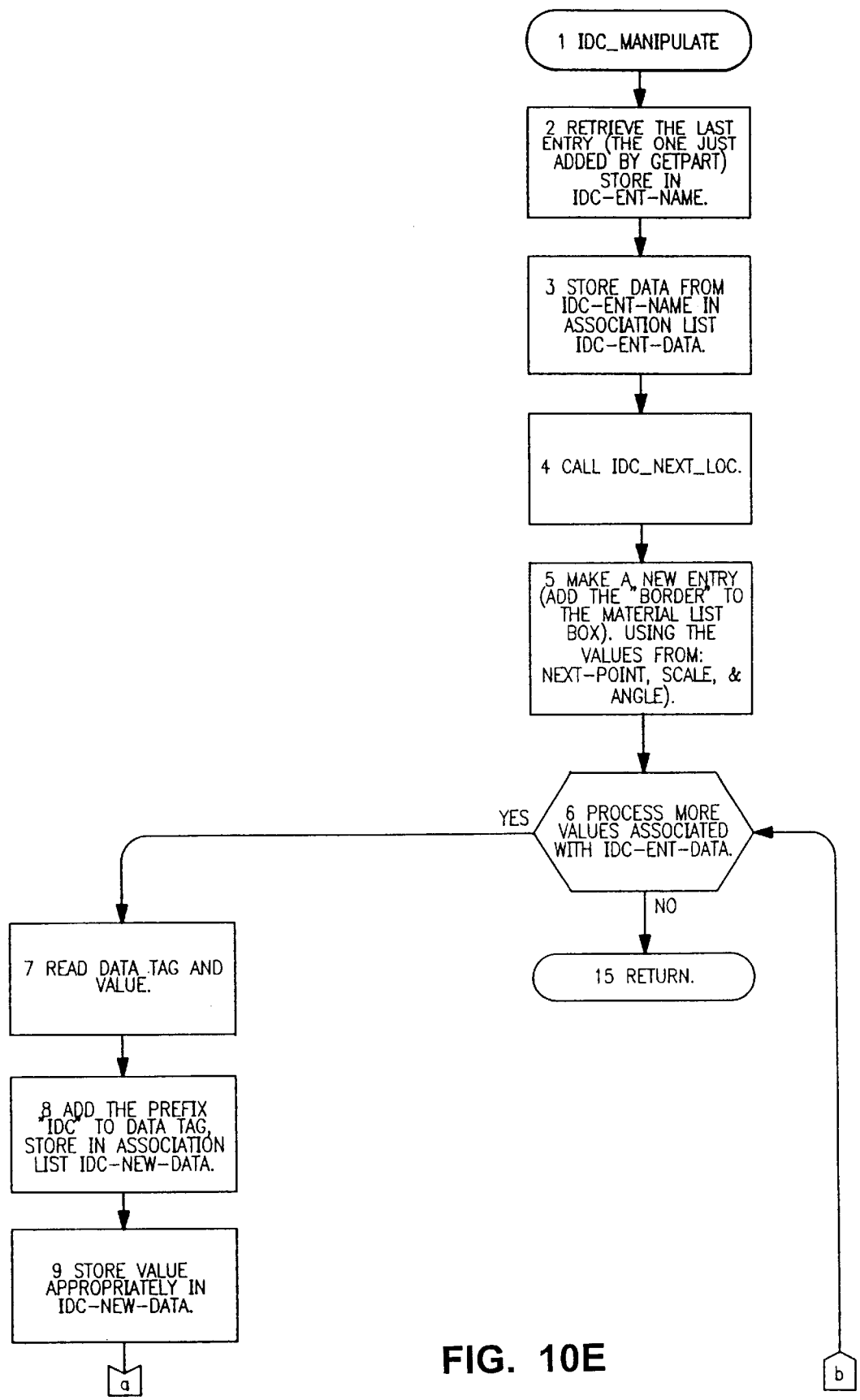
Figure 10F:
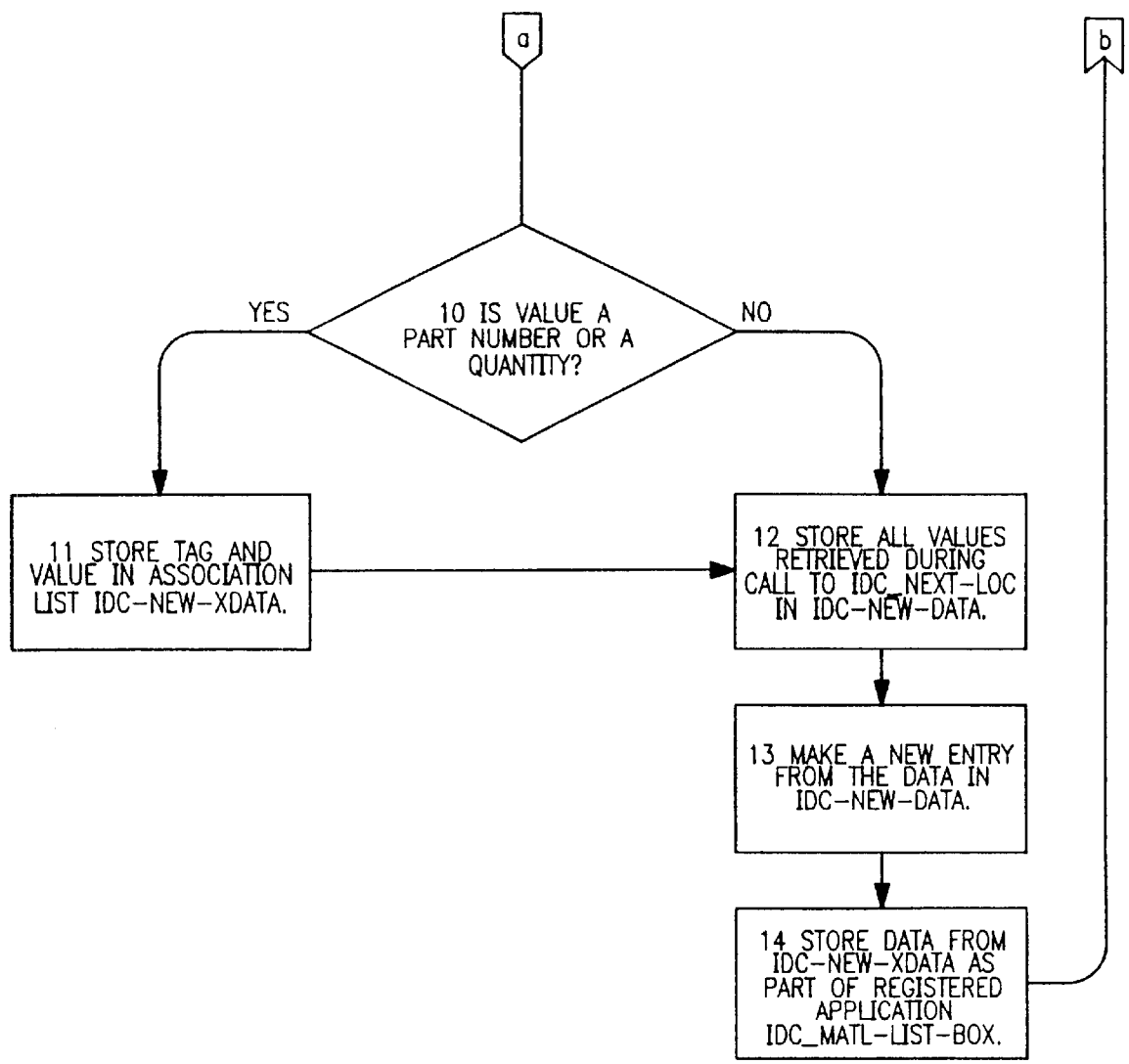
Figure 10H:
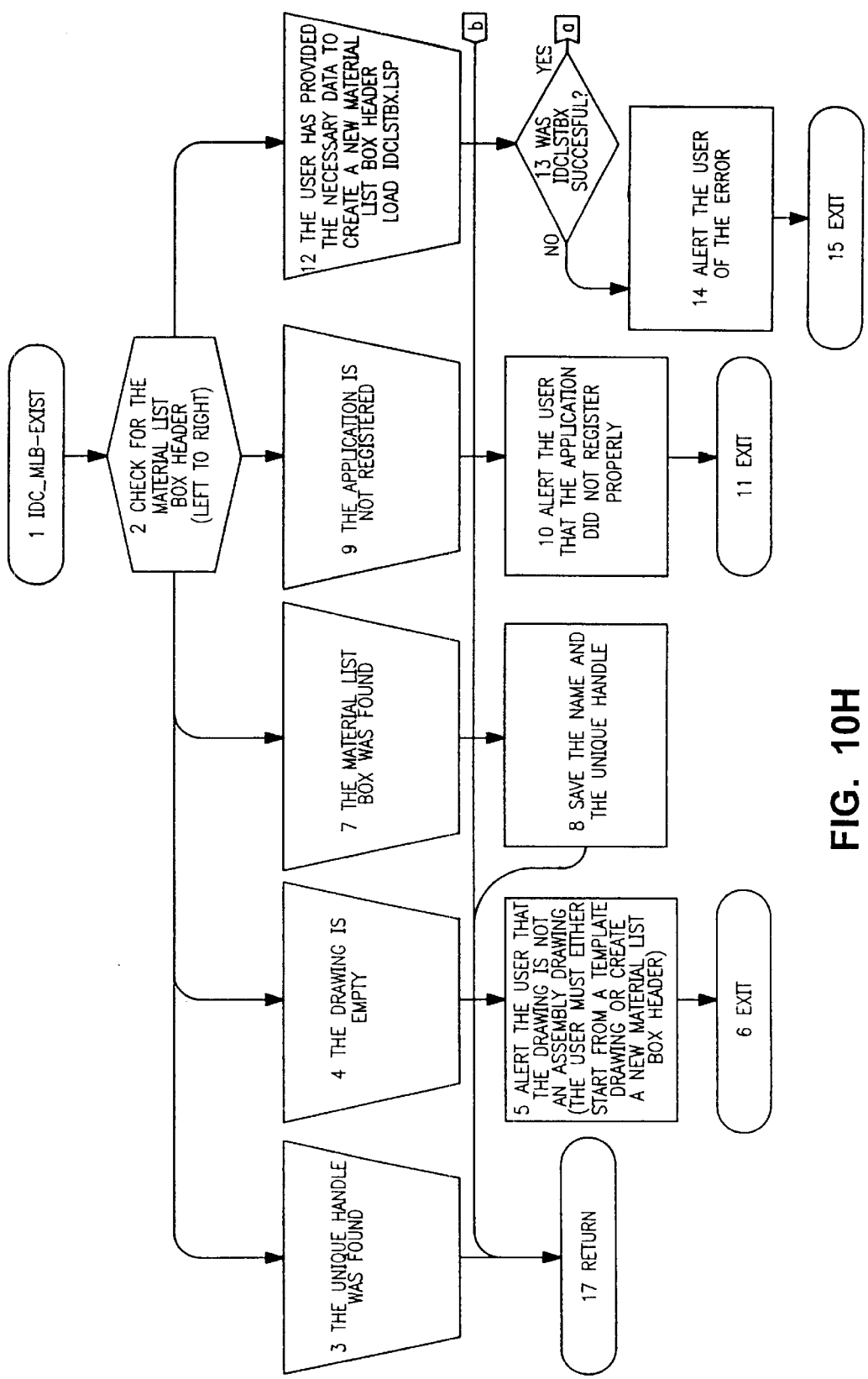
Figure 10I:
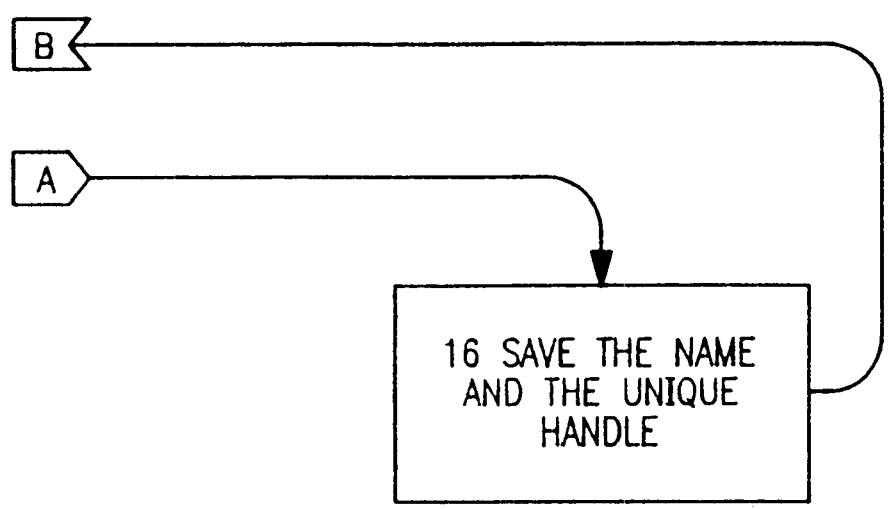
Figure 10J:
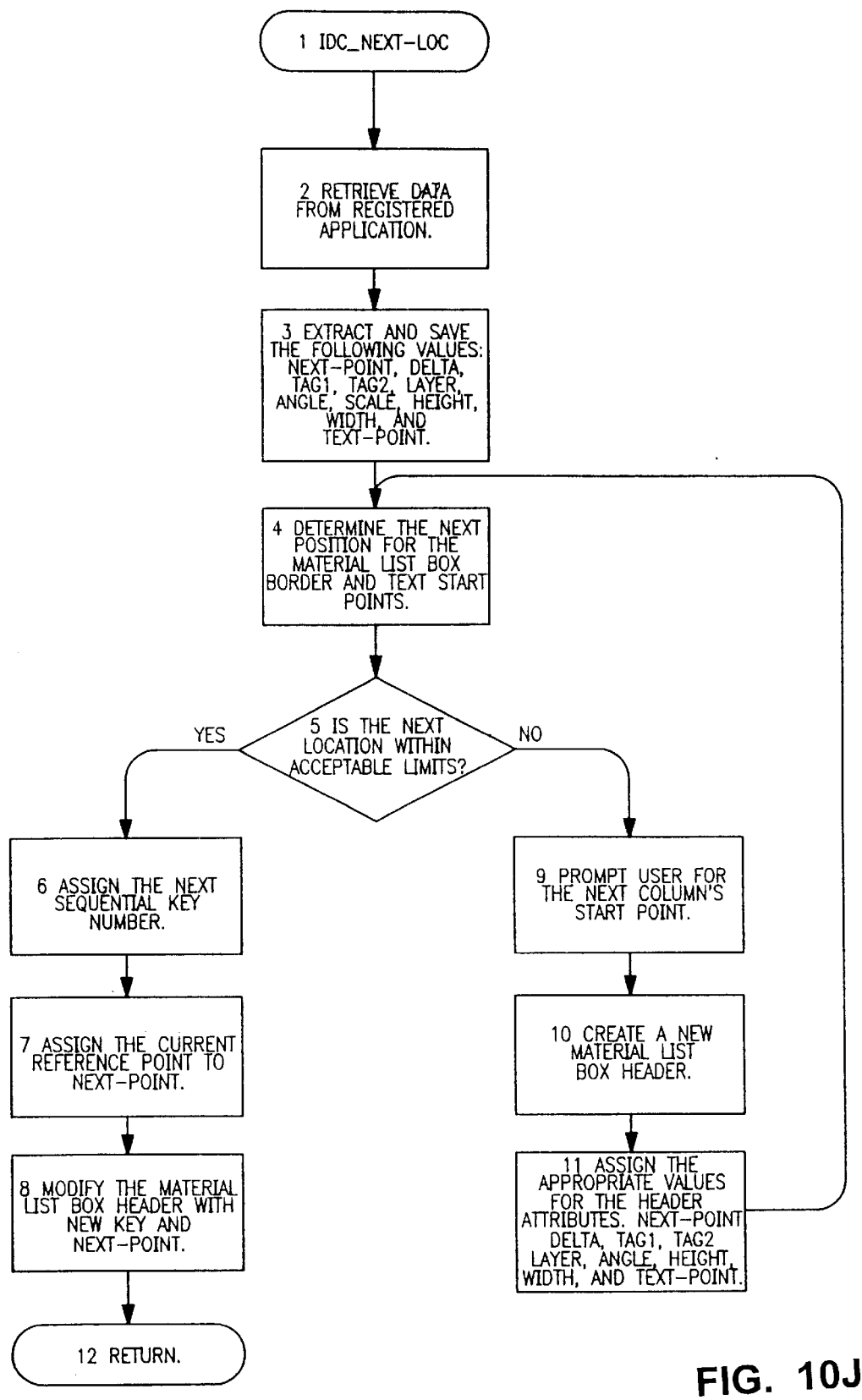
Figure 11A:
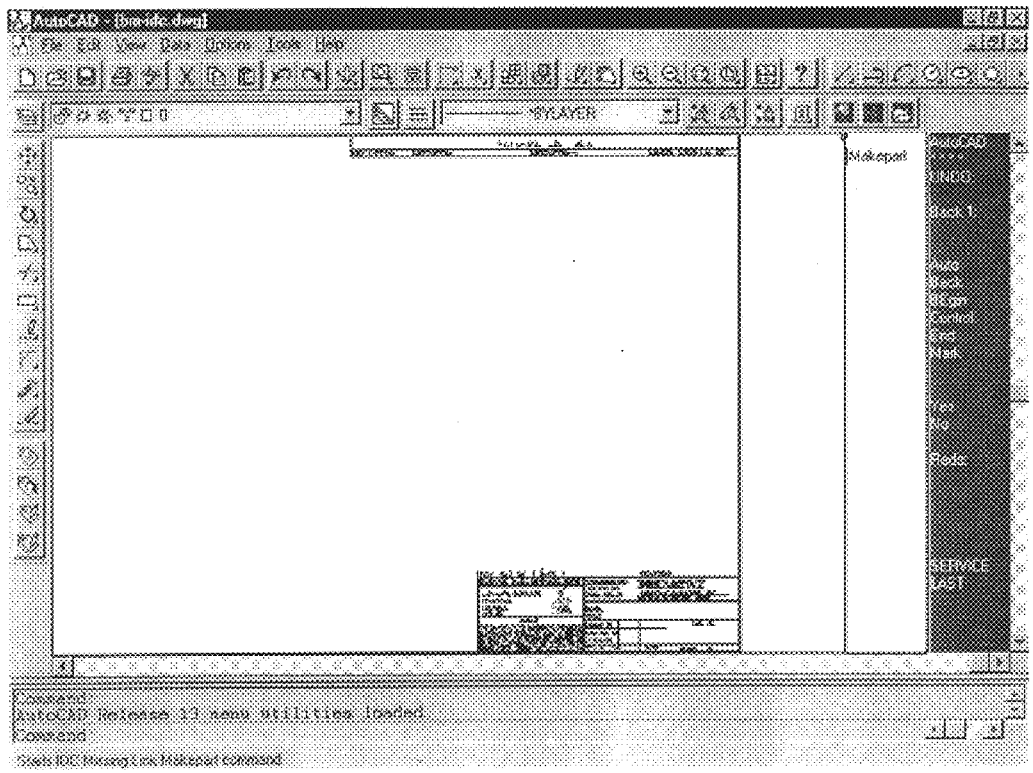
FIGS. 11A–11KK are dialog boxes illustrating MAKEPART command.
Figure 11B:
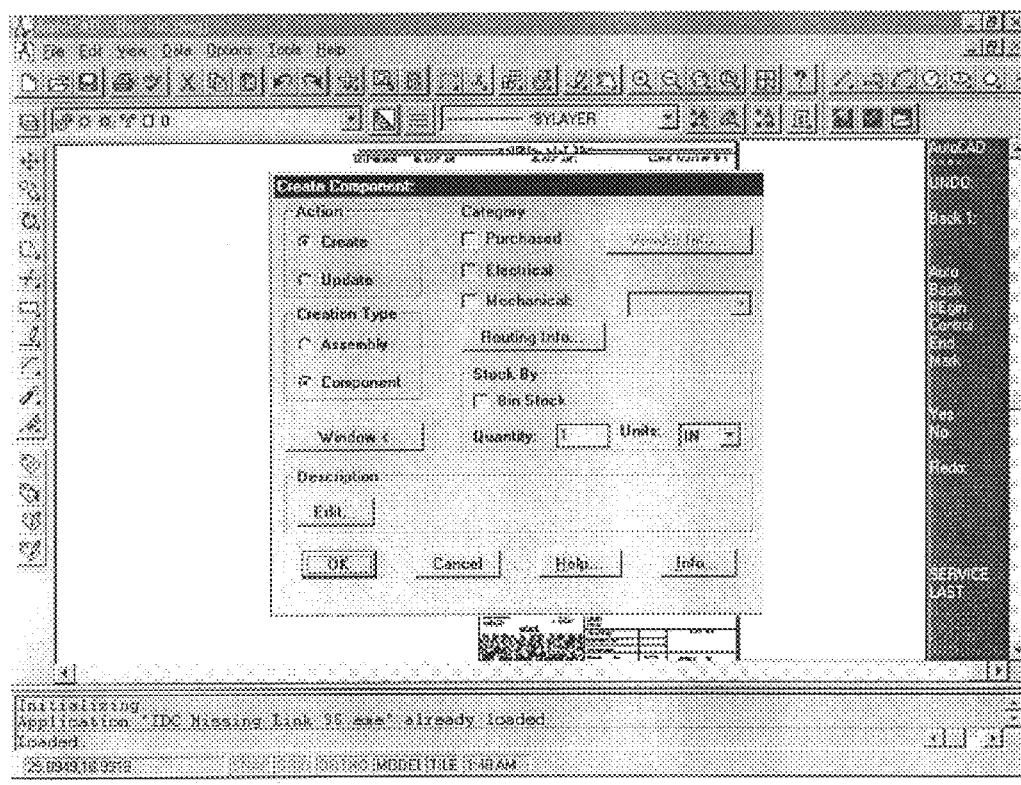
Figure 11C:
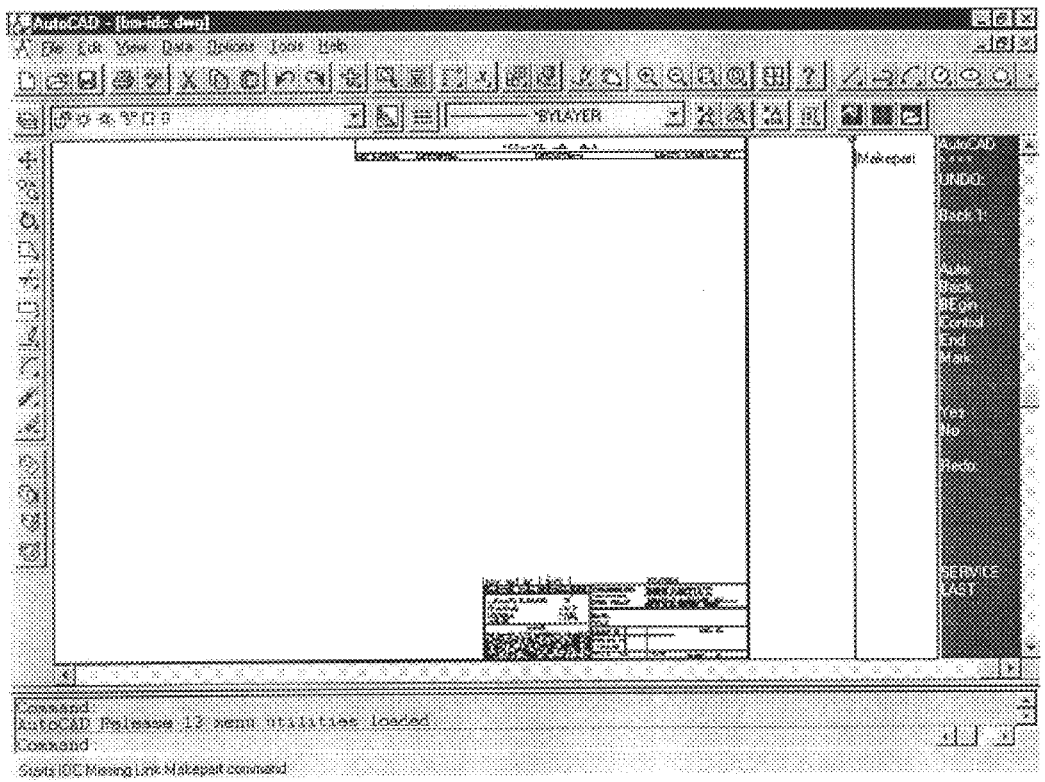
Figure 11D:
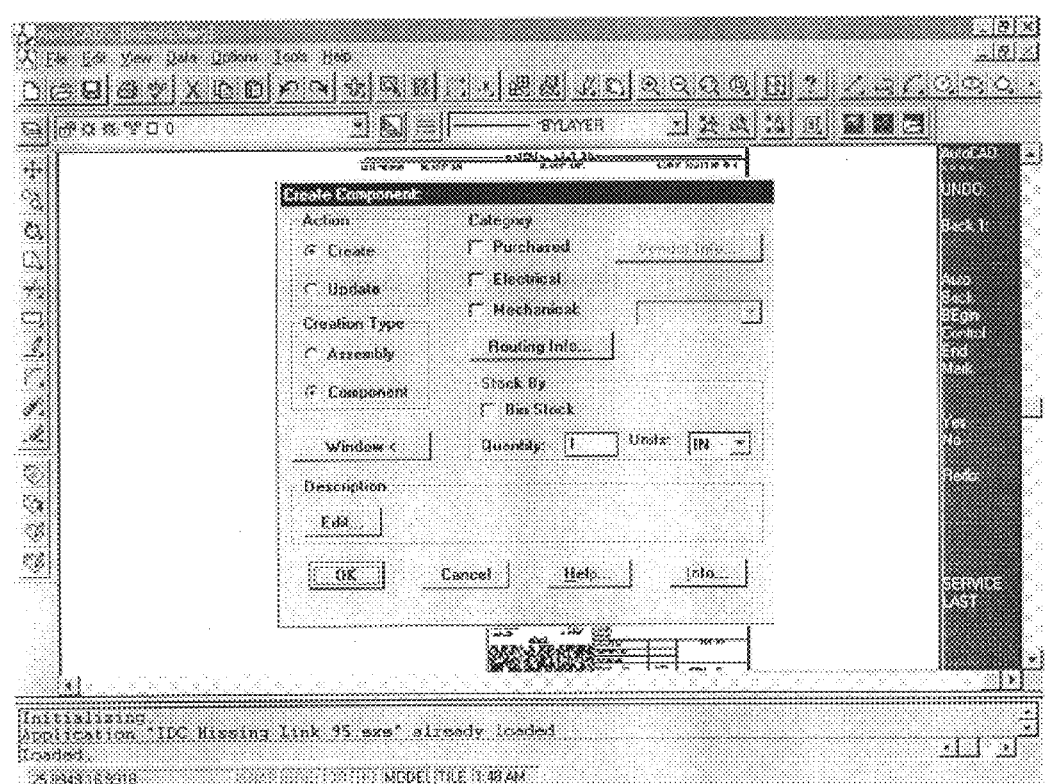
Figure 11E:
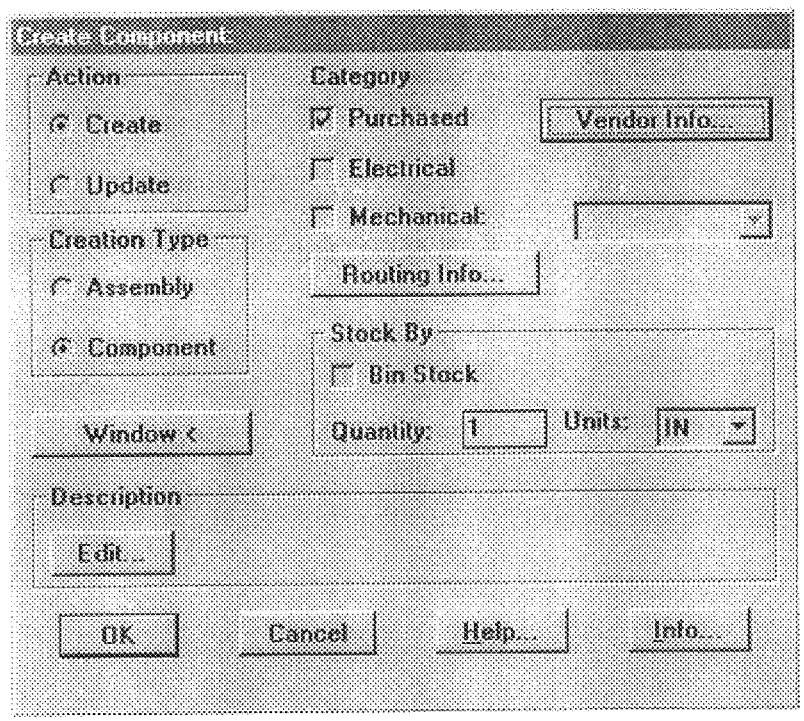
Figure 11F:
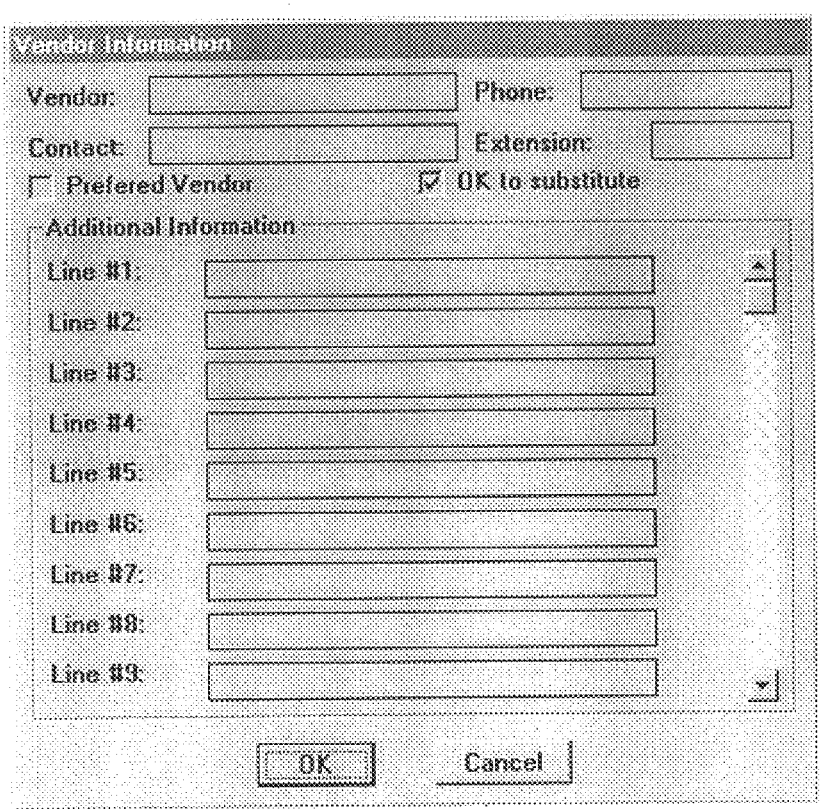
Figure 11I:
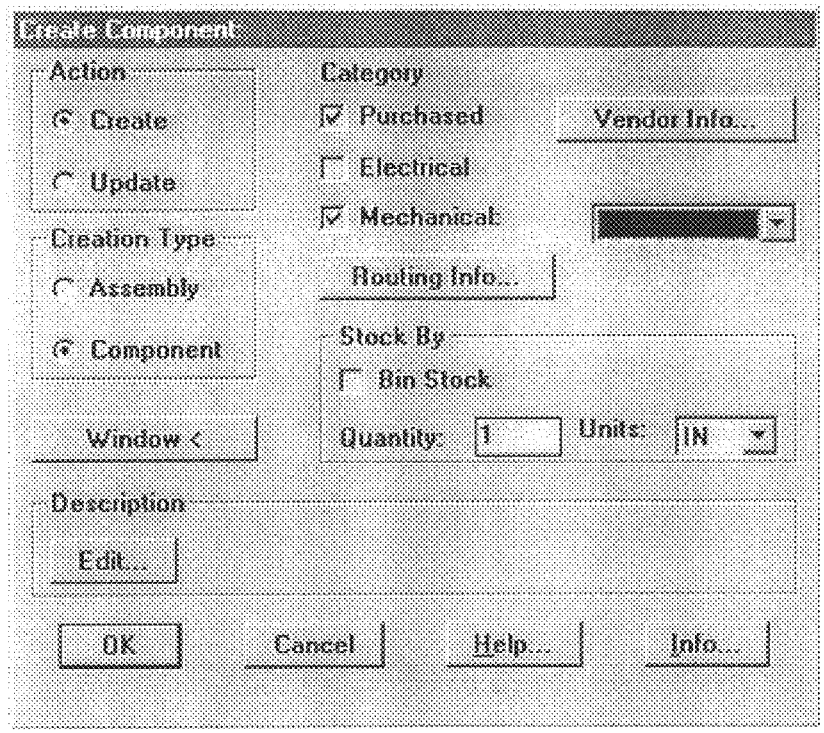
Figure 11J:
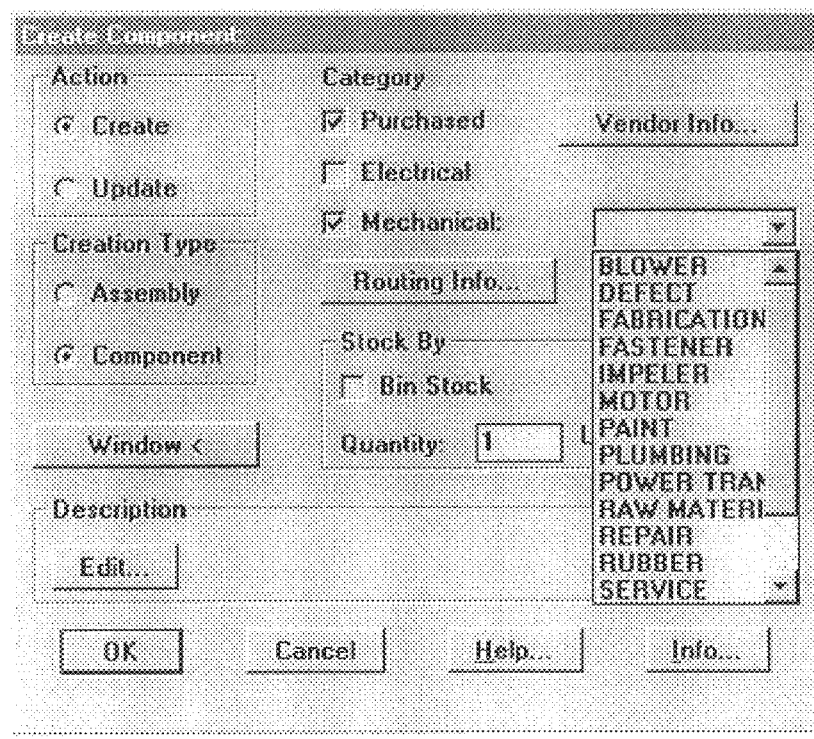
Figure 11K:
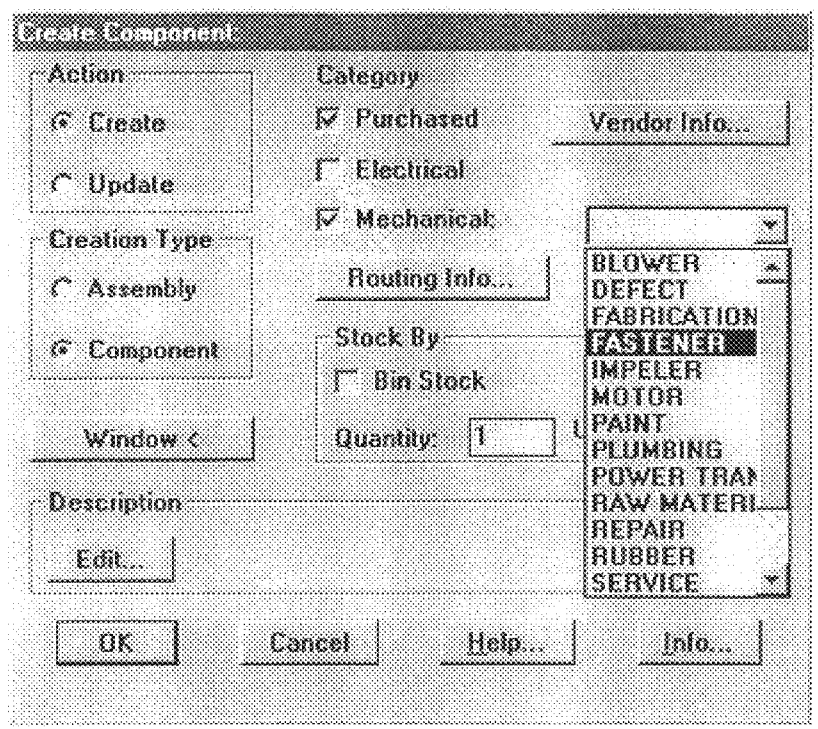
Figure 11L:
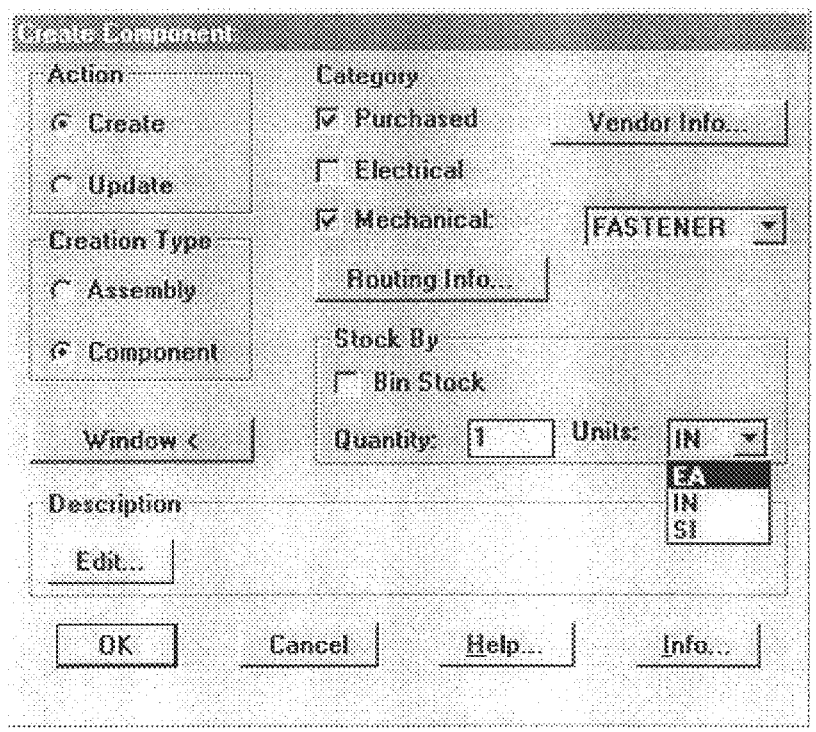
Figure 11M:
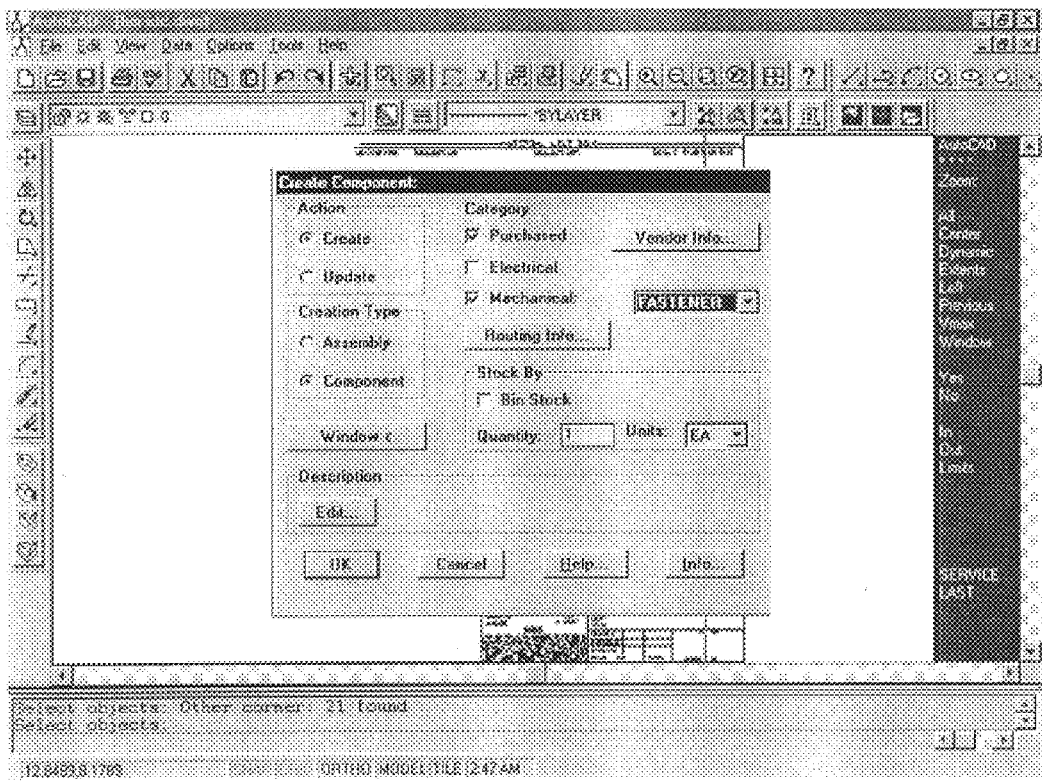
Figure 11N:
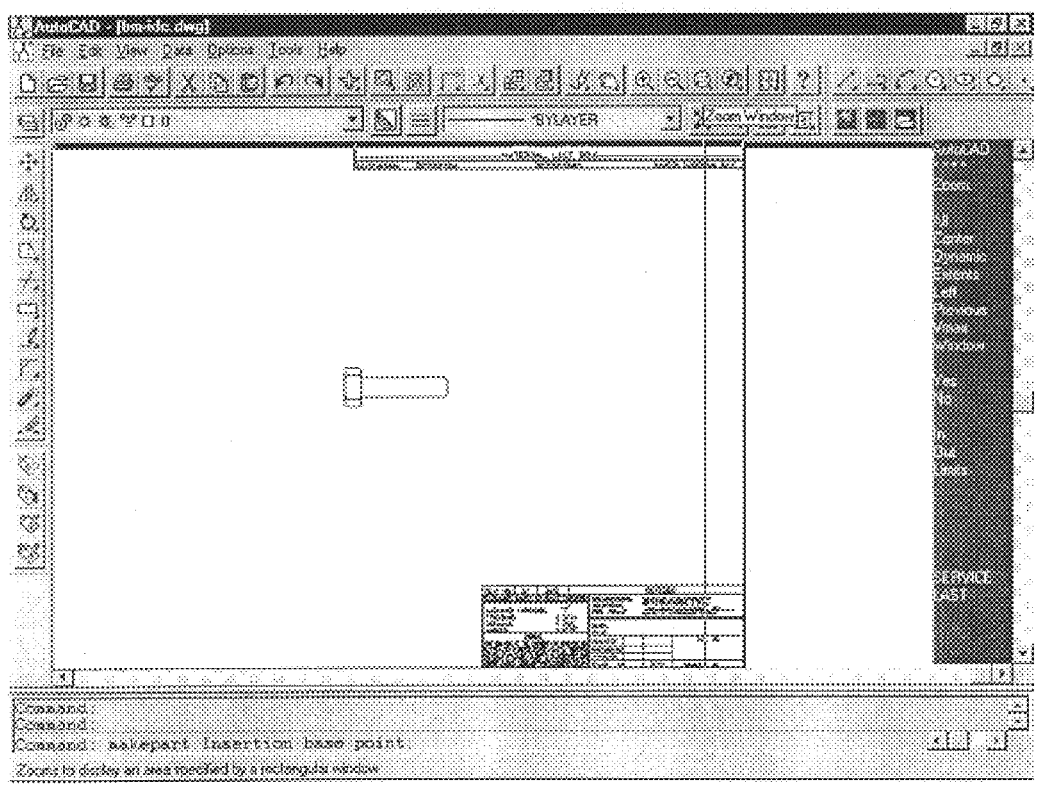
Figure 11O:
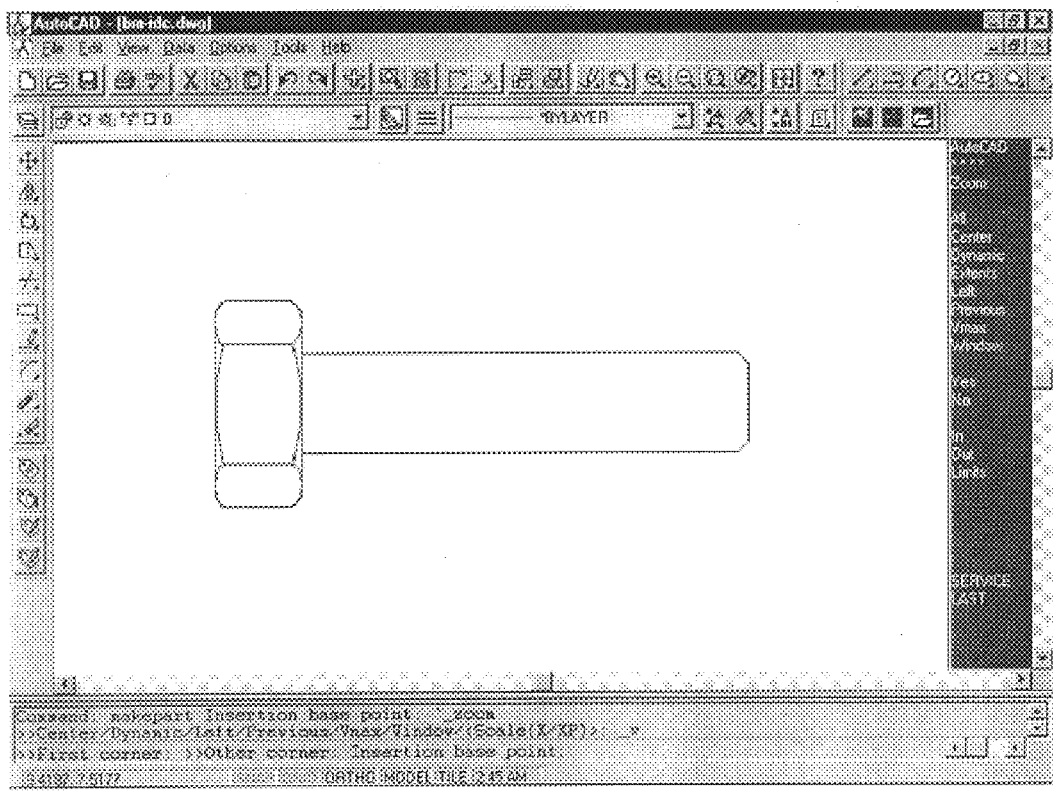
Figure 11P:
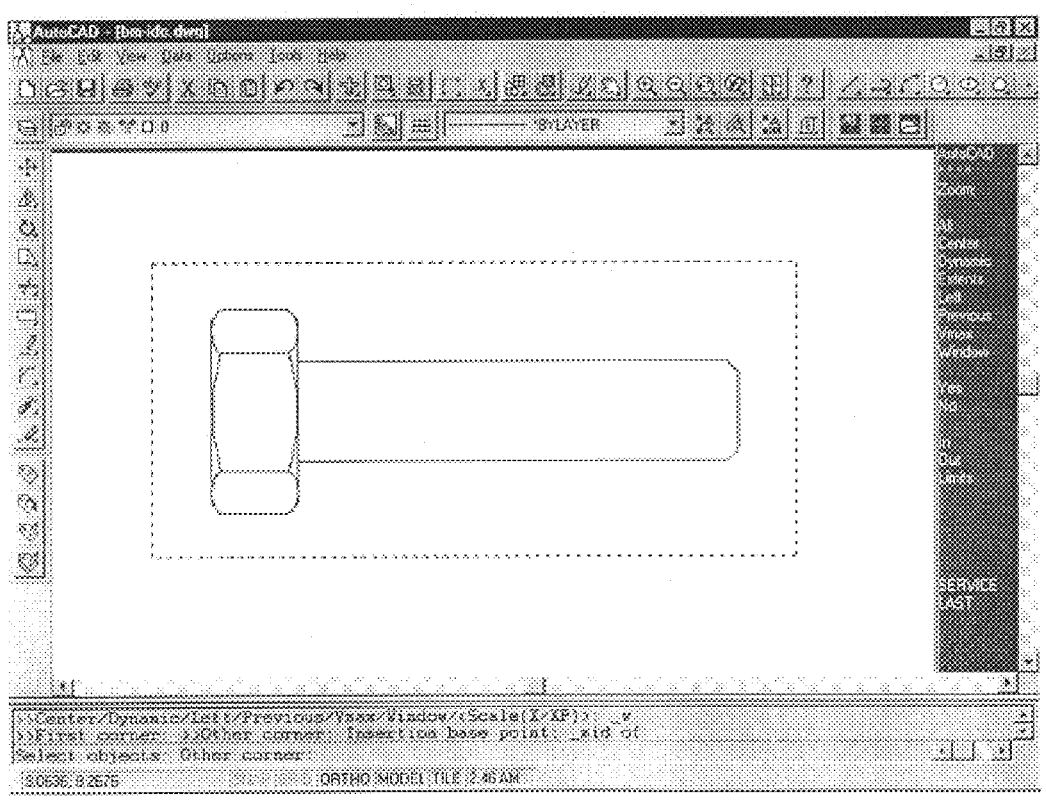
Figure 11Q:
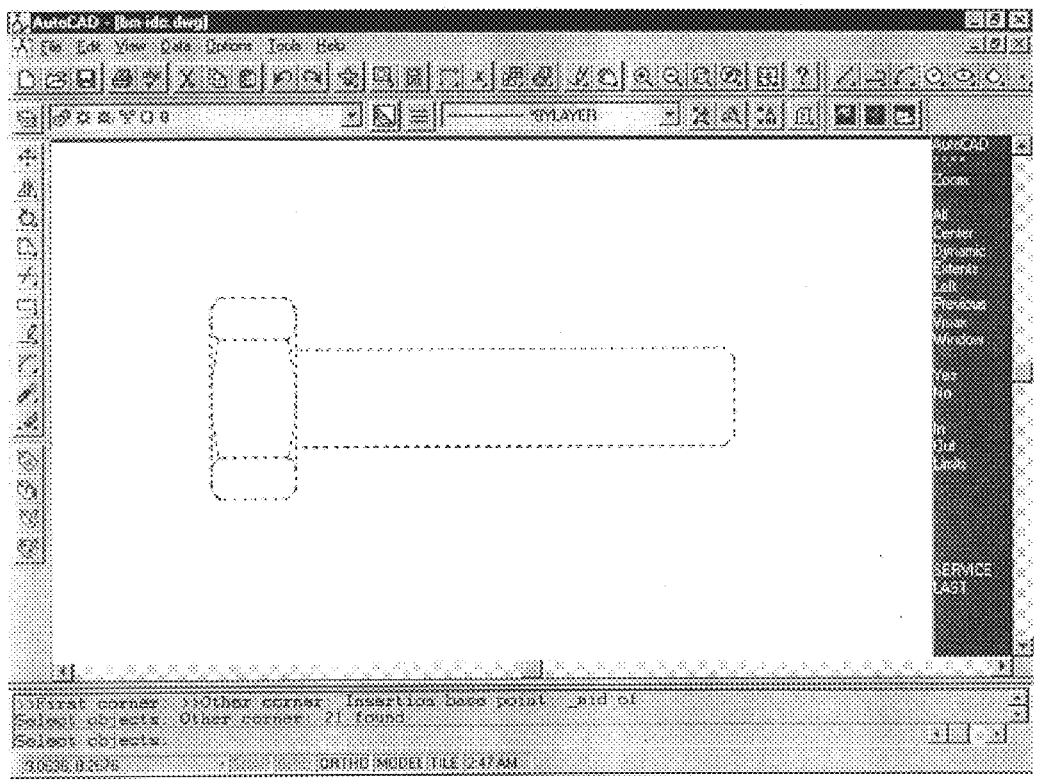
Figure 11R:
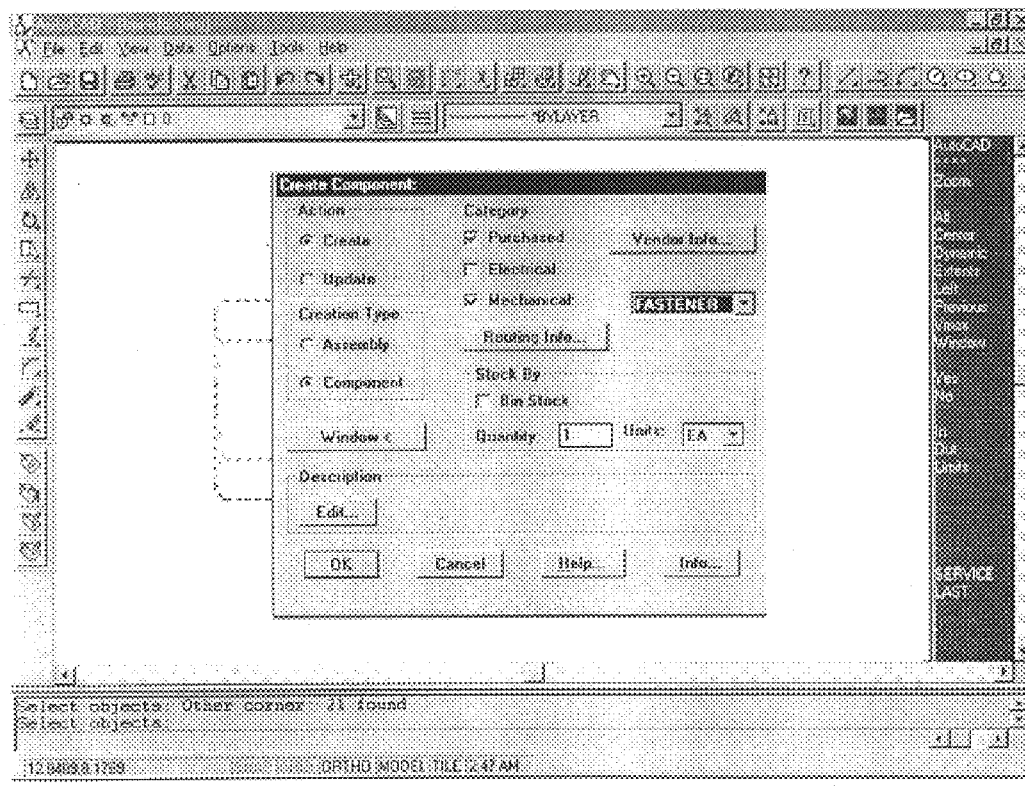
Figure 11S:
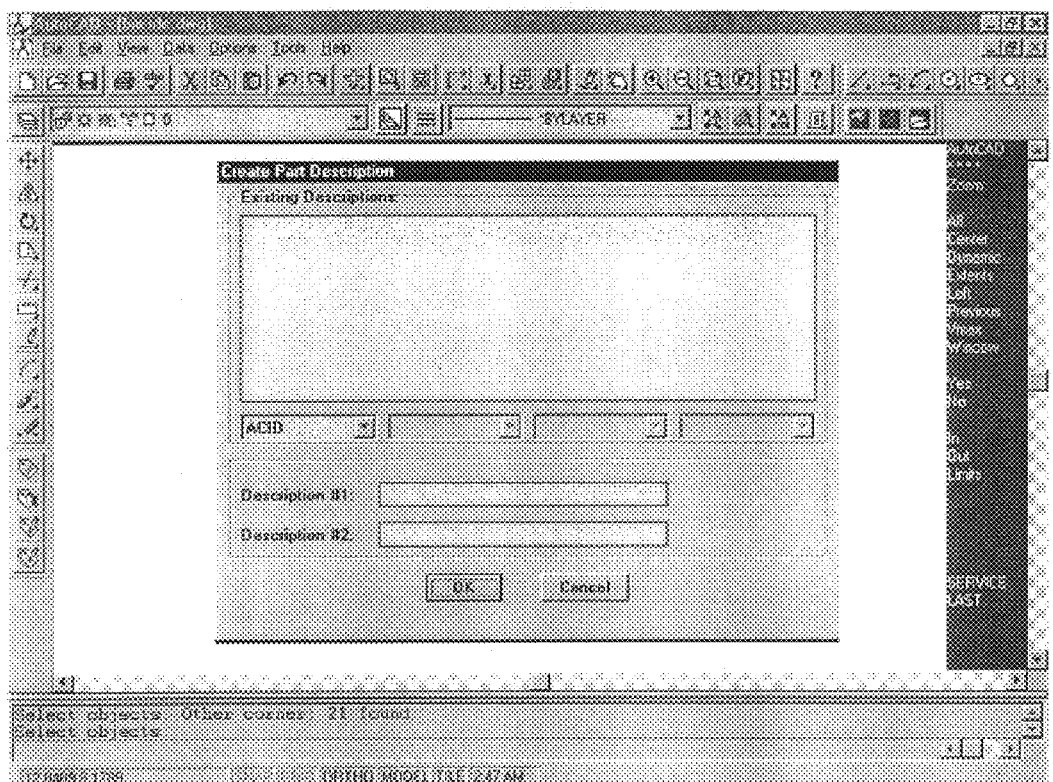
Figure 11T:
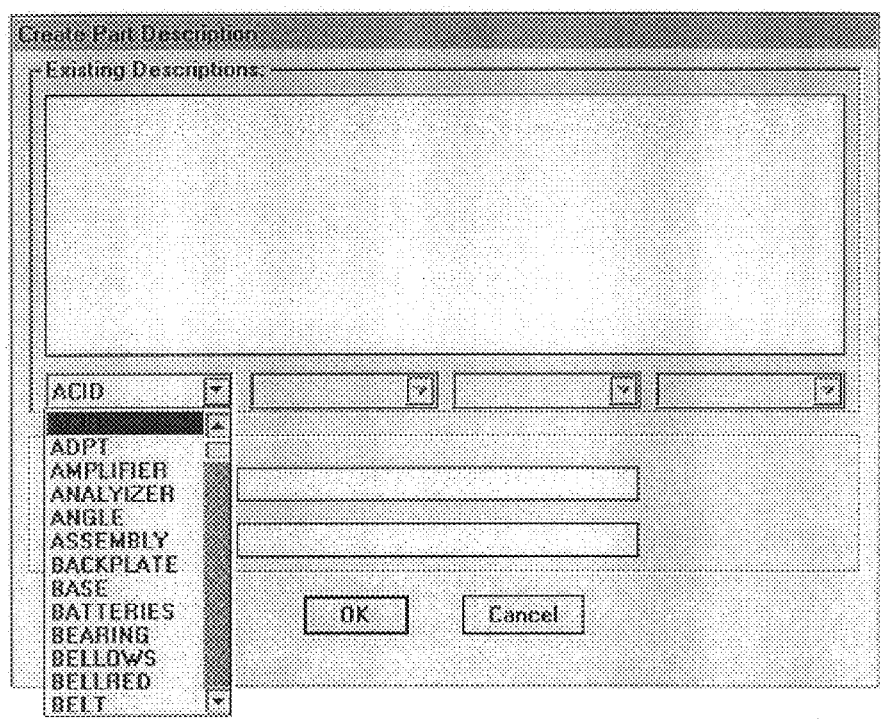
Figure 11U:
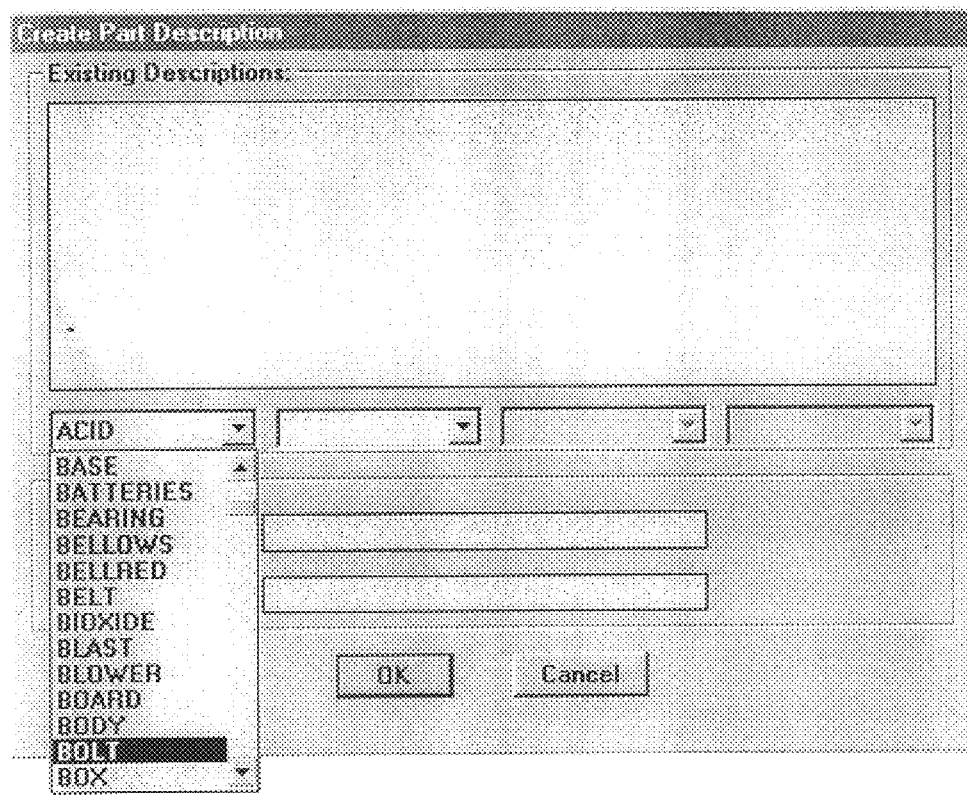
Figure 11V:
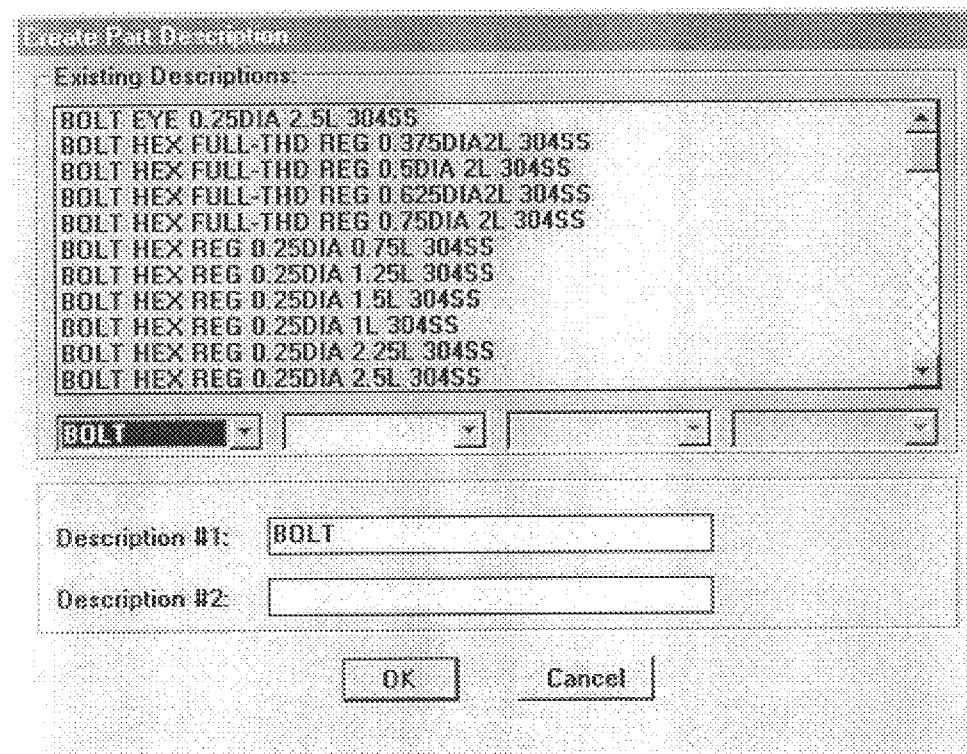
Figure 11W:
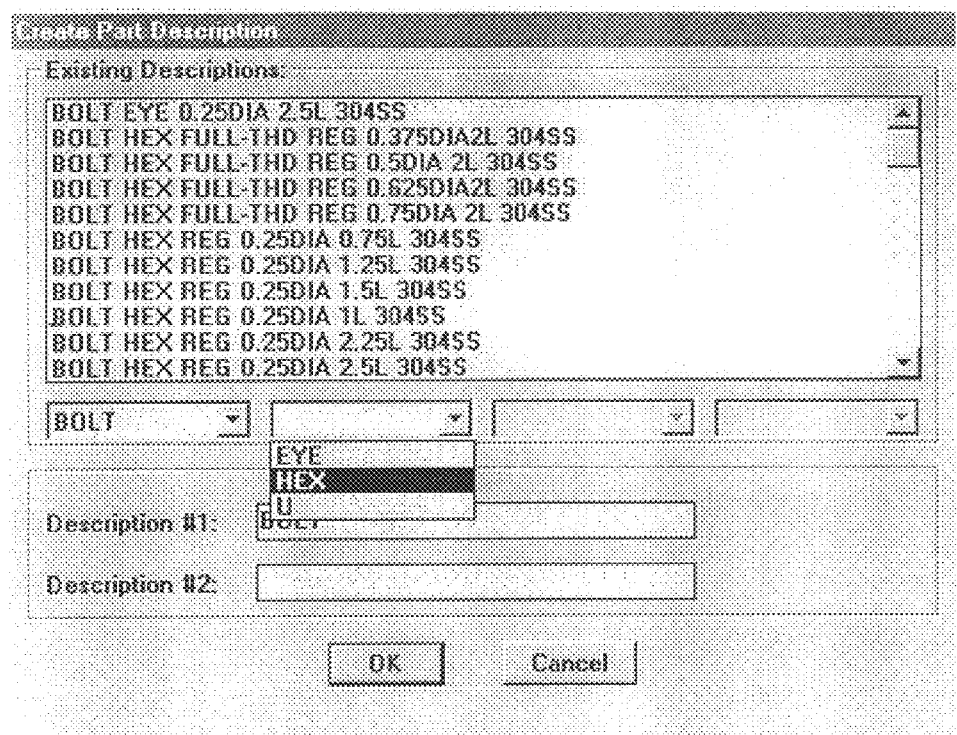
Figure 11X:
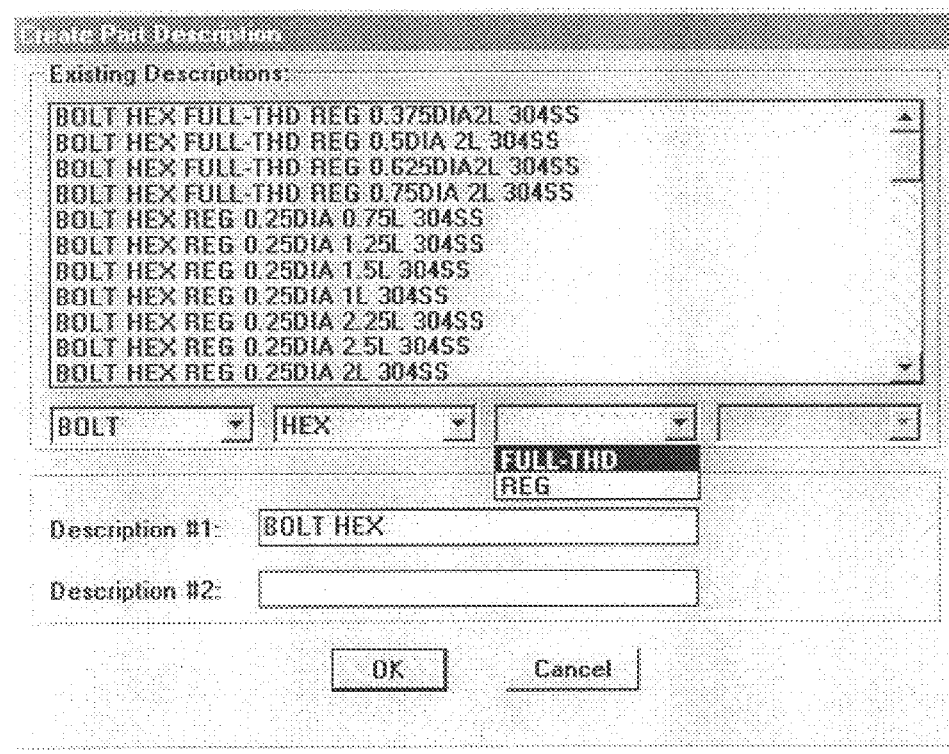
Figure 11Y:
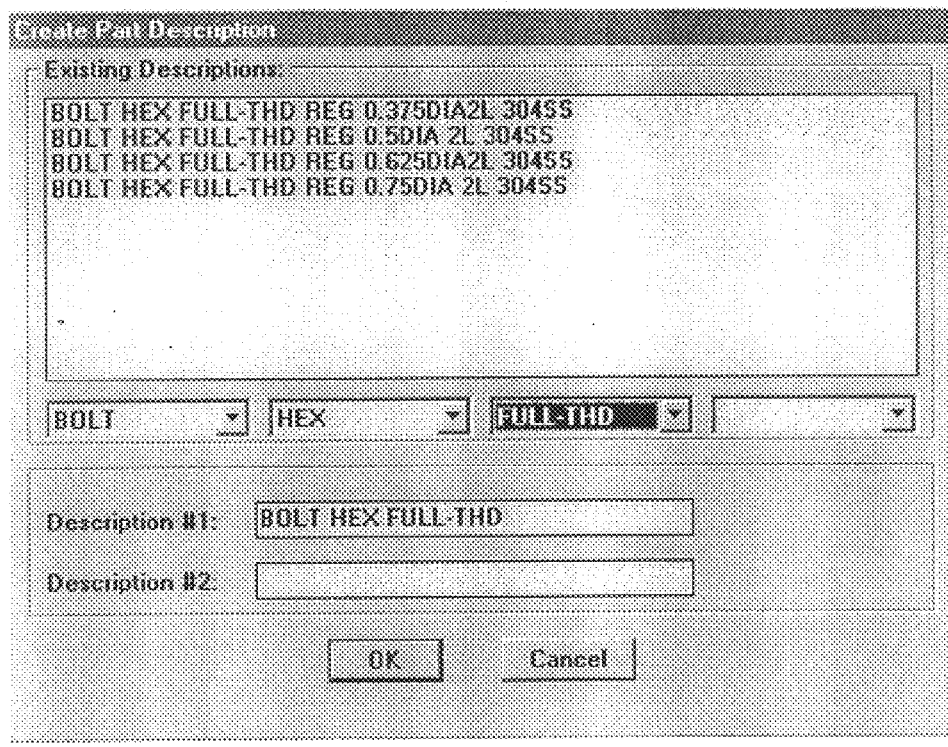
Figure 11Z:
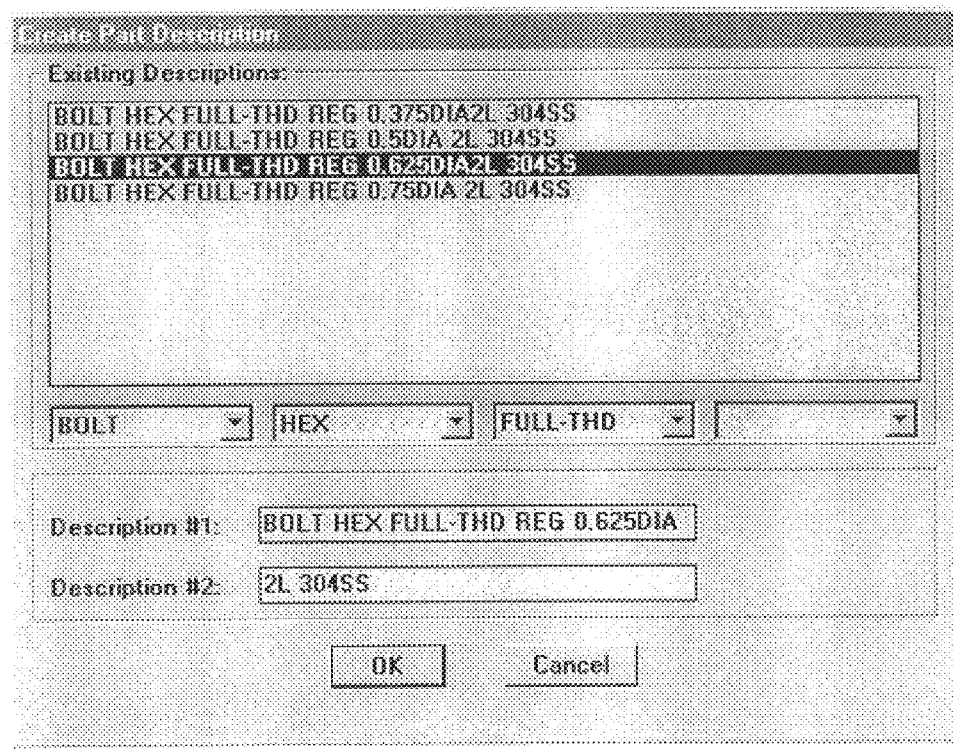
Figure 11A:
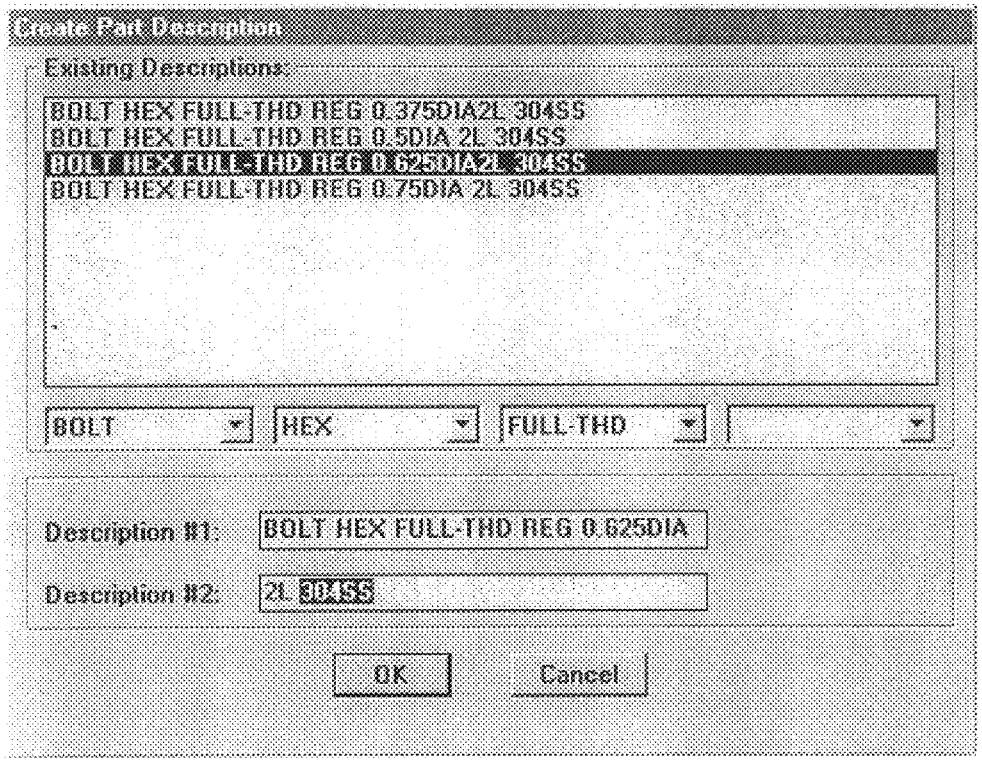
Figure 11B:
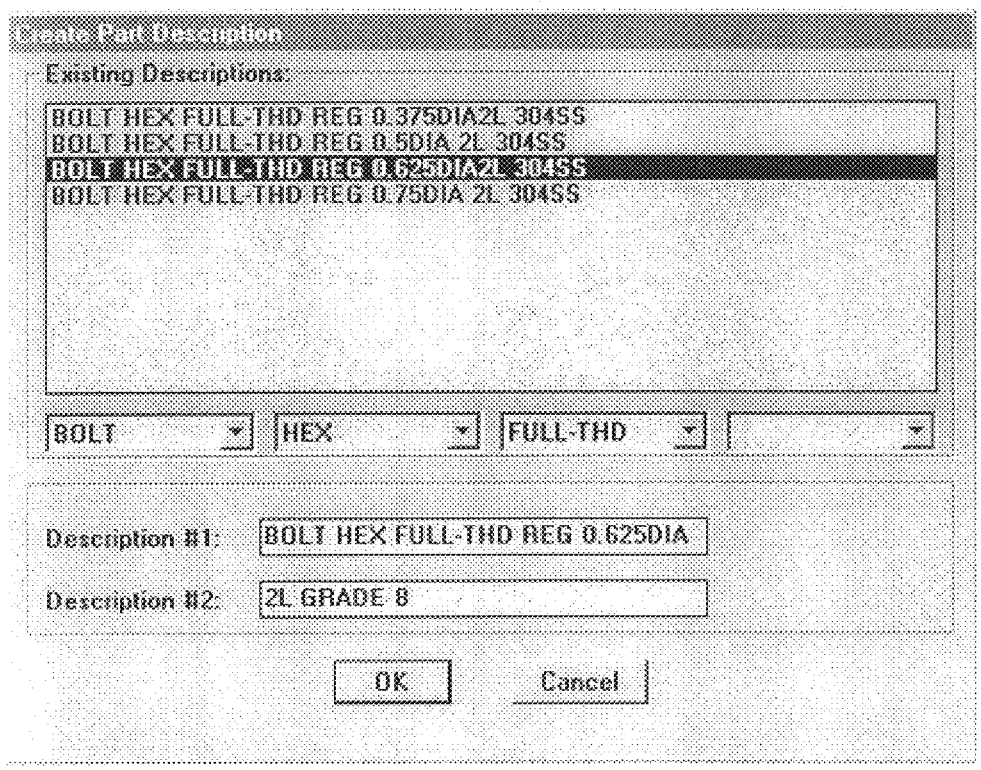
Figure 11C:
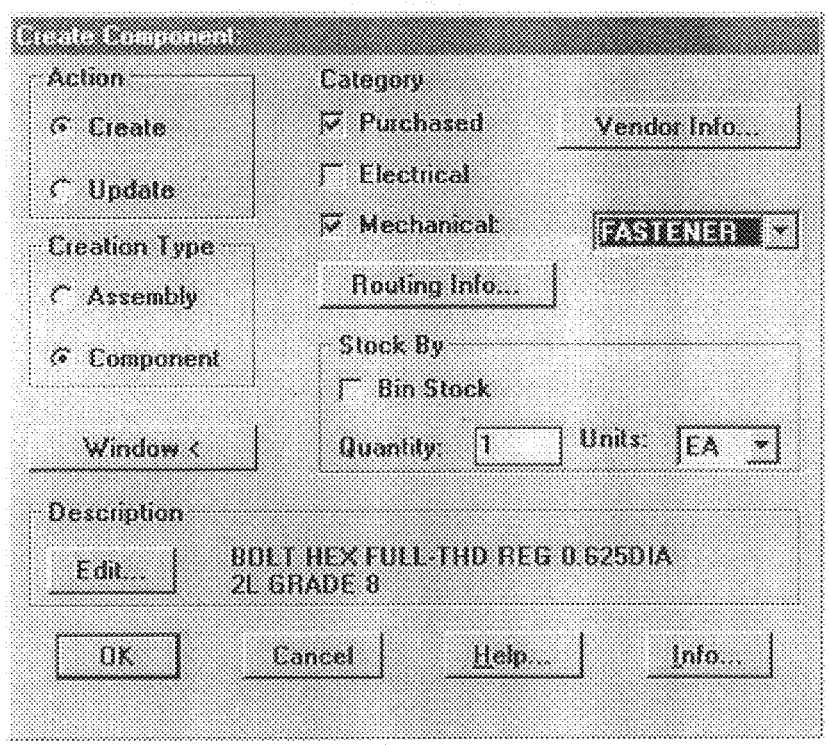
Figure 11D:
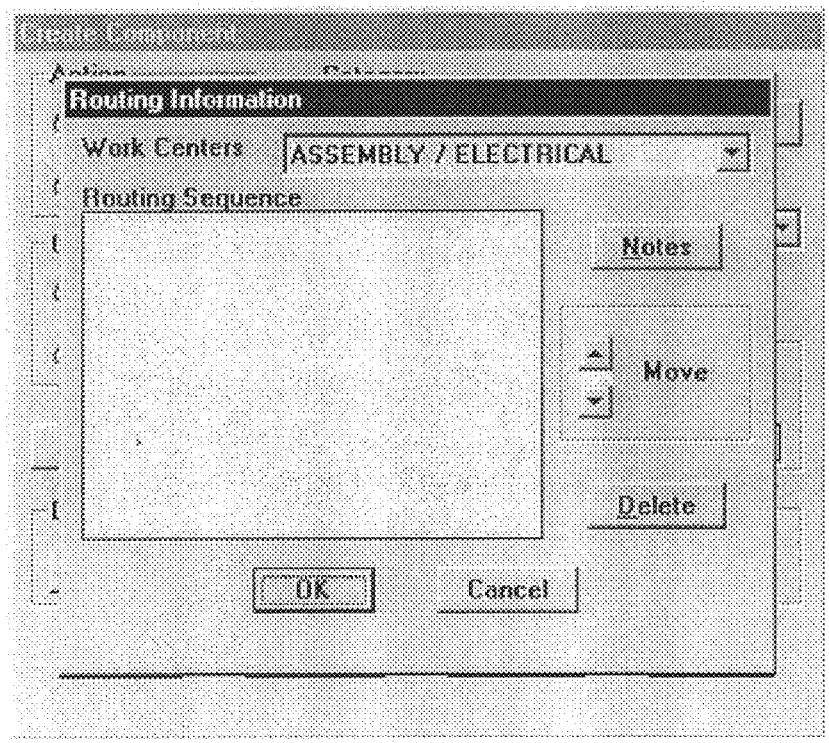
Figure 11E:
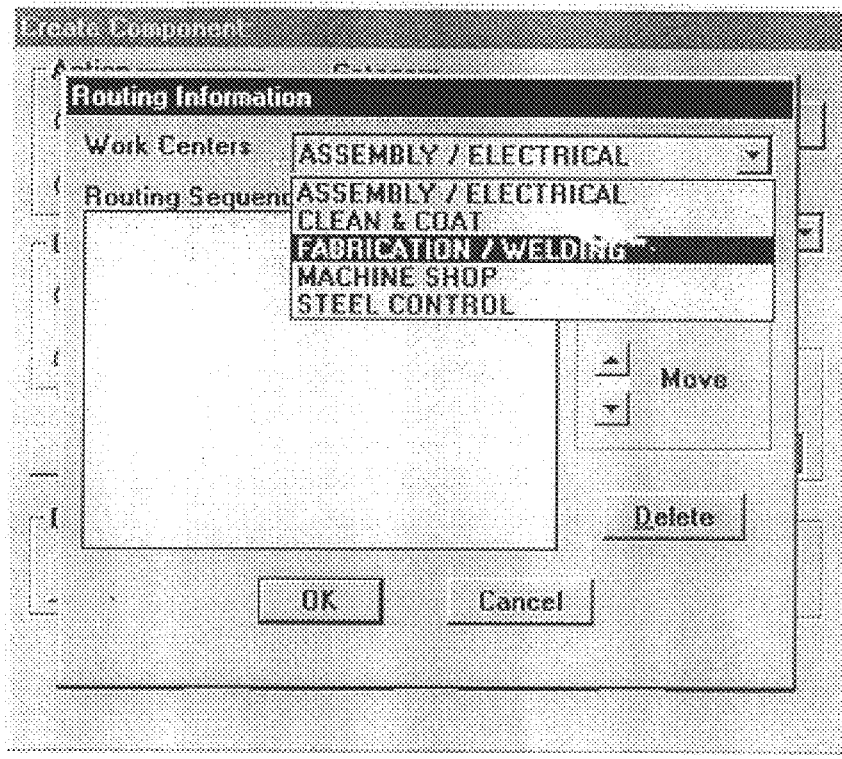
Figure 11F:
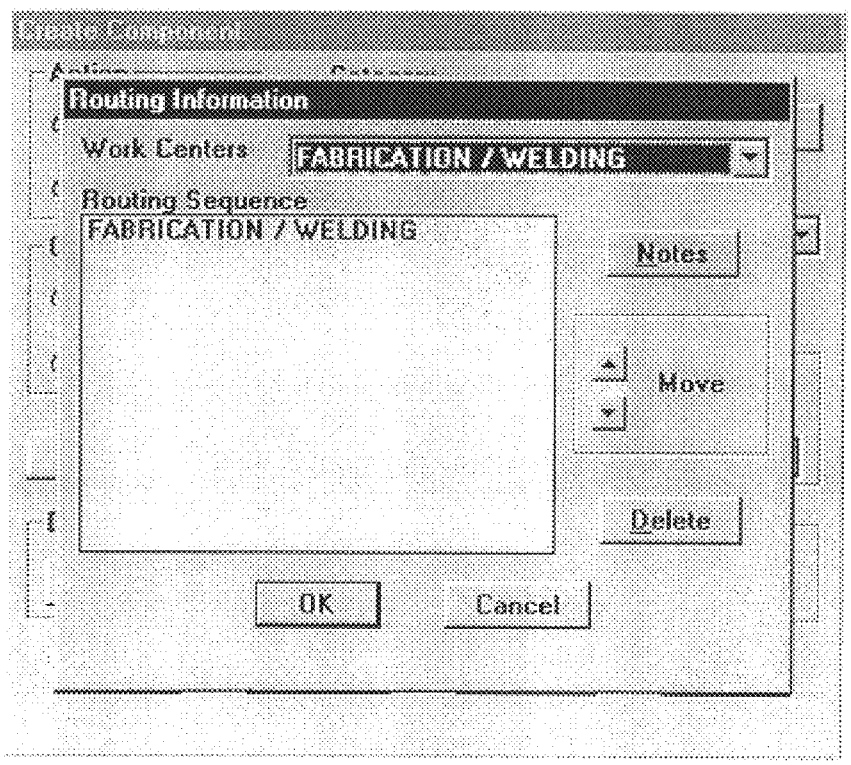
Figure 11G:
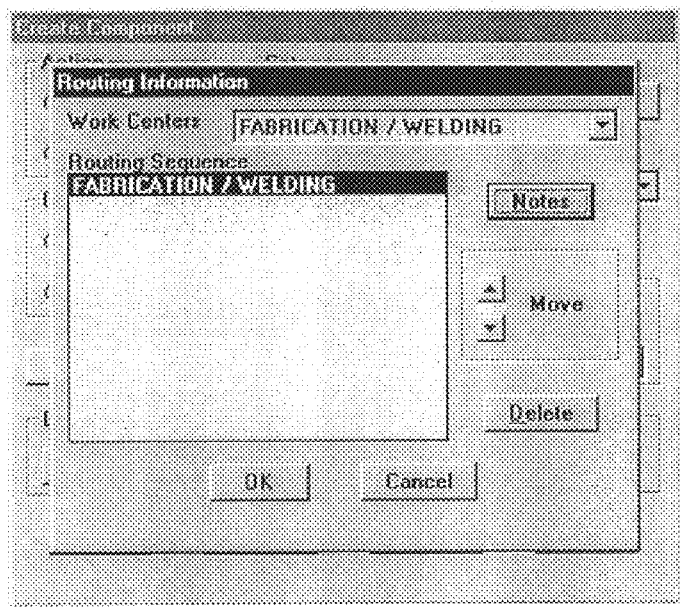
Figure 11H:
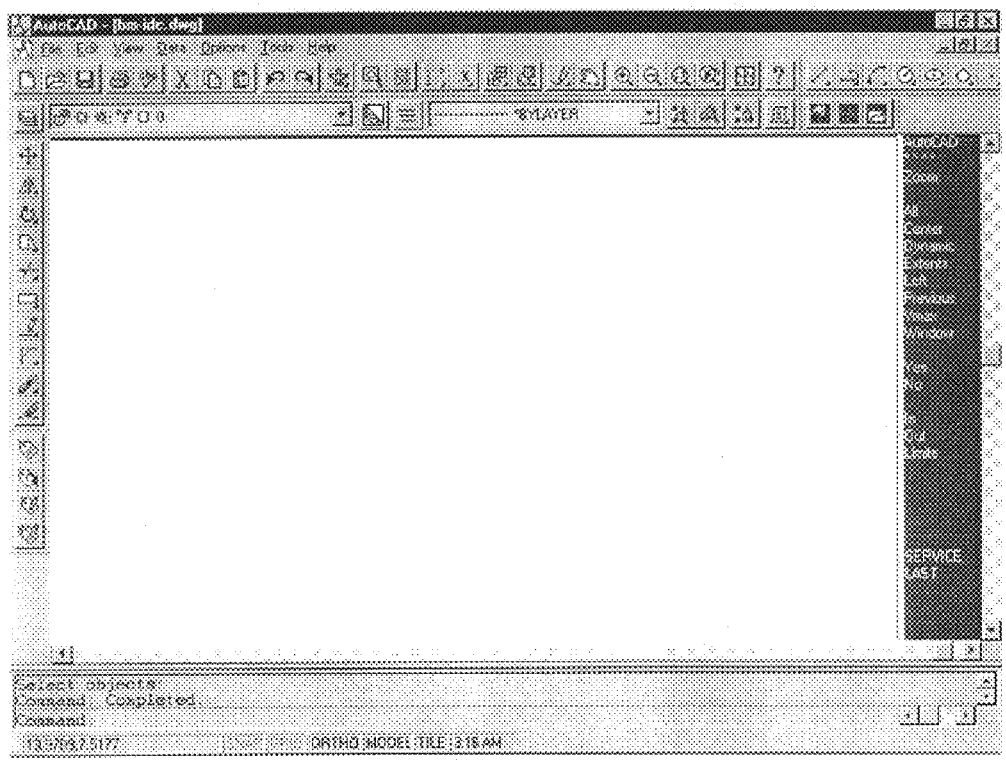
Figure 11I:
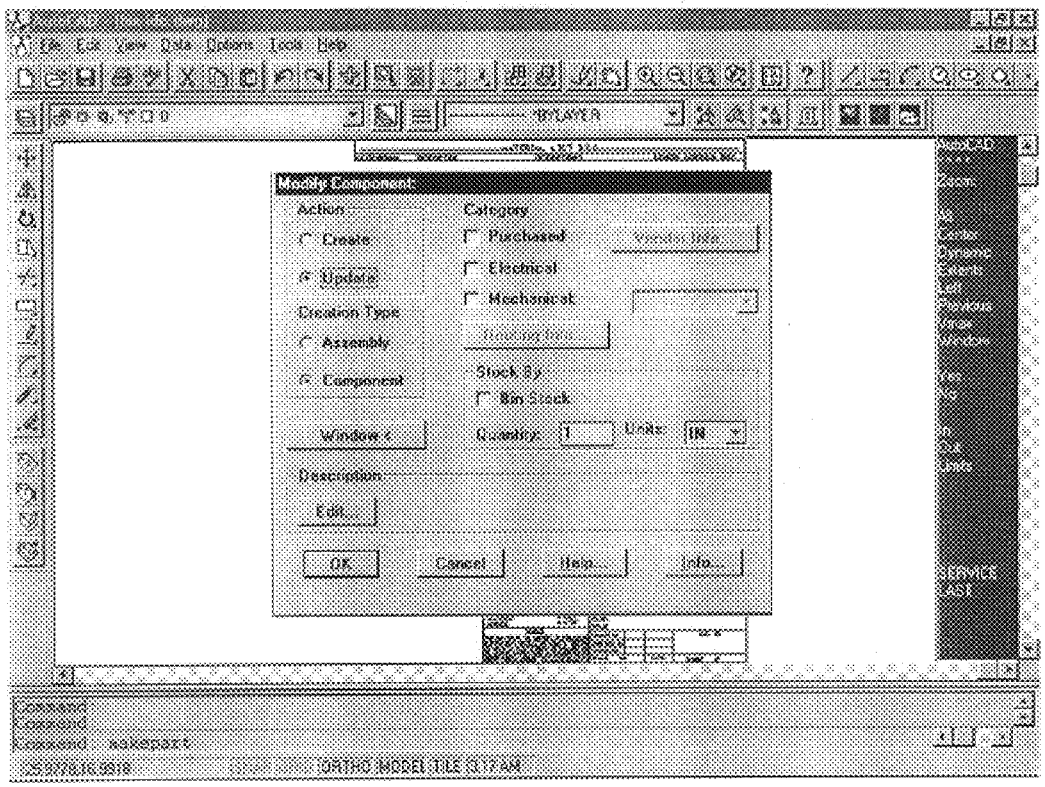
Figure 11J:
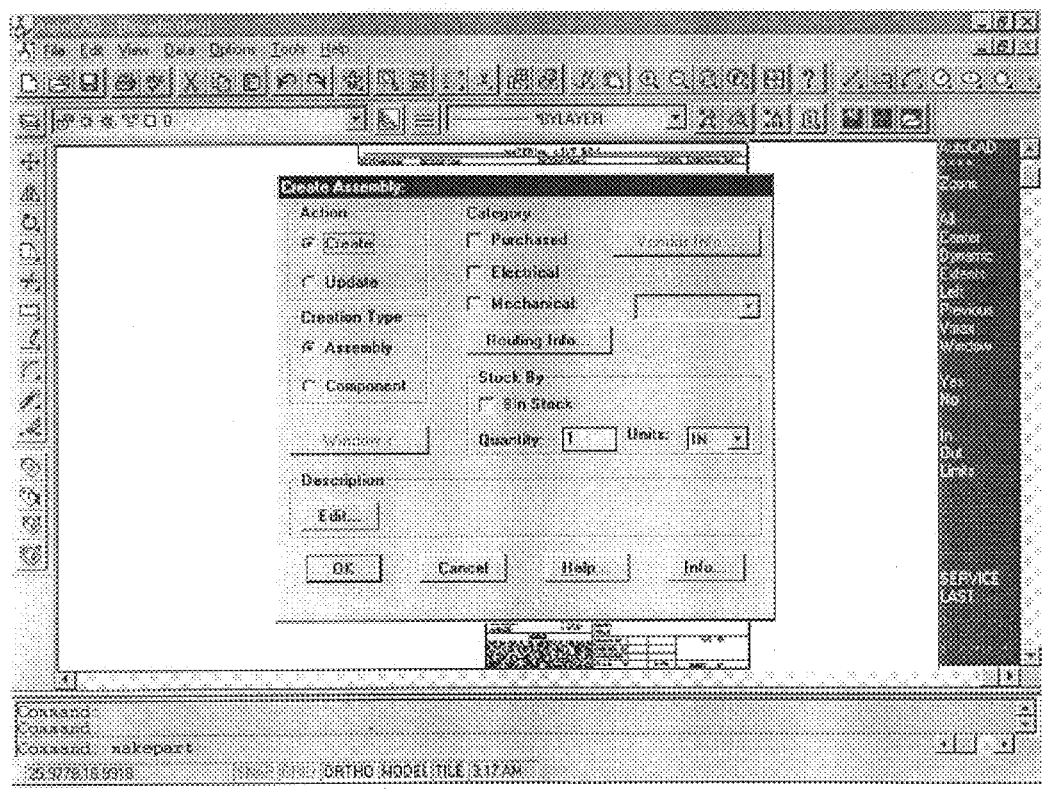
Figure 11K:
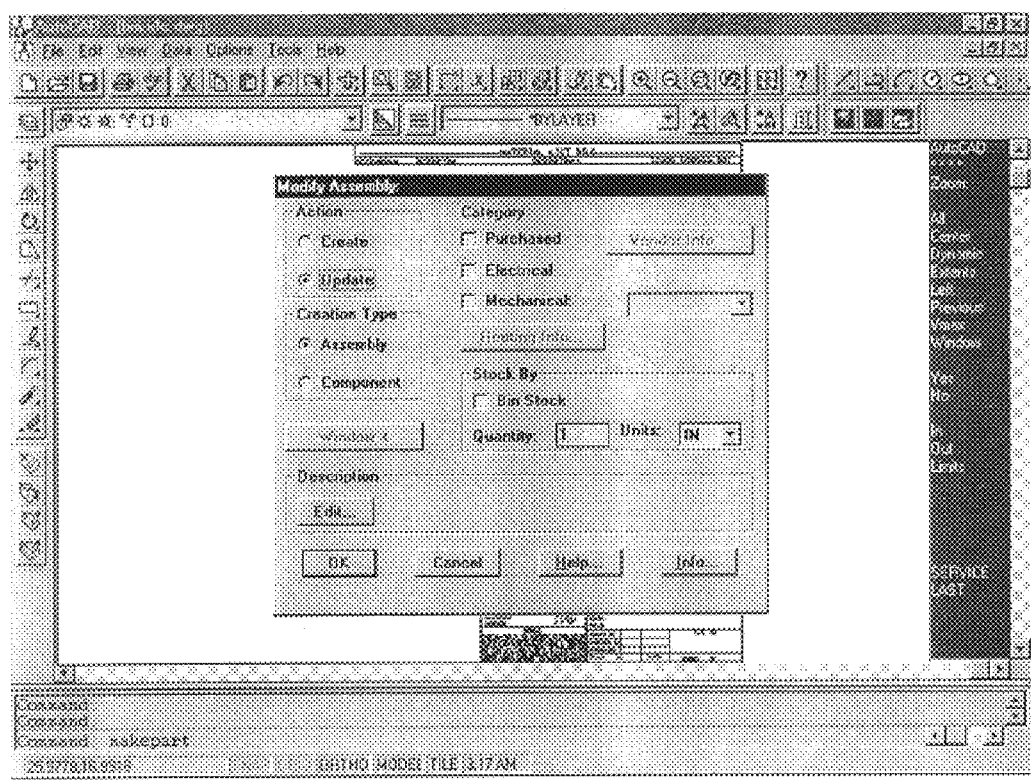
Figure 13A:
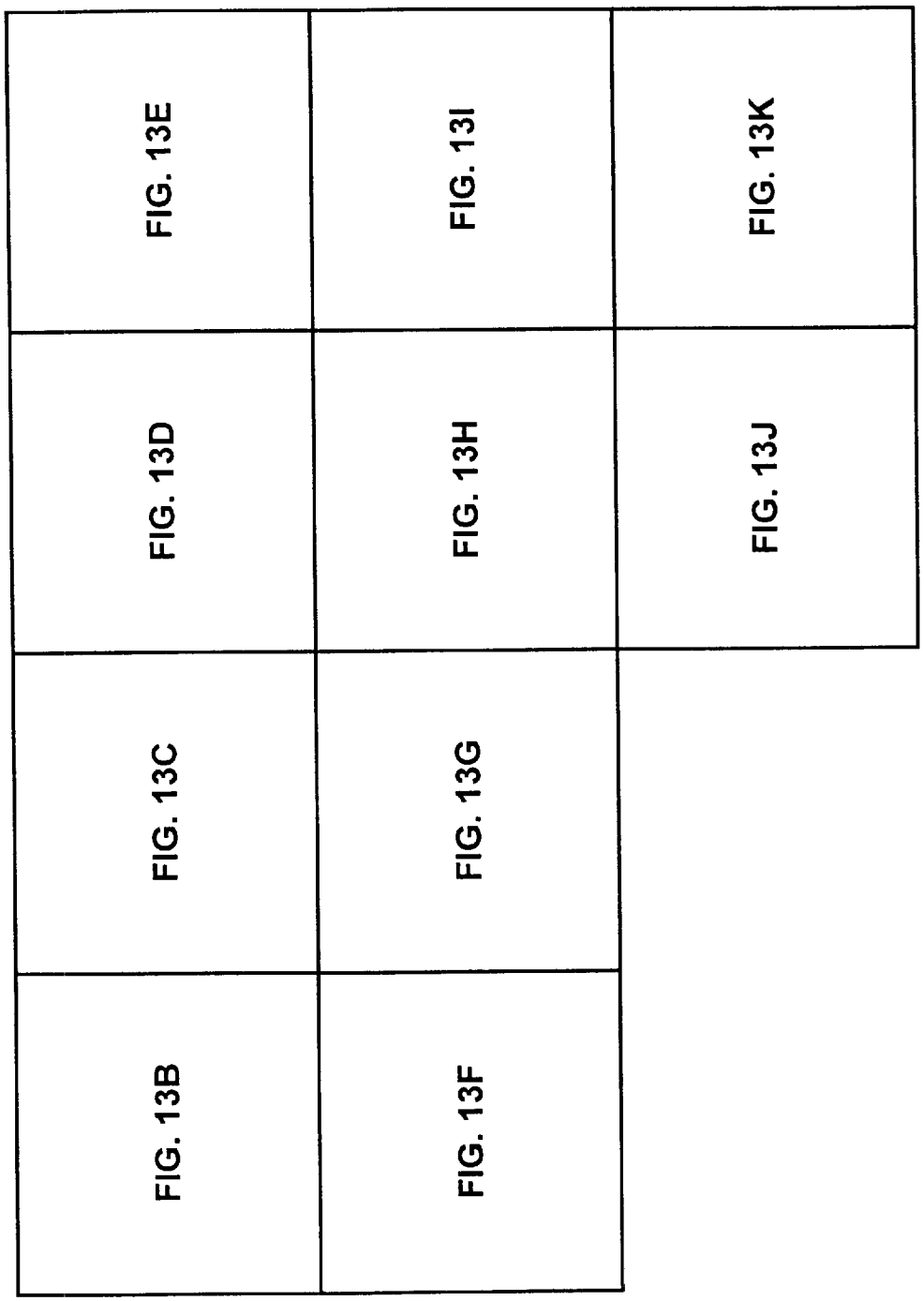
FIGS. 13A–13K are flow diagrams showing process steps for a PKOUT subroutine.
Figure 13B:
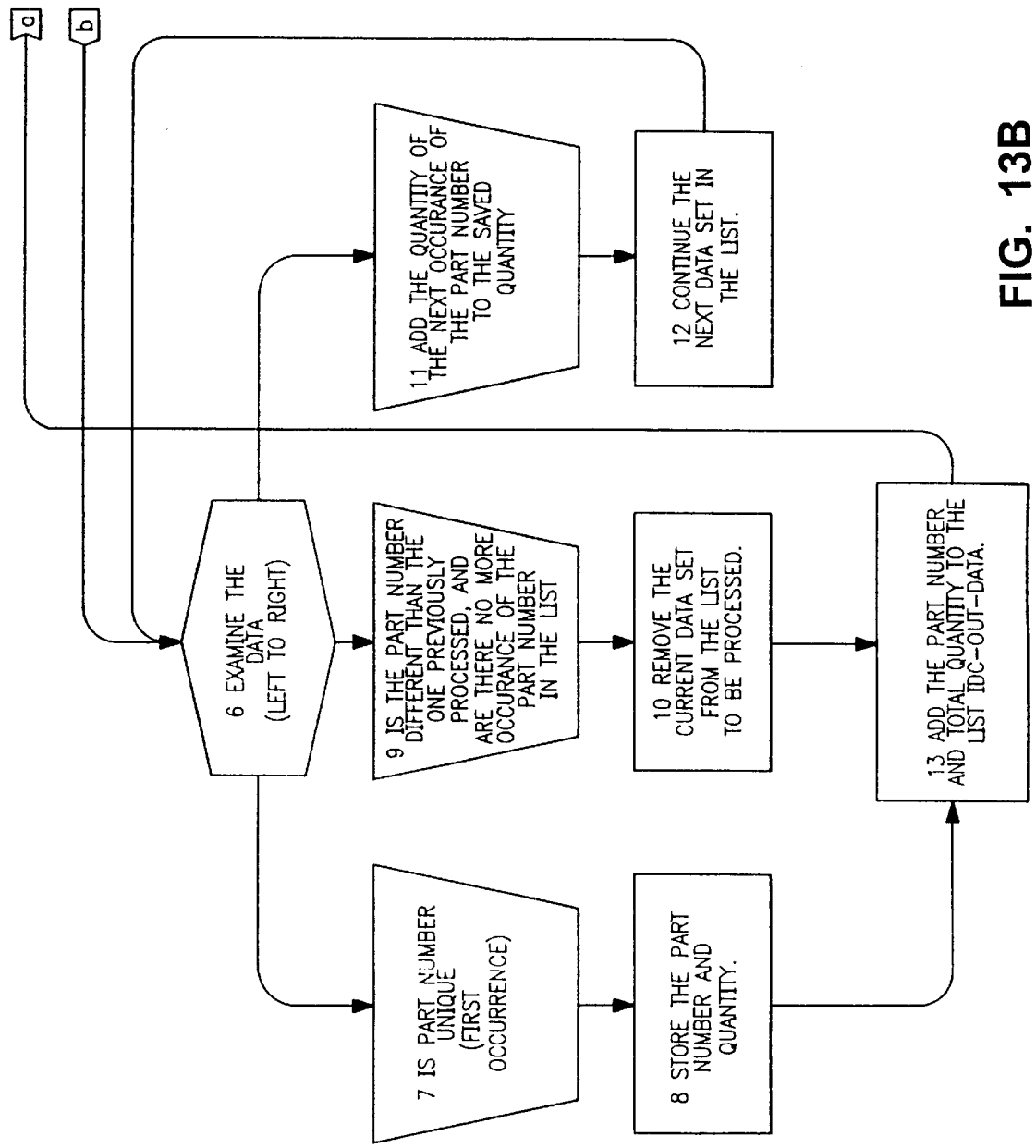
Figure 13C:
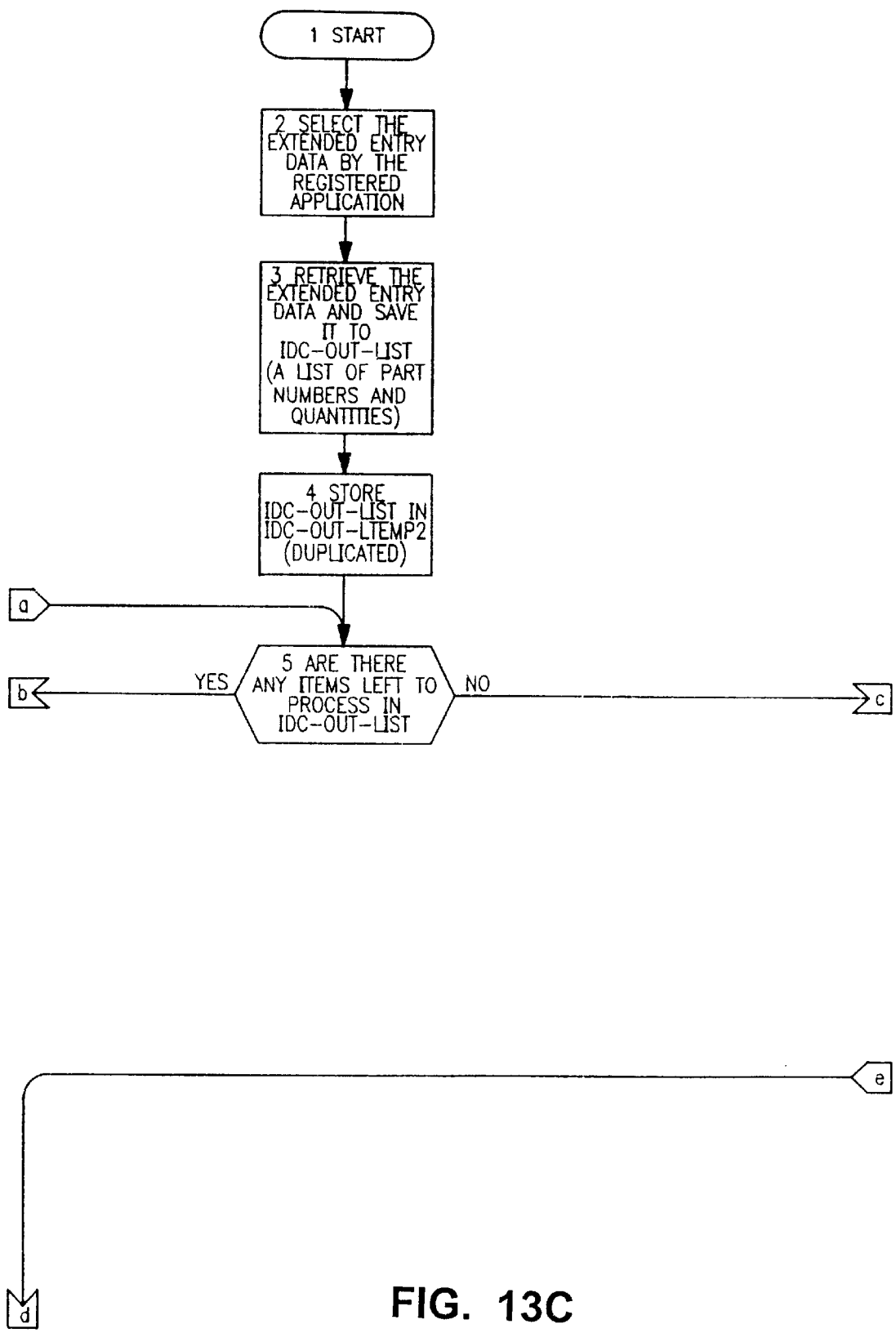
Figure 13D:
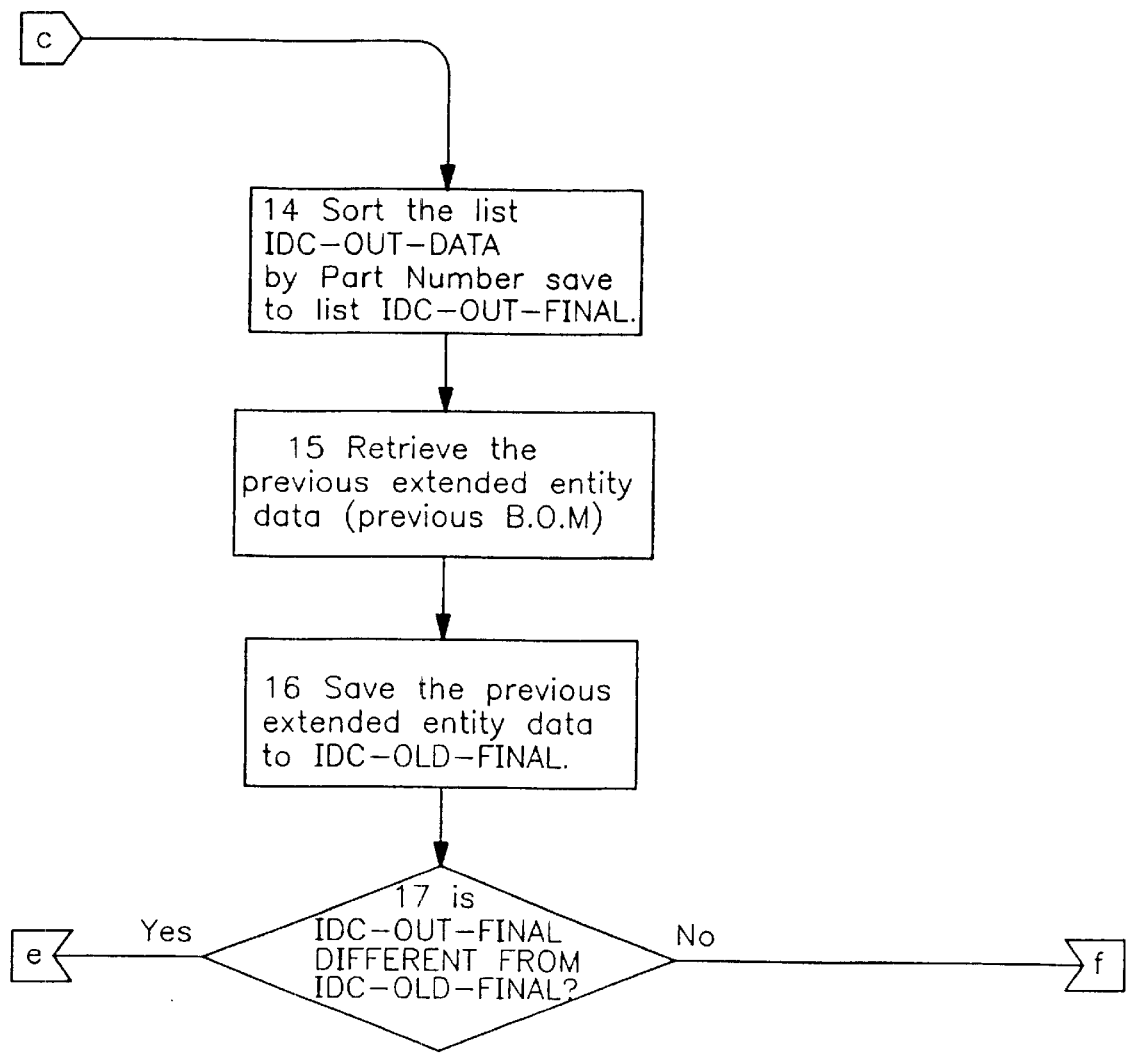
Figure 13E:
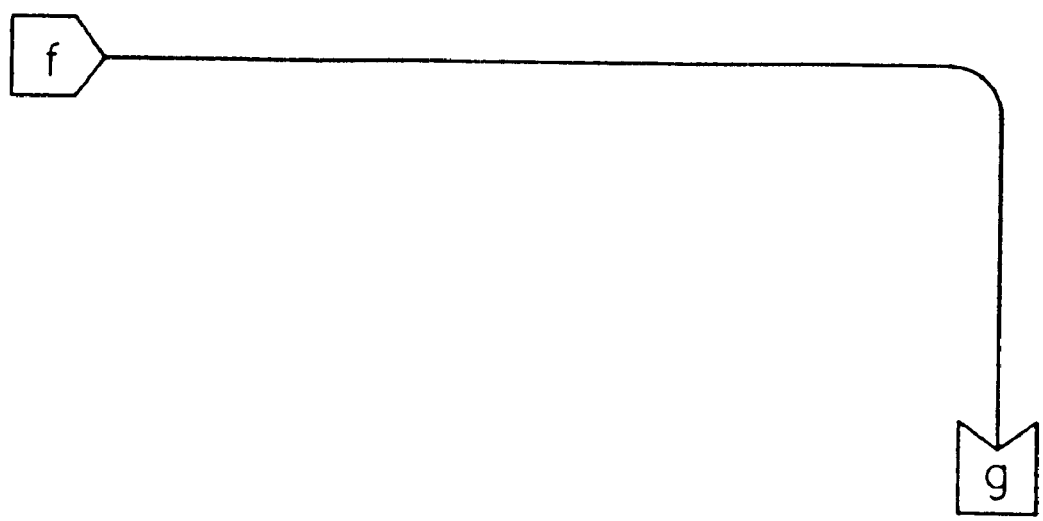
Figure 13F:
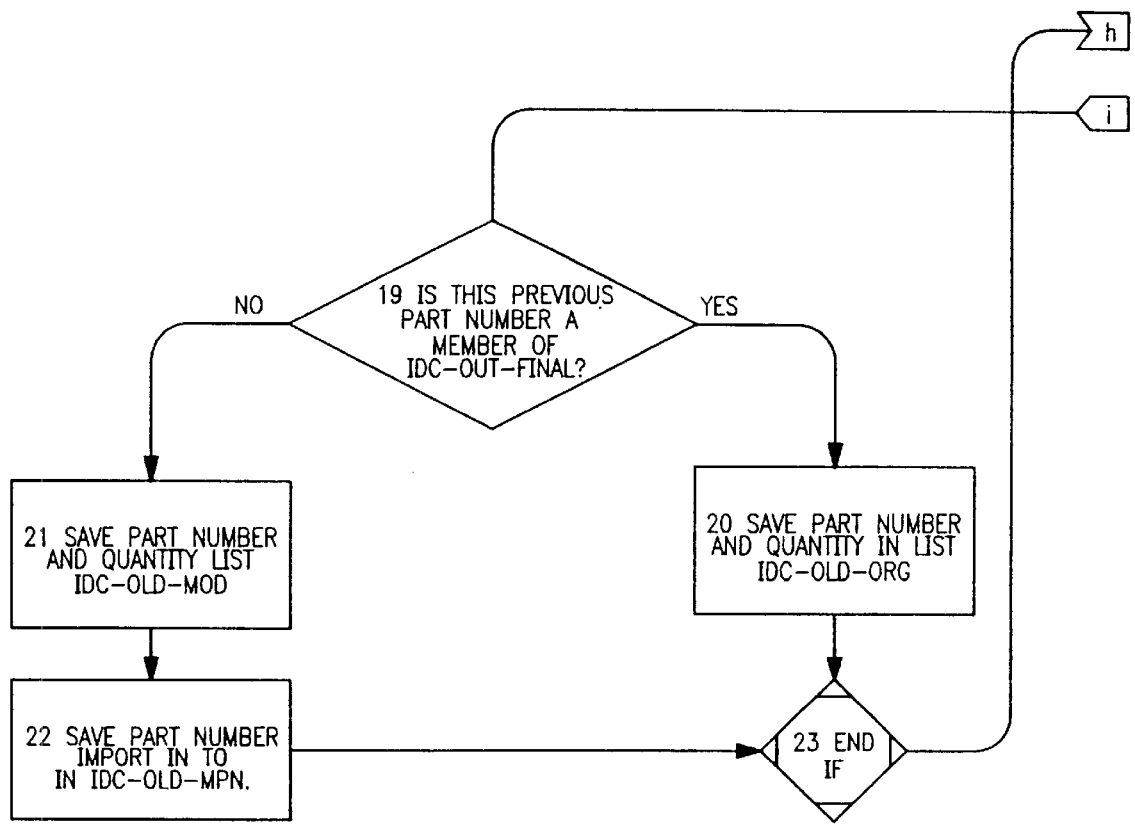
Figure 13G:
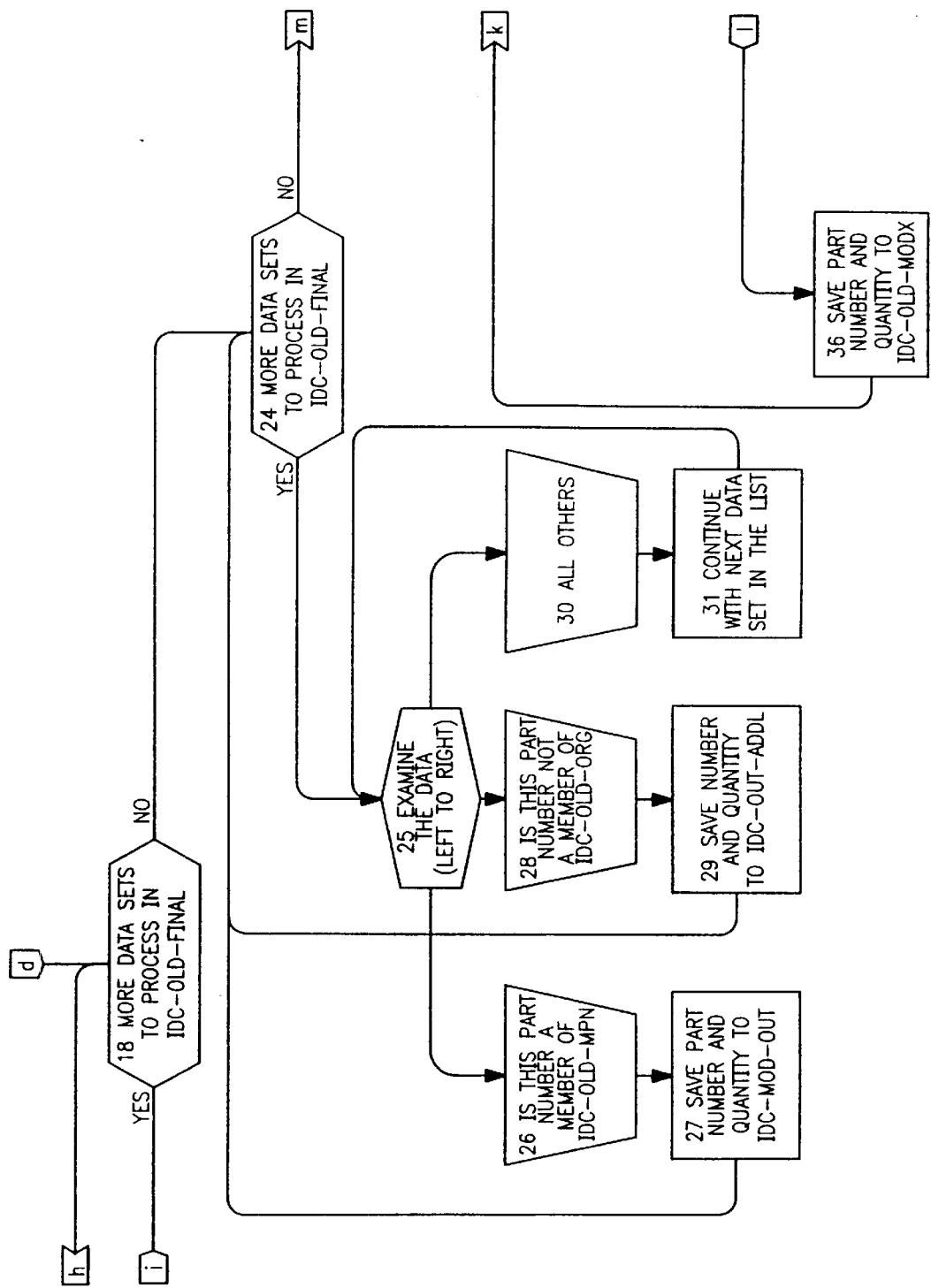
Figure 13H:
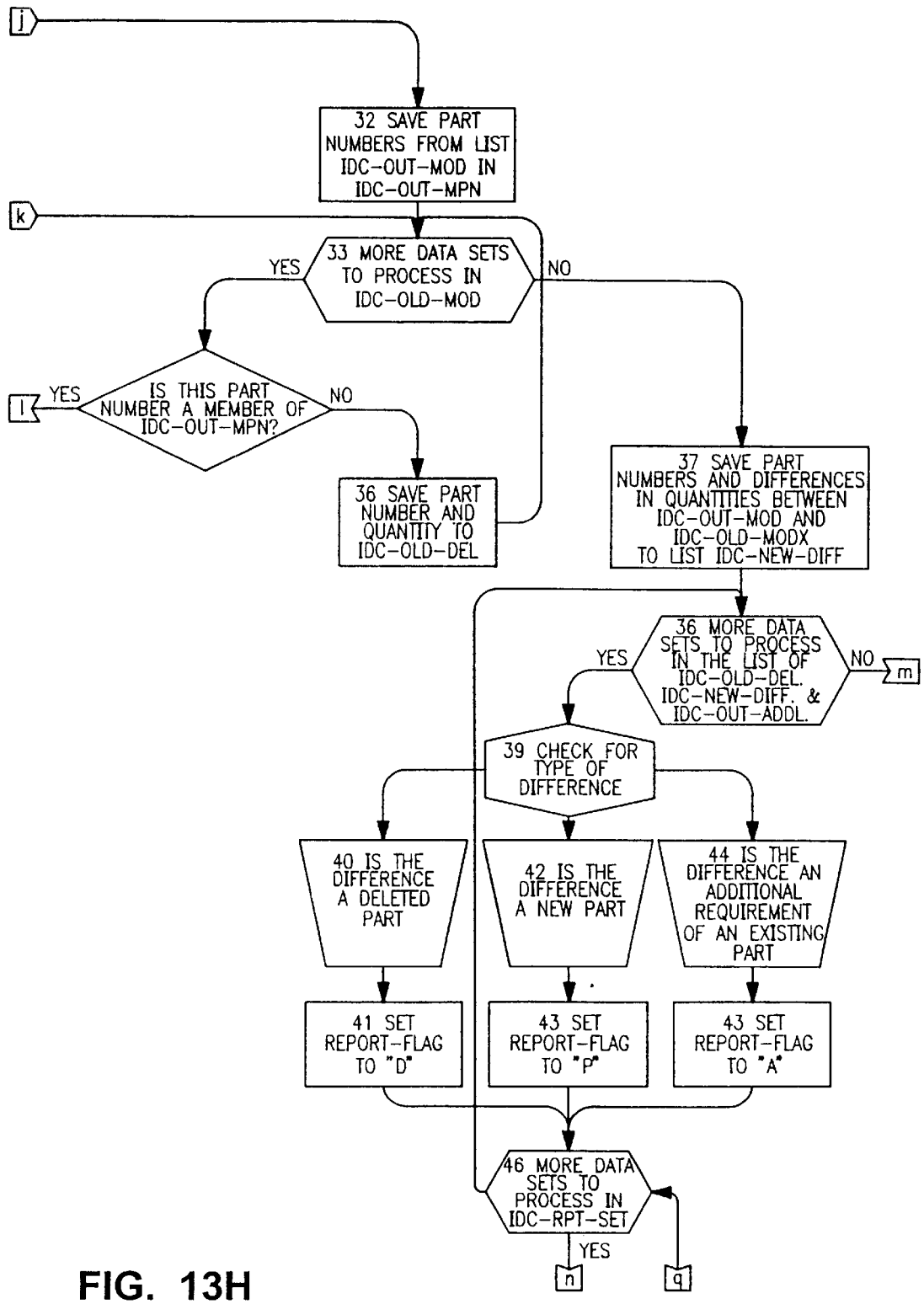
Figure 13I:
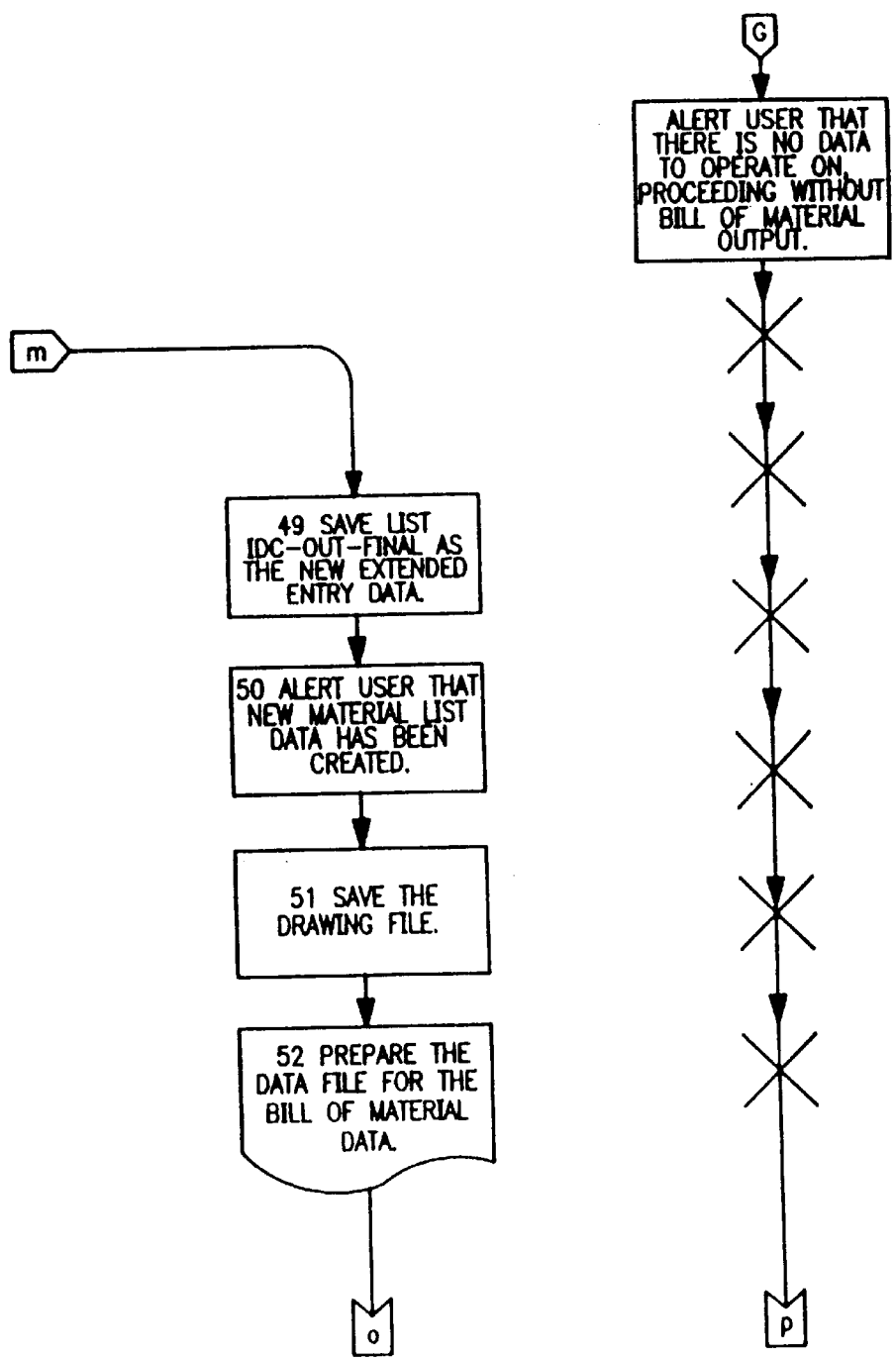
Figure 13J:
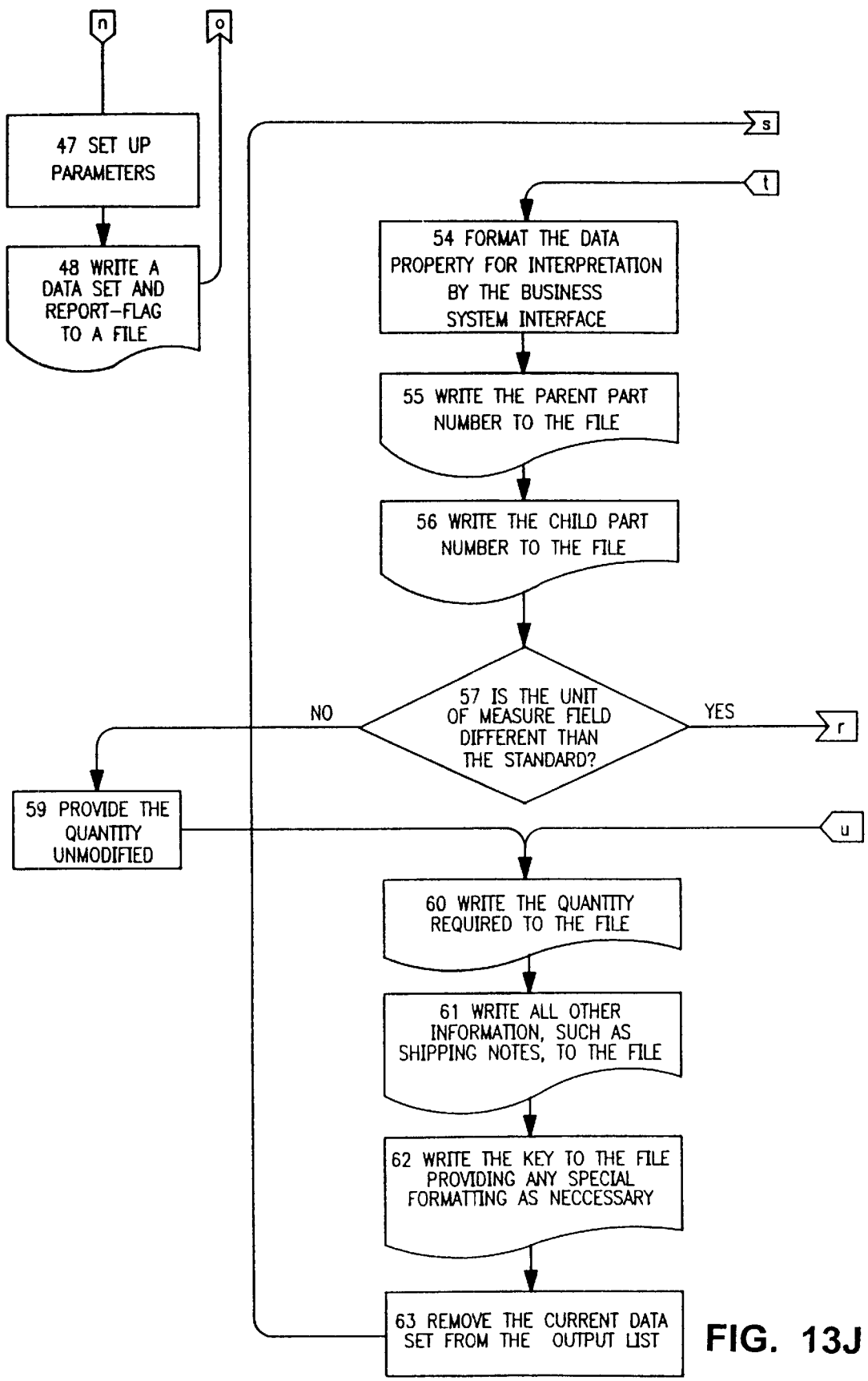
Figure 13K:
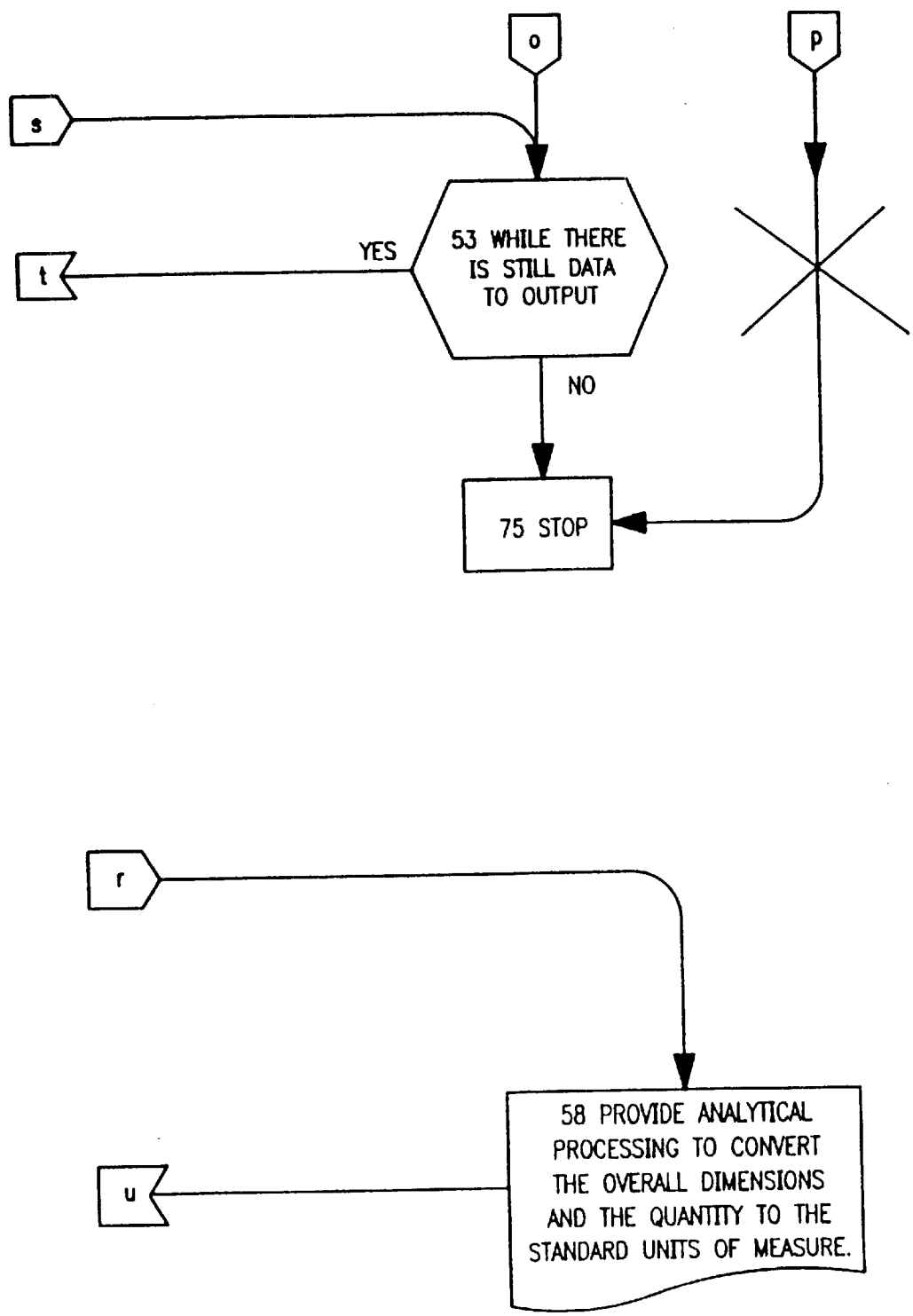

If the part exists in the database, the operator enters the command "PKINSERT" at the CAD application command prompt, as shown in FIG. 9. PKINSERT, as shown in the flowchart diagrams of FIGS. 10A–10J, is used to retrieve and select an item from the database, insert it into the CAD assembly drawing, and automatically add a line to the bill of materials list corresponding to the selected item. An operator's entry of "PKINSERT" transfers the IDC_GET module from storage disk to main memory if IDC_GET does not exist in main memory at the time PKINSERT was entered. The IDC_GET module causes the transfer of the proper graphical dialog box creation program, for example, an IDC_GET Microsoft Windows® or AutoCAD® Dialog Control Language "DCL" program, from storage device to main memory. IDC_GET presents the operator with an "Available Parts" dialog box on the display. The "Available Parts" dialog box contains a number of search description boxes, an area to display full descriptions of all parts matching the search descriptions, the total number of records matching the search descriptions, a toggle switch which, if selected, causes the generation of a thumbnail sketch and subsequent placement in the "Available Parts" dialog box, and a plurality of selection boxes which, allow the operator to 1) add the selected part to the assembly drawing, 2) cancel the operation and remove the dialog box from the display, 3) cause execution of the "help" subsystem, or 4) provide the operator with information about the IDC_GET subroutine.

The IDC_GET subroutine advantageously provides the operator with the ability to search for a part by selecting from a set of descriptions. As a result, the operator need not know the part number of the specific part required, and the need for a labor-extensive procedure for creating a complicated system of part numbers is eliminated.

The search description boxes are arranged such that each subsequent box displays data related to the prior box. For example, search description box 1 might contain general part descriptions, i.e., screw, washer, search description box 2 may describe the types of screws available, i.e., flat head, rounded, search description box 3 may describe sizes available, i.e., 8×1.25" aluminum, 10×2" stainless steel. As the operator makes selections from the search description boxes, the parts meeting the selected criteria are displayed in the dialog box. For example, selections may be made in a graphical display environment by selecting a search description box. The search description box will enlarge and present the user with a list of items which may be selected. Selecting an item causes that item to appear in the restored search description box. Operator manipulation of the "Available Parts" dialog box causes IDCLINK to execute the IDCGETPART module. This module causes data to be transferred from the database residing in main memory or storage disk to the CAD application by transferring the request to a location in main memory which is accessed by the database program.

The operator may select a part once it appears in the list of parts meeting the search criteria. Selecting a part by double clicking on the list where the part appears, or its thumbnail representation, causes the part to be inserted in the CAD application assembly drawing, for example, as though the AutoCAD® "INSERT" command was used. Such insertion is accomplished as follows: IDC_GET executes the program steps necessary to cause IDCLINK to query the database to locate the part number corresponding to the described part; the drawing file corresponding to the part is then located within the storage unit and transferred to the CAD system residing in main memory; and the part is then displayed.

An operator may wish to insert a part which does not exist in the database or modify an existing part. In this case, the operator executes the MAKEPART command from within the CAD application, for example at the AutoCAD® command prompt, as shown in FIGS. 11A–11KK. MAKEPART is used to create or modify an item in the database. The MAKEPART process is executed in a manner by computer system 1 such that the new part may be created "on the fly" without exiting the CAD application or even starting a new drawing within the CAD application. The MAKEPART routing accomplishes the "on the fly" creation by causing the IDC_MAKE module to execute the process program steps required to create a dialog box on display concurrent with the execution of the CAD application. All transfers to and from the database during IDC_MAKE execution are accomplished concurrent with CAD application execution. If a database transfer is required, IDC_MAKE causes IDCLINK to generate the proper database query in main memory and transmit the request to the portion of main memory which contains the database interface.

MAKEPART is also used to create an assembly from a collection of assembled parts such as components or subassemblies (assembly creation will be described in detail below). An operator's entry of "MAKEPART" transfers the IDC_MAKE module from storage disk to main memory if IDC_MAKE does not exist in main memory at the time MAKEPART was entered. The IDC_MAKE module causes the transfer of the proper graphical dialog box creation program, for example, an IDC_MAKE Microsoft Windows® or AutoCAD® "DCL" program, from storage device to main memory. IDC_MAKE transmits data from main memory or the storage device to present the operator with a "Create Component" dialog box on display. The "Create Component" dialog box allows, for example, the operator to (1) toggle to a "Create Assembly" dialog box to operate on an assembly (described below), (2) select between creating and updating a part, (3) choose the part category, i.e., electrical or mechanical, (4) establish stocking units, i.e., 10 pieces equals 1 unit, (5) select a button which will open additional dialog boxes where the user may add additional information, such as vendor information or routing information, (6) enter the part description, (7) recall existing parts by causing IDC_MAKE to execute the program steps necessary for IDCLINK to request and effect the transfer of data from the database in order to edit an existing part to create a new part, (8) accept the new data and create (or update) the part, (9) reject a request to accept the new data due to insufficient information supplied by the operator and display the same to the operator, (10) cancel the part creation (or update), (11) request help, or (12) request information about the "Create Component" dialog box.

IDC_MAKE causes the data entered by the operator to be arranged in main memory in a format compatible with the database application. Accepting the new data by making the appropriate selection causes IDCINSPART module in IDCLINK to transfer part attribute data entered in the "Create Component" dialog box from the CAD application to the database. If a new part is created, IDC_MAKE executes the program steps required to transfer the part data to the main memory area storing the IDCLINK IDCINSPART process commands. IDCLINK IDCINSPART process commands are executed to effect data transfer from the CAD application to the database and create a new part in the database system. If an existing part is updated, IDC_MAKE executes the steps necessary to transfer part data to the main memory area storing the IDCLINK IDCUPDPART module process commands. IDCLINK IDCUPDPART process commands are executed to effect data transfer from the CAD application to the database and update a part which exists in the database system.

The operator continues to generate the assembly drawing by adding, creating, and modifying parts to it via the MAKEPART and PKINSERT commands until no further changes to the assembly drawing are required.

Bill of Materials Comparison

The operator executes MAKEPART to create an assembly once all parts have been added to the assembly drawing. Entering MAKEPART at the CAD application command prompt causes the previously described "Create Component" dialog box to be transferred from main memory or storage disk to the display. An assembly is created by selecting the "Create Assembly" button in the "Create Component" dialog box thereby changing it to a "Create Assembly" dialog box. This operation (1) causes the system to create an assembly data set, containing a bill of materials and a master record, transfer it to the database system, and store it in the database system memory (storage disk or main memory), (2) updates the drawing title block on the display with the part number, and 3) updates the drawing title block on the display with the description of the assembly entered in the "Create Assembly" dialog box. The master record data may include, but is not limited to, quantity, unit of measure, is_stock_flag, is_purchased_flag, vendor notes, general notes, phantom notes, commodity code, product code, general ledger account number, lead time, estimated cost, and item type.

The CAD title block file and graphic image on display are updated by IDC_MAKE as shown in FIG. 12. IDC_MAKE compares portions of main memory to determine if the CAD drawing file stored in main memory contains title block data. If title block data is located, IDC_MAKE searches through the title block data until part number and description data have been located. IDC_MAKE then causes the updated part number and description data to be transferred to the area of main memory which contains the old data thereby substituting the updated data for the old data. The updated title block information is then transferred to display.

IDC_MAKE executes the program steps required to save the CAD assembly drawing. IDC_MAKE maintains assembly drawing integrity by updating a compressed archive on storage disk containing all prior versions of the assembly drawing. This allows subsequent operators to recall a prior assembly drawing if necessary, i.e., in the event that subsequent changes are not approved by the authorizing agent.

A PKOUT module residing in main memory or the storage disk on computing equipment 1 is transferred to main memory and the program commands are caused to execute as shown in FIGS. 13A–13K by IDC_MAKE to effect a comparison between the newly created bill of materials and a bill of materials corresponding to the previous version of the assembly to detect a difference therebetween. If no differences are detected, PKOUT causes a message to be transferred to display from main memory alerting the operator that the program is going to save the assembly drawing to make the changes permanent. The manufacturing control system is then updated as described in the "Manufacturing Control System Update" section below.

Difference Approval

Figure 14:
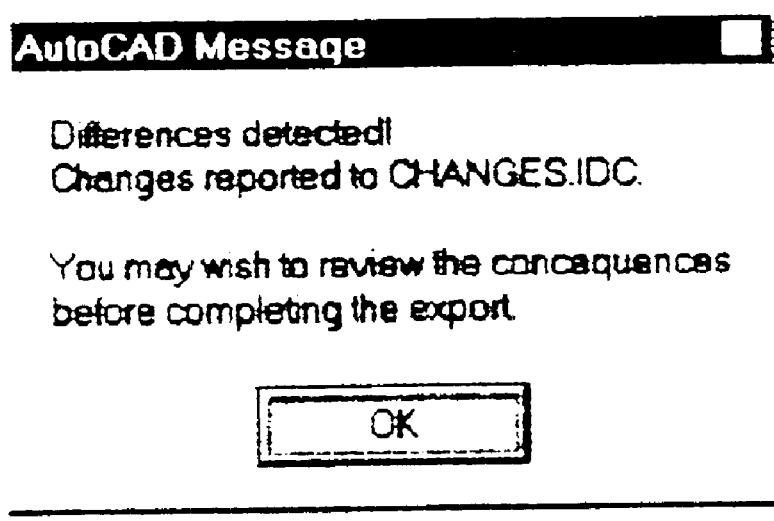
FIG. 14 shows a screen display illustrating differences detected message provided to operator.

The PKOUT module residing in main memory or the storage disk on computing equipment 1 alerts the operator that a difference was detected between the newly created bill of materials and the previously created bill of materials by causing a text message to appear on display. PKOUT executes the program steps necessary to transfer the difference data from main memory to a "difference" file on storage disk. PKOUT also causes text messages to appear on display to notify the operator that an "impact report" must be run on the manufacturing system, as shown in FIG. 14. PKOUT causes IDCLINK to issue a database query to transfer an assembly data revision history file from storage device to main memory. PKOUT prompts the operator via display to enter explanatory revision text and creates an approval data set in main memory which is transferred to the storage disk or database. The approval data set is comprised of an updated assembly data revision history, assembly revision data, and "difference" data.

The approval data set is transmitted via network interface to the computing equipment of an authorizing agent. Transmission methods may include electronic mail, electronic file transfer, or a copy of the approval file downloaded from main memory of storage disk to floppy disk via floppy disk interface. The authorizing agent is notified that an approval is required. Notification may be automated by a method such as e-mail, or may be done by a telephone call or personal visit from the operator or his agent.

The authorizing agent may approve or deny the changes. Authorizing agent approval causes a module residing in main memory or storage disk on computing equipment 1 or authorizing agent's own computing equipment to initiate an update of the manufacturing control system. Authorizing agent denial of the changes causes that module to execute the program steps required to 1) remove the updated CAD assembly drawing file from "currents" status on the storage disk, such as by renaming it to a backup filename, 2) delete the assembly data from the database or revert back to any previously existing data, and 3) update the assembly revision history file on the database to reflect the denial.

Manufacturing System Update

The PKOUT module residing in main memory or the storage disk on computing equipment 1 continues its execution from main memory. PKOUT program process steps cause the assembly data update file to be transferred from database memory (main memory or storage disk in computing equipment 1) to a separate area of main memory in computing equipment 1 to create a file containing all assembly data needed by the manufacturing control system, for example, ProfitKey International's Rapid Response Manufacturing®. This data includes the bill of materials data as well as the master key data previously described. The data to be transferred to the manufacturing system may comprise the same data fields as those in the database, or may contain data fields in addition to those in the database, for example, revision comments, shipping notes, dimensions, and the like, entered by the operator or authorizing agent. This file is copied from main memory on computing equipment 1 to storage disk on computing equipment 1, and the operator is notified of successful process completion via a message on display of computing equipment 1.

The PKOUT program causes the assembly data file to be transferred from computing equipment 1 to computing equipment 2 via the network interface by automatically executing a terminal emulation program on computing equipment 1, for example Rumba®, and executes a script with the commands necessary to transfer the assembly data file directly to an autoexecuting data queue in the main memory of computing equipment 2. The autoexecuting data queue automatically transfers the assembly data file from main memory on computing equipment 2 to the manufacturing system database located in main memory or storage device of computing equipment 2. Manufacturing data transferred to the manufacturing system database may also include cost estimating data, machining data and quality control data.

Second Embodiment

Figure 15:
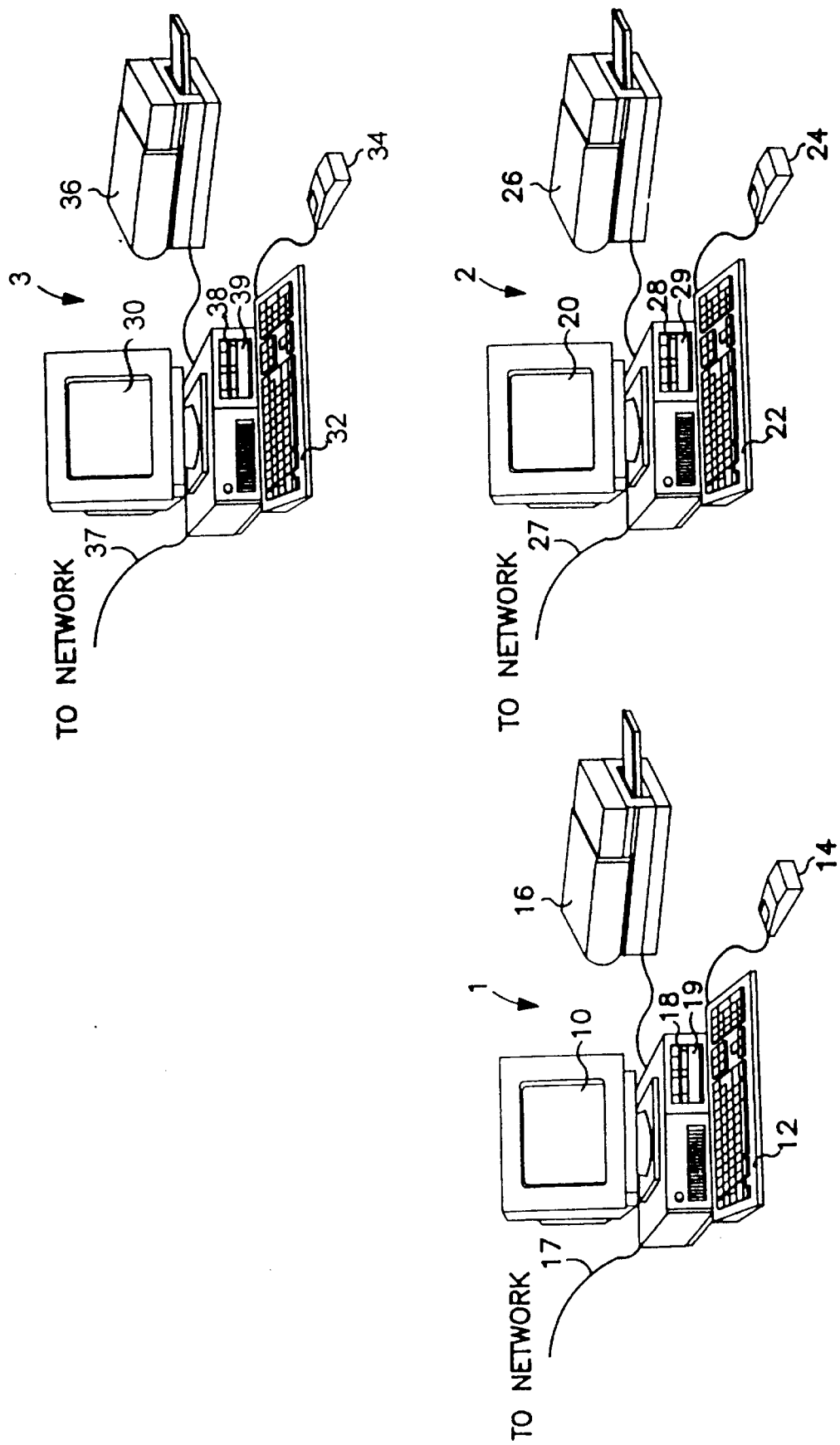
FIG. 15 shows a perspective view of computer hardware used in the system corresponding to a second embodiment of the present invention.

FIG. 15 is a view showing the outward physical appearance of the second embodiment of the present invention. Computing equipment 2 is comprised of the same components described in the first embodiment above. Computing equipment 1 is similar to that described in the first embodiment above except that the database system is not stored nor executed on computing equipment 1. Shown in FIG. 15 is computing equipment 3 having the capability to execute a database system, such as Btrieve®. Such computing equipment may be comprised of hardware as described by computing equipment 2 above.

In the second embodiment, the database system stored and executed in computing equipment 1 in the first embodiment, is stored and executed in computing equipment 3. All data access, data storage, and data comparison requests are transmitted to and from computing device 1 via the network interface to and from computing device 3. The IDC_MAKE, IDC_GET, and PKOUT modules execute database read and write requests on the database system stored and executed in computing equipment 3 via the IDCLINK module through the respective network interfaces 17, 27 and 37. Operator interaction with computing equipment 1, and the display screens presented to the operator are the same as those described in the first embodiment. Interaction between computing device 1 and computing device 2 through their respective network interfaces via the IDCLINK module is also the same as described in the first embodiment.

Third Embodiment

Figure 16:
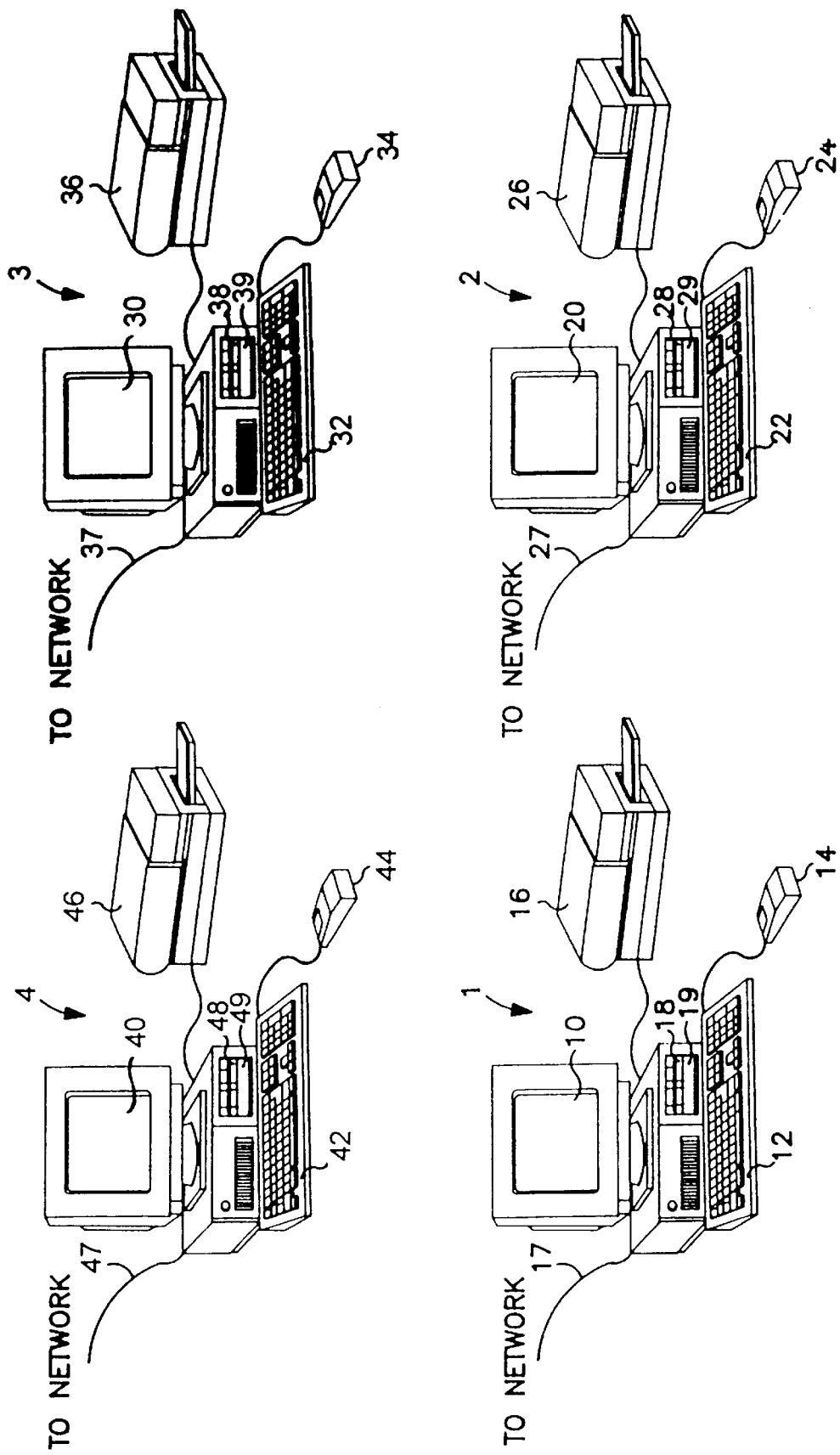
FIG. 16 shows a perspective view of computer hardware used in the system corresponding to a third embodiment of the present invention.
Figure 17B:
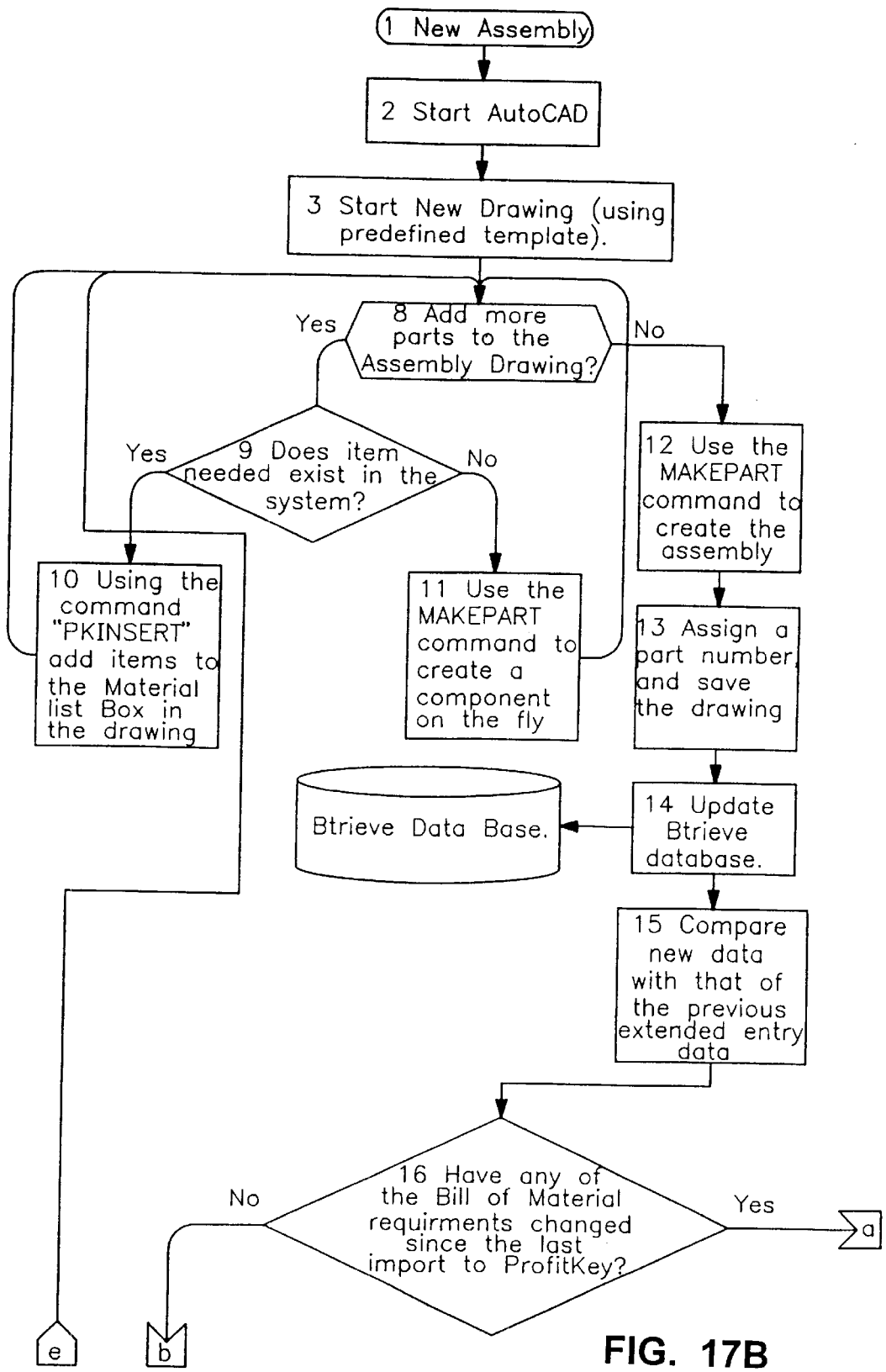
Figure 17C:
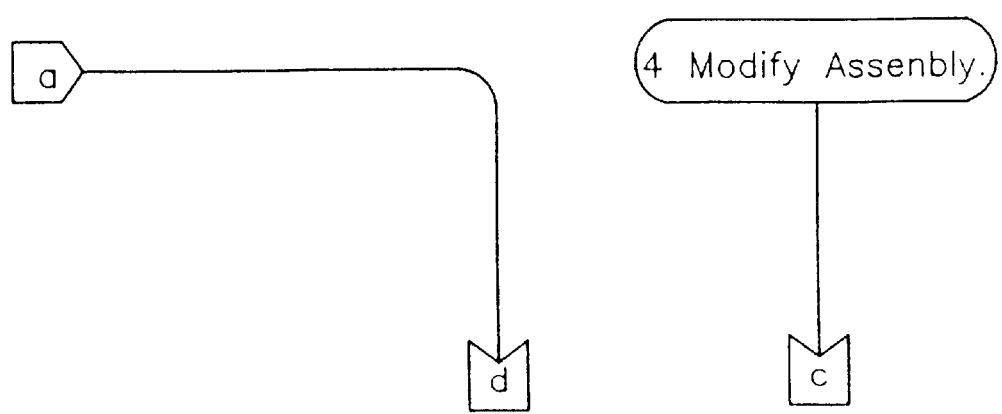
Figure 17D:
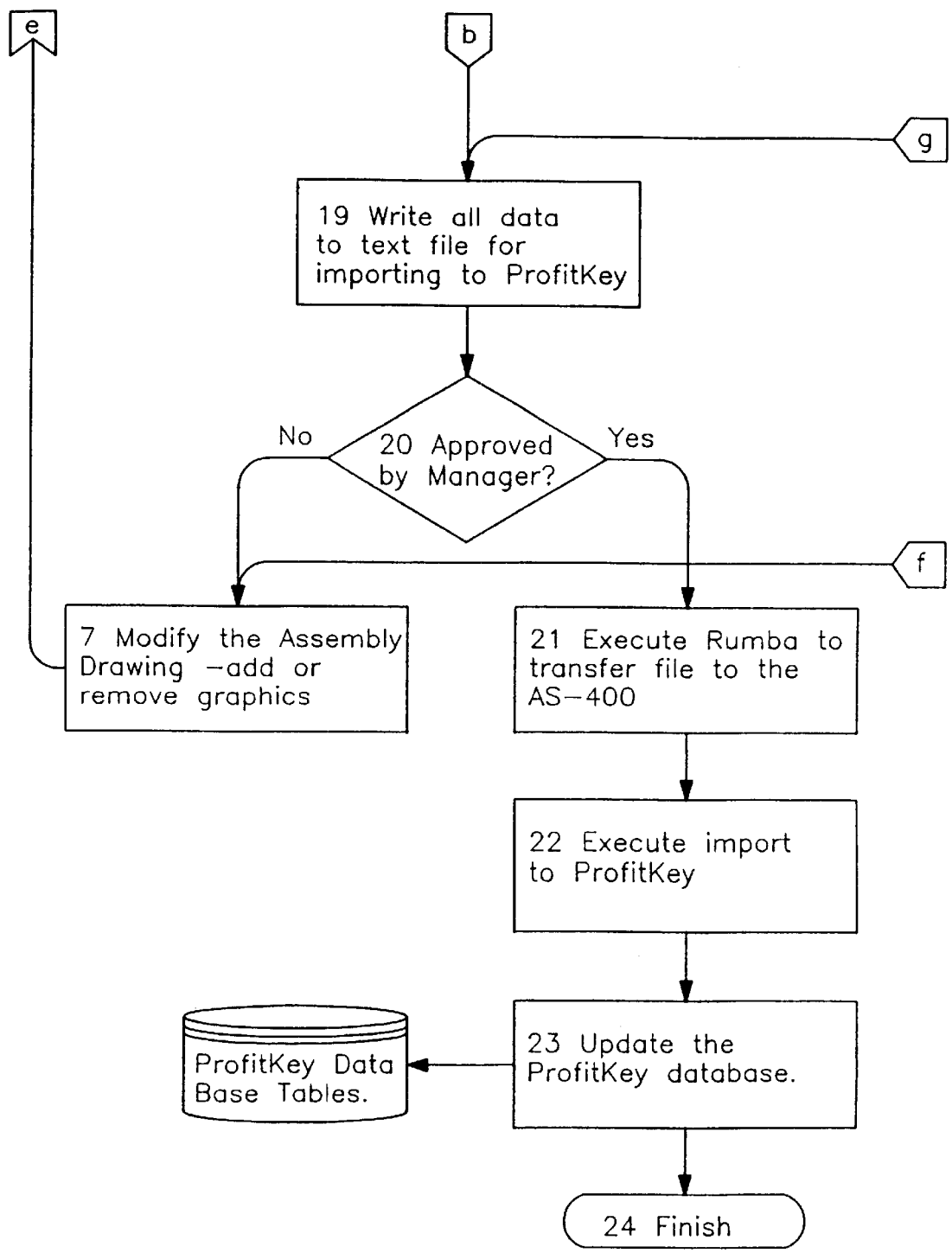
Figure 17E:
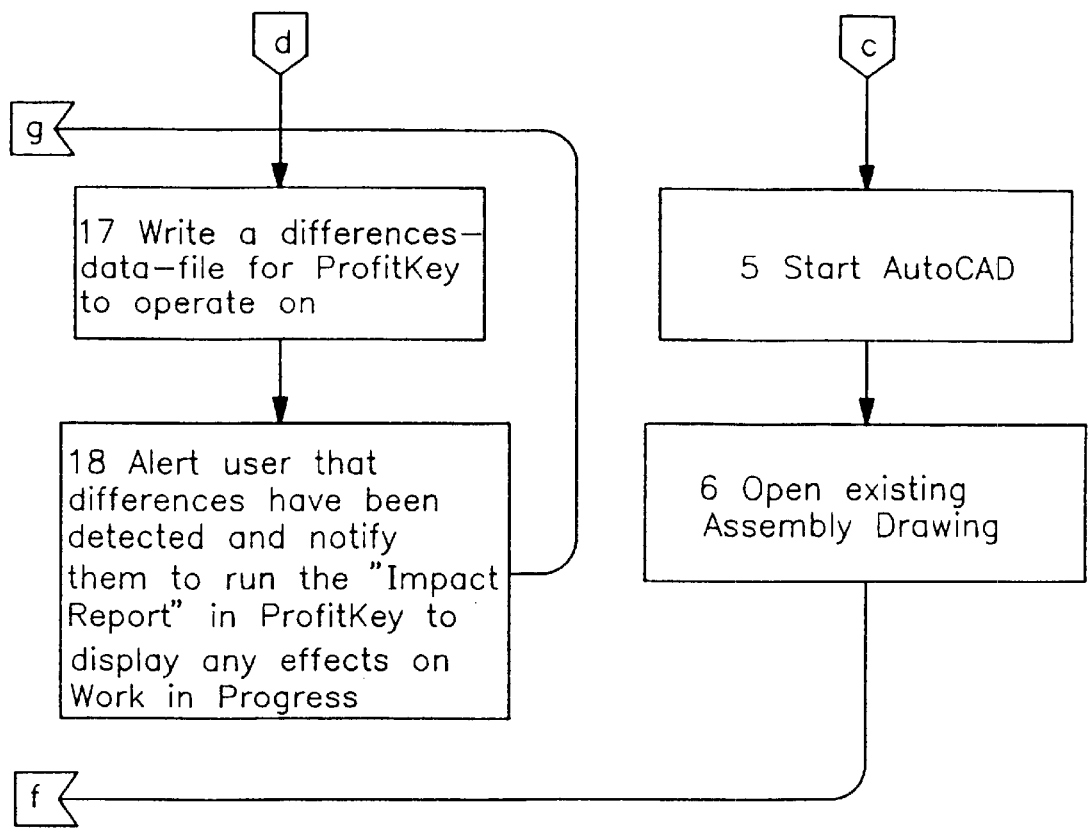

FIG. 16 is view showing the outward physical appearance of the third embodiment of this invention. computing equipment 1, 2, and 3 are of the types specified in the second embodiment. Shown in FIG. 16 is computing equipment 4 having the capability to execute a protocol gateway application, such as Novell's SAA Gateway®. Such computing equipment may be comprised of hardware as described by computing equipment 2 in the first embodiment.

In this embodiment all operations up to, and including, authorizing agent approval execute as described in the first embodiment. In the third embodiment, network communication and data transfer between computing equipment 1 and computing equipment 2 are accomplished via computing equipment 4. Data output by network interface on computing equipment 1 are sent to network interface on computing equipment 4. Data received by computing equipment 4 are transferred from network interface to an area of main memory monitored by the protocol gateway application. The protocol gateway application stored in main memory on computing equipment 4 detects that data has been received from computing equipment 1. The protocol gateway application creates a new data packet for network transmission to computing device 2. The new data packet is arranged in a manner such that network interface on computing equipment 2 will be able to correctly interpret the data within the new data packet. The new data packet is then transmitted from network interface on computing equipment 4 to network interface on computing equipment 2. Assembly data received by the network interface on computing equipment 2 is transferred to the area of main memory monitored by the autoexecuting data queue described in the first embodiment. Any communication required from computing equipment 2 to computing equipment 1, such as data packet receipt acknowledgements are likewise routed via computing equipment 4.

Fourth Embodiment

In embodiment 4, the outward appearance of the computing equipment may be as illustrated in the figures describing the outward appearance of the first, second, or third embodiments. In this embodiment all operations up to, and including, the update of the assembly data revision history file by the PKOUT module are as described in the first embodiment.

In this embodiment there is no requirement for authorizing agent approval, as shown in the flow diagrams in FIGS. 17A–17E. The process steps and data transmissions required to effect this approval are not present. As such, once the assembly data revision history file is transferred by IDCLINK to the database, PKOUT executes program steps in CPU to update the assembly data file stored in storage disk of computing equipment 2, the manufacturing control system. This is accomplished via automatic execution of the terminal emulation program by PKOUT. As in the previously described embodiments, the terminal emulation application transmits the assembly data file to the autoexecuting data queue on computing equipment 2 either directly as described in the first embodiment, or via computing equipment 4 as described in the third embodiment.

The present invention has been described with respect to particular illustrative embodiments. It is to be understood that the invention is not limited to the above-described embodiments and that various changes and modifications may be made by those of ordinary skill in the art without departing from the spirit and cope of the appended claims.

What is claimed is:

1. A method of searching a database for an item for an assembly drawing, the item being searched based on a part description thereof, wherein each part description is in the form of a noun followed by one or more adjectives, said method comprising the steps of:

displaying on a display of a computer aided design computer system associated with the database, a plurality of nouns, each noun corresponding to one or more part descriptions, each part description corresponding to a searchable item of the database;

selecting one of the displayed nouns, the selected noun corresponding to the item being searched for, thereby causing a display of one or more first adjectives associated with the selected noun;

selecting one of the displayed first adjectives, the selected first adjective also corresponding to the item being searched for, wherein selecting the first associated adjective causes to be displayed one or more second adjectives associated with both the selected noun and first adjective; and selecting one of the displayed second adjectives, the selected second adjective also corresponding to the item being searched for, said selecting steps performed via the computer aided design computer system.

* * * * *